US006401592B1

(12) United States Patent
Rostocil

(10) Patent No.: US 6,401,592 B1
(45) Date of Patent: Jun. 11, 2002

(54) AIRCRAFT SUPPORT PLANK MOUNTED 30 MM MACHINE GUN

(76) Inventor: Charles E. Rostocil, 3120 John Olsen Ave., Apt. 28-203, Hillsboro, OR (US) 97124

( * ) Notice: Subject to any disclaimer, the term of this patent is extended or adjusted under 35 U.S.C. 154(b) by 0 days.

(21) Appl. No.: 09/873,341

(22) Filed: Jun. 4, 2001

Related U.S. Application Data

(60) Division of application No. 09/588,618, filed on Jun. 6, 2000, now Pat. No. 6,263,776, which is a division of application No. 09/007,090, filed on Jan. 14, 1998, now Pat. No. 6,176,169, which is a continuation-in-part of application No. 08/812,756, filed on Mar. 6, 1997, now Pat. No. 5,767,436.

(51) Int. Cl.[7] .................................................. F41A 9/30
(52) U.S. Cl. ...................................... 89/33.16; 89/33.17
(58) Field of Search .............................. 89/33.16, 33.17, 89/33.25

(56) References Cited

U.S. PATENT DOCUMENTS 2,821,888 A * 2/1958 Maillard .................... 89/33.25
2,873,649 A * 2/1959 Maillard .................... 89/33.25
4,223,589 A * 9/1980 Post .......................... 89/33.25
4,505,181 A * 3/1985 Schneider et al. ......... 89/33.04

FOREIGN PATENT DOCUMENTS

AT          128162   *  7/1948   ............... 89/33.16
GB          355767   *  2/1930   ............... 89/33.16

* cited by examiner

Primary Examiner—Stephen M. Johnson
(74) Attorney, Agent, or Firm—Konneker & Smith, P.C.

(57) ABSTRACT

A machine gun, representatively a 30 mm machine gun, is mounted on an outer end portion of a support plank structure projecting out of the cabin area of a helicopter using a roller cradle assembly secured to the outer plank end. A variety of structural improvements are incorporated into the machine gun to (1) reduce its mechanical complexity, (2) reduce its firing recoil to make the gun more suitable for light aircraft mounting, and to improve the gun's firing controllability and accuracy, and (3) to make the gun easily and quickly field strippable, for cleaning, inspection and repair purposes, without requiring the services of a highly skilled armament mechanic or taking the gun to a specialized repair facility.

5 Claims, 61 Drawing Sheets

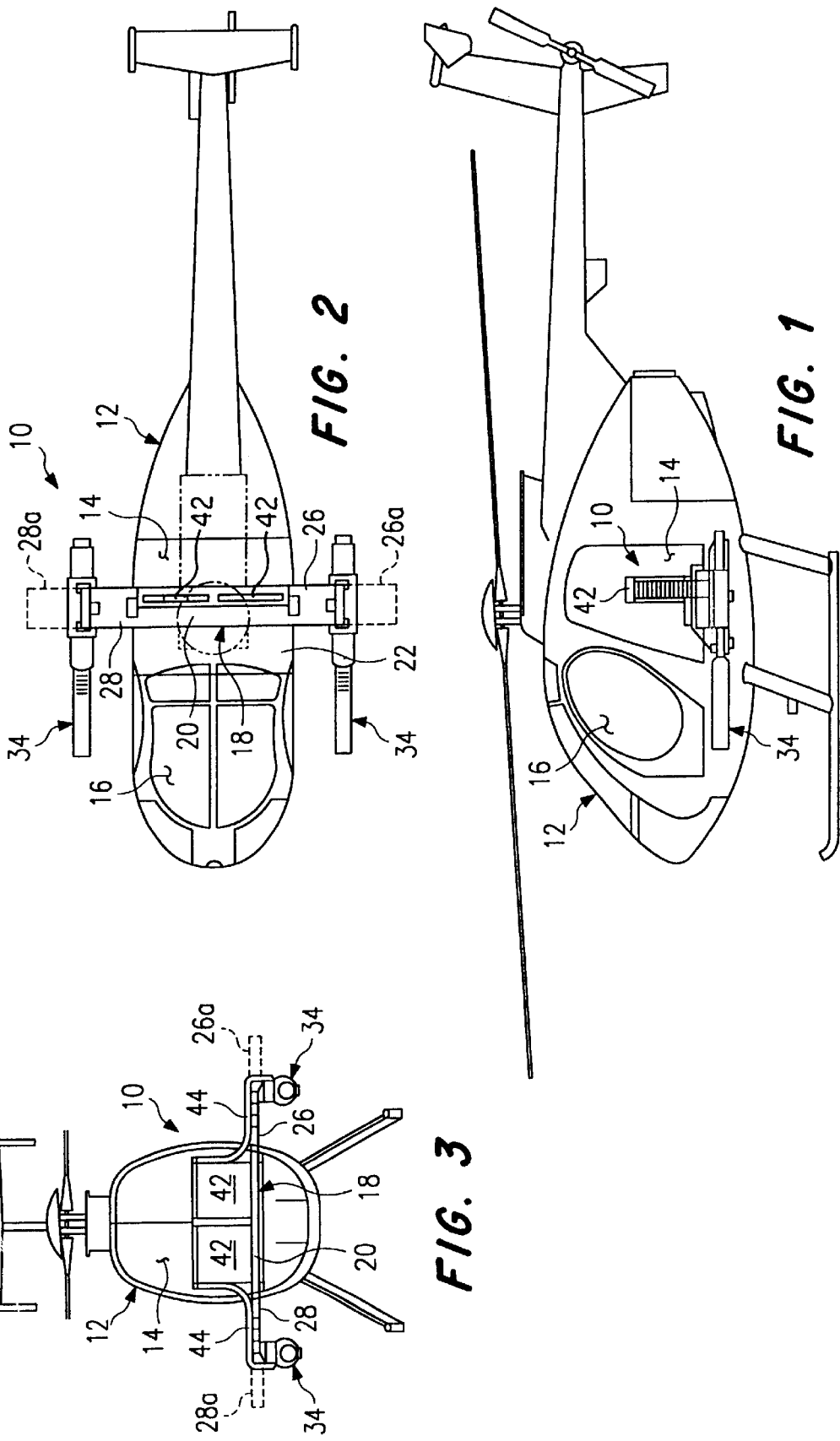

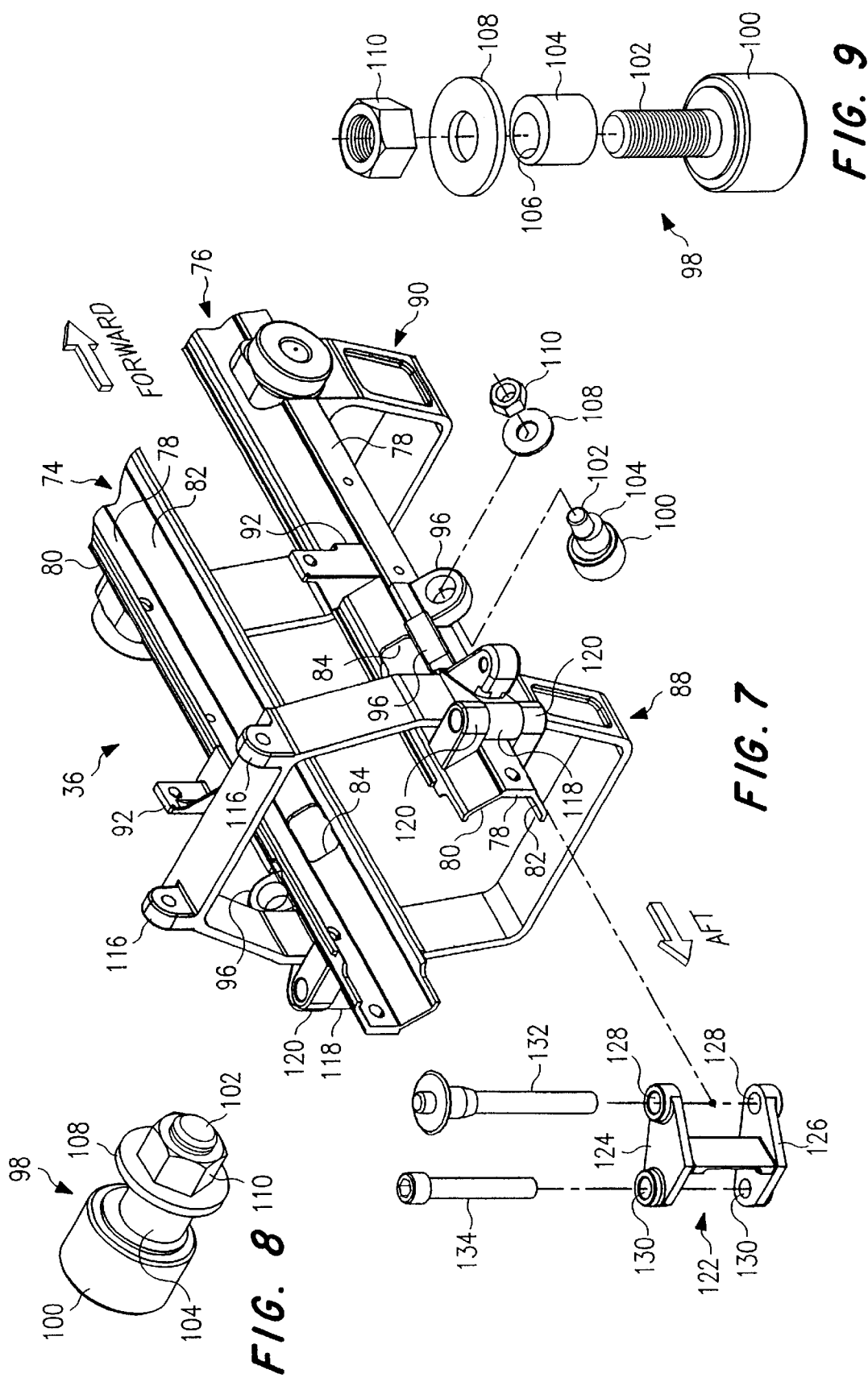

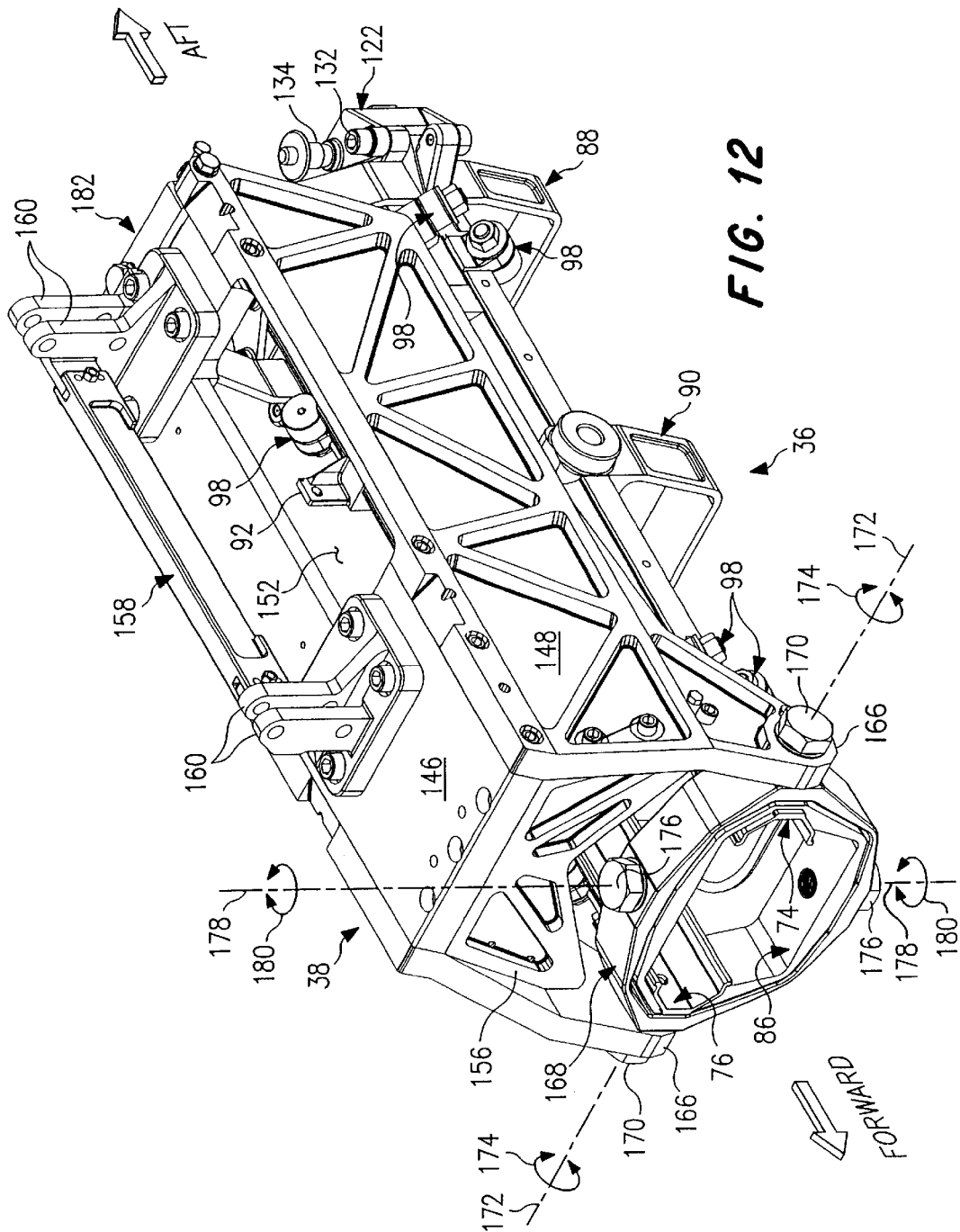

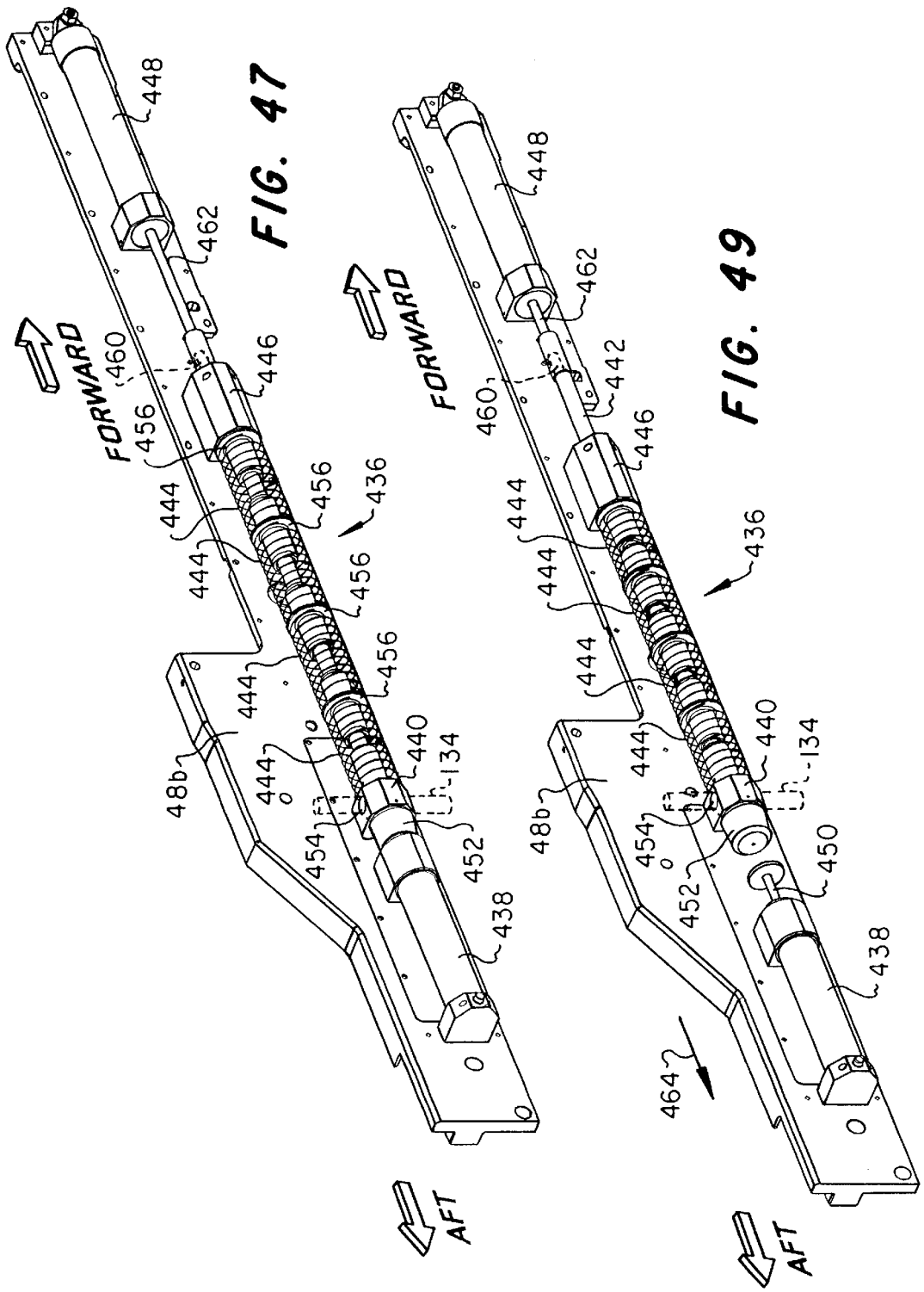

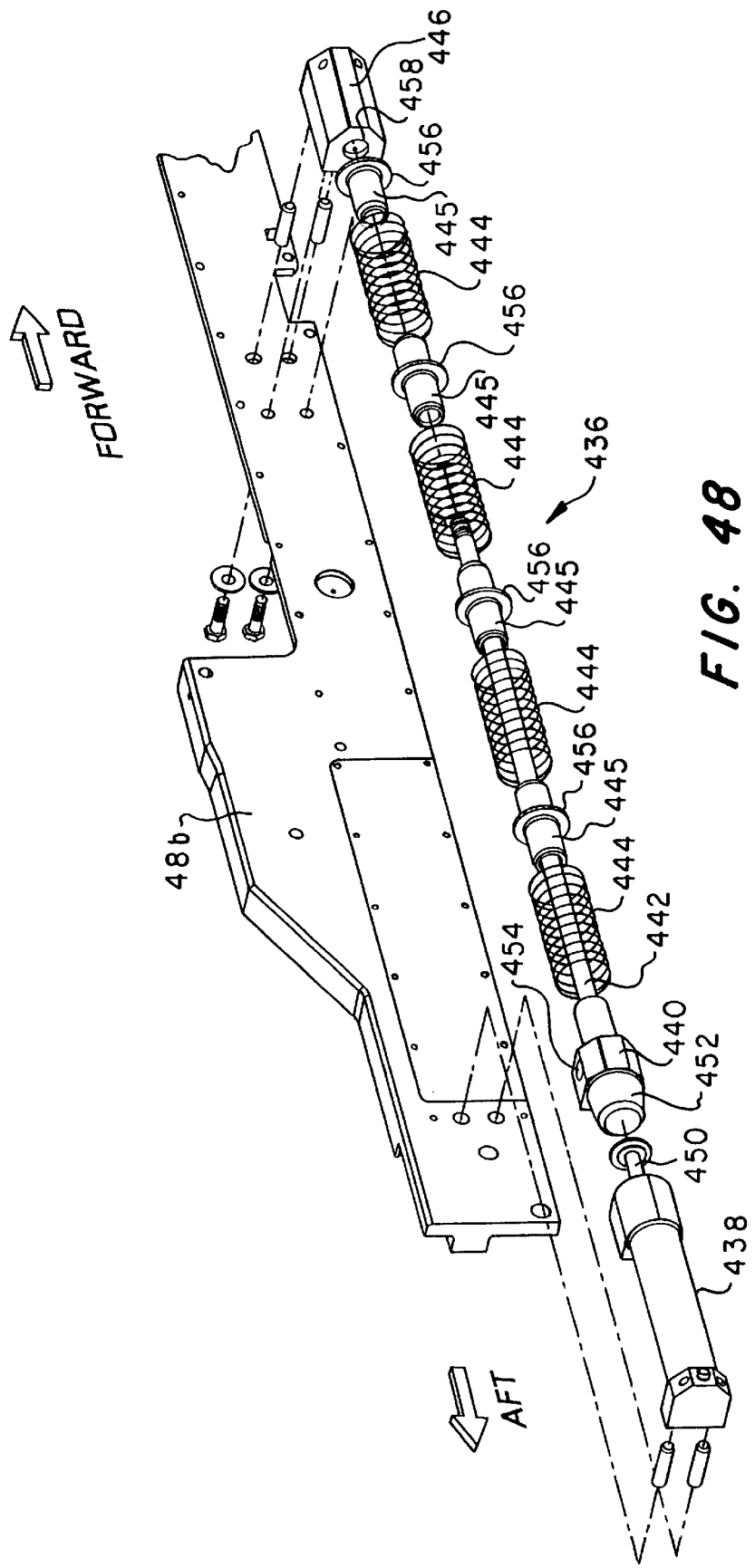

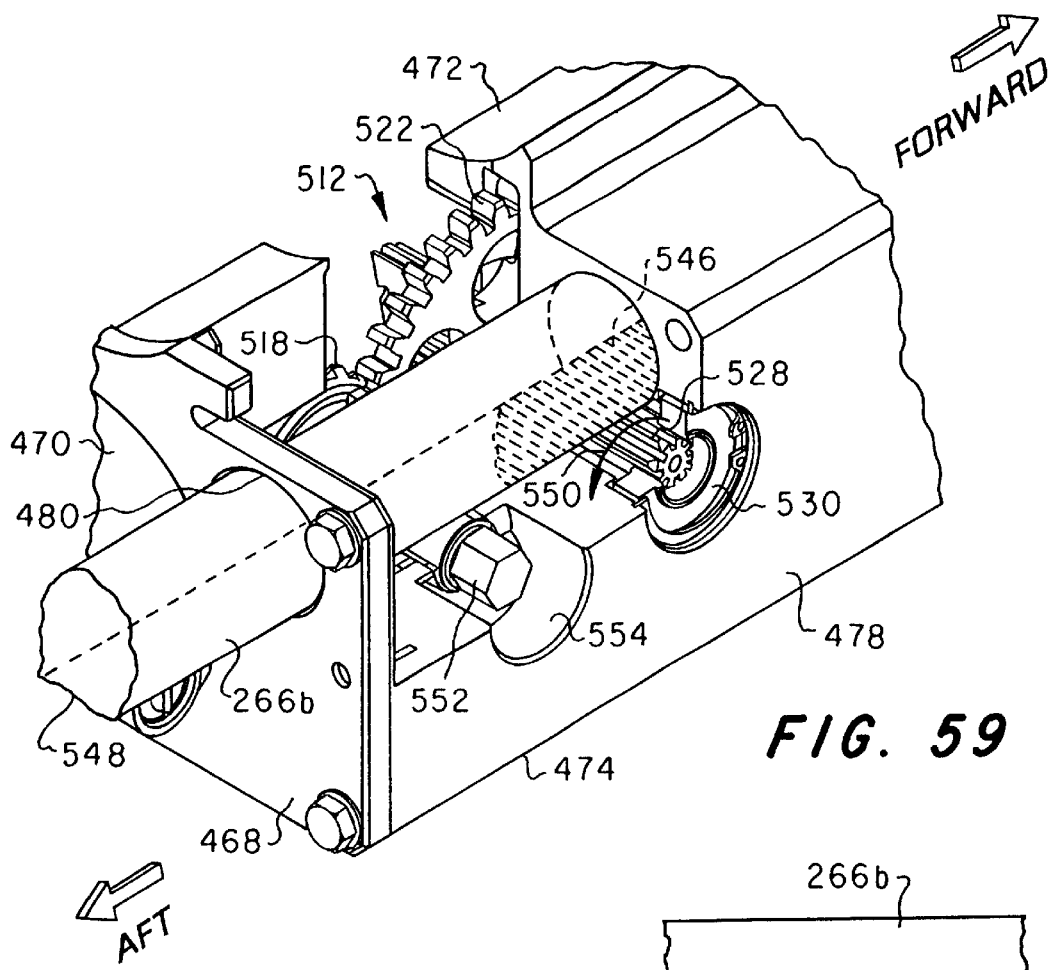
FIG. 59
FIG. 60
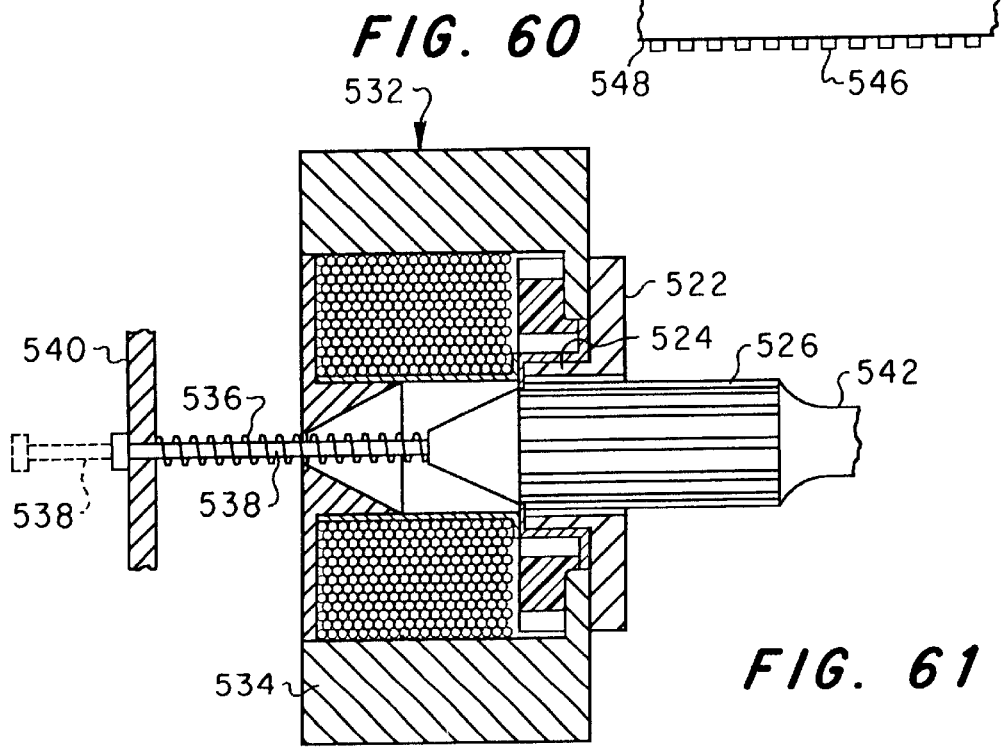
FIG. 61

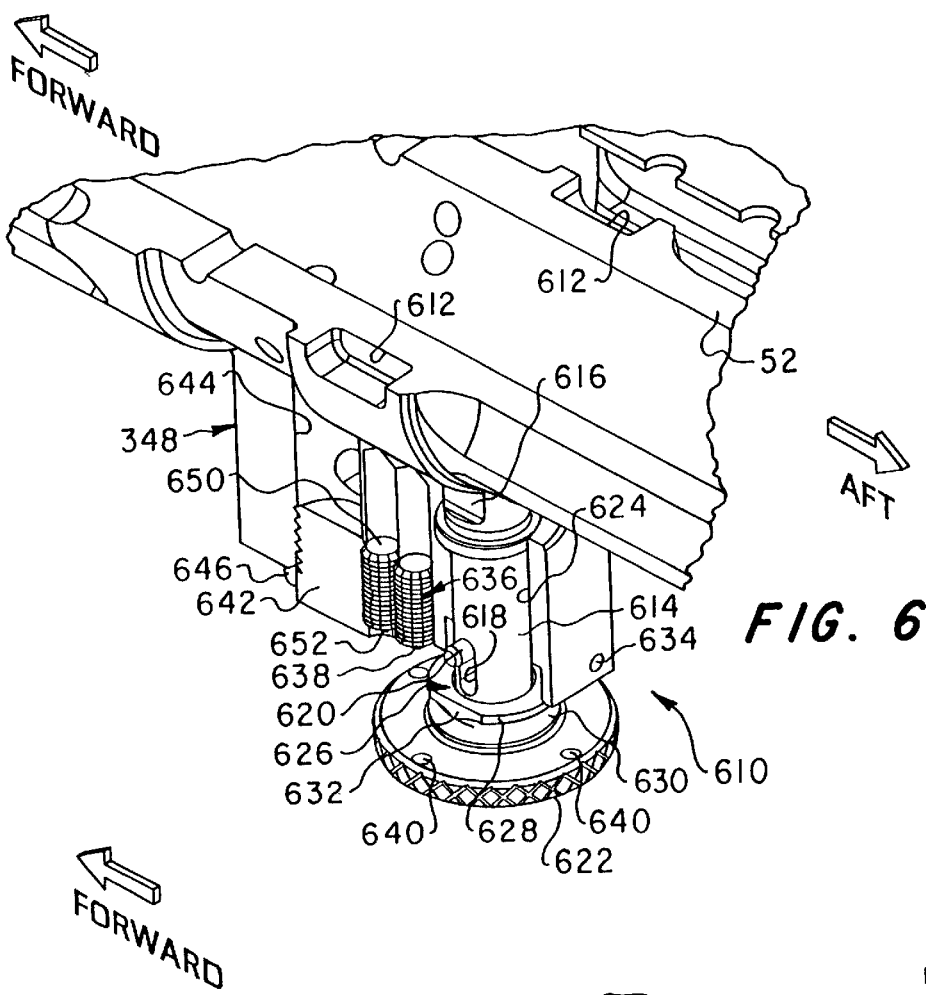
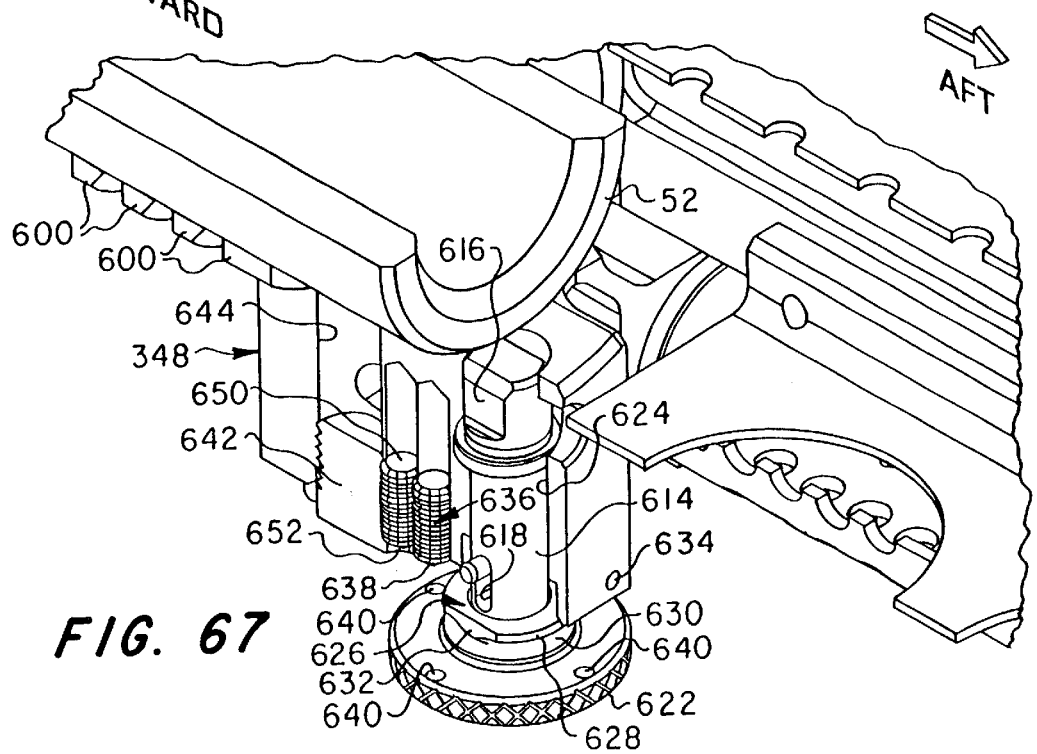

AIRCRAFT SUPPORT PLANK MOUNTED 30 MM MACHINE GUN

CROSS-REFERENCE TO RELATED APPLICATIONS

This application is a division of U.S. application Ser. No. 09/588,618 filed on Jun. 6, 2000, now U.S. Pat. No. 6,263, 776. U.S. application Ser. No. 09/588,618 was a division of U.S. application Ser. No. 09/007,090 filed on Jan. 14, 1998, now U.S. Pat. No. 6,176,169, which was a continuation-in-part of U.S. application Ser. No. 08/812,756 filed on Mar. 6, 1997, now U.S. Pat. No. 5,767,436.

BACKGROUND OF THE INVENTION

The present invention generally relates to aircraft armament apparatus and, in a preferred embodiment thereof, more particularly relates to the mounting of machine guns, representatively 30 mm machine guns, on light aircraft such as helicopters.

The external mounting on aircraft of weaponry such as machine guns has heretofore carried with it a variety of structural, operational and safety limitations and disadvantages. To a great extent these problems have been eliminated by using a honeycombed metal support plank such as that illustrated and described in U.S. Pat. No. 5,419,234 to Sanderson. As illustrated in such patent, 40 mm machine guns are mounted on opposite support plank ends which project outwardly from the cabin area of a helicopter.

A particularly difficult external aircraft mounting problem is presented by the much higher recoil 30 mm machine gun. In previously proposed nonplank-based external aircraft mounting systems for 30 mm machine guns, several problems, limitations and disadvantages have been present. For example, due to the high recoil forces generated by firing the 30 mm machine gun, their external aircraft mounts have tended to be quite complex—an undesirable characteristic arising from the need to protect the "light" helicopter (such as an MD 500 or Bell 206 helicopter) from structural damage from recoil forces, and to prevent loss of pilot control of the aircraft during gun firing. Attempts to design an external aircraft mount structure for the 30 mm machine structure have heretofore not been entirely successful in either of these areas.

Other problems, limitations and disadvantages presented in the use of both aircraft and ground-mounted 30 mm machine guns have to do with the construction and operation of the gun itself. The three primary areas of such problems, limitations and disadvantages in conventionally constructed 30 mm machine guns arise from (1) their complex construction, (2) their heretofore unavoidable high firing recoil forces, and (3) the difficulty in field servicing the guns.

The complex construction of traditionally configured 30 mm machine guns can lead to reliability problems and difficult and expensive fabrication operations. The high recoil forces of conventional 30 mm machine guns undesirably diminishes their firing controllability and accuracy and, as mentioned above, has made it quite difficult to mount 30 mm machine guns on light aircraft such as helicopters. Further, the difficulty in field servicing the guns typically requires that they be uncoupled from the aircraft and taken to a special maintenance facility to be worked on by a specialized technician having an aircraft mechanic/ordnance skill level. This has been true even for routine gun cleaning and maintenance services. Additionally, to simply clean a conventionally constructed 30 mm machine gun it has to be taken nearly completely apart—a tedious task entailing removing countless screws, bolts and other fasteners and then replacing them after the gun cleaning task is completed.

From the foregoing it can readily be seen that a need exists for a 30 mm machine gun that eliminates or at least substantially reduces the above-mentioned problems, limitations and disadvantages commonly associated with 30 mm machine guns of conventional construction. It is to this need that the present invention is directed.

SUMMARY OF THE INVENTION

In carrying out principles of the present invention, in accordance with a preferred embodiment thereof, a machine gun, representatively a 30 mm machine gun, is provided with a variety of unique structural and operational features which serve to (1) reduce the complexity of the gun, (2) make it relatively easy to service in the field, and (3) substantially reduce its recoil to thereby facilitate its mountability on light aircraft such as helicopters, and improve its firing controllability and accuracy. The gun is illustratively secured, via a rollered mounting cradle, to the outer end of a support plank structure extending transversely through the cabin area of an aircraft, but may be supported in other manners in a variety of other aircraft and ground-based mounting applications.

In its preferred embodiment, the machine gun basically comprises a body upon which a barrel is mounted, the barrel longitudinally extending forwardly and rearwardly along a firing axis. The body is supported by a cradle and feed structure unit for rearward recoil movement and forward counter-recoil movement relative to the cradle and feed structure unit in response to the firing of the gun. The feed structure part of the unit is operative to position successive cartridges for retrieval and chambering in the barrel for firing therein. An operating rod structure is carried by the body for driven movement relative thereto cyclically in forward and rearward directions in response to firing of the gun, and a resilient recoil system is provided for absorbing the rearward recoil and forward counter-recoil forces of the gun. Firing apparatus is provided for firing each chambered cartridge, the firing of each cartridge causing a rearward recoil movement and subsequent forward counter-recoil movement of the gun body relative to the stationary feed and cradle apparatus.

Ammunition handling means are carried by the gun body and are operative to deliver cartridges from the feed structure to the barrel for firing therein, and then extracting and ejecting the spent casings of the fired cartridges. Representatively, the ammunition handling means include a bolt member carried by the operating rod structure rearwardly of the feed structure for cyclical forward and rearward movement with the operating rod structure toward and away from the feed structure, the bolt member having first and second extractor means thereon for releasably receiving and retaining rear cartridge casing rim portions.

A bolt face member is carried by the bolt member for movement relative thereto in first and second opposite directions transverse to the barrel, the bolt face member having ejector means thereon for releasably circumscribing a rear cartridge casing end portion. Cooperating means are provided on the bolt face member and the gun body for moving the bolt face member in the first direction relative to the bolt member in response to movement of the bolt member toward the feed structure, and for moving the bolt face member in the second direction relative to the bolt member in response to movement of the bolt member away from the feed structure. Representatively, these cooperating means include a cam track formed in the body with a pivotally spring-loaded switch plate member attached, and a roller structure carried on the bolt face member and received in the cam track for guided rolling movement therealong.

The relatively simple bolt; member/bolt face member structure performs several ammunition handling functions during the firing of the gun—namely, (1) extracting a first cartridge from the feed structure, (2) chambering the extracted first cartridge in the barrel, (3) extracting a second cartridge from the feed structure while extracting the spent casing of the first cartridge, after firing thereof, from the barrel, and (4) moving the extracted second cartridge into a chambering alignment position in a manner causing the extracted second cartridge to engage and forcibly eject the spent casing from the ammunition handling means by ejectors mounted on the bolt face member.

Cooperatively engaged first and second structures are respectively disposed on the gun body and the feed structure for operating the feed structure in response to forward and rearward movement of the gun body relative to the stationary feed structure. Because the movement of the gun body relative to the feed apparatus operates the feed apparatus, no complicated timing system is needed.

Representatively, a cam track slot having an angled central portion is formed in a top side portion of the gun body and slidingly receives a cam follower pin which depends from a rotatable feed drum portion of the feed structure. The feed drum is connected by a one way clutched gear train to a splined drive shaft which extends parallel to the barrel and is rotationally locked to a sprocket structure that delivers individual cartridges from a cartridge belt to the bolt structure. The sprocket structure is slidable along the splined drive shaft, between front and rear limit positions and is spring-biased toward its rear limit position. A depressible bolt face sensor switch is carried on a rear side portion of the sprocket and is forwardly struck and depressed by the bolt face structure during firing of the gun.

During the firing of the gun, the rearward recoil of the gun body relative to the feed structure causes the cam pin/cam track slot interaction to rotate the feed drum in a first direction which back-indexes the ratcheted gear train without rotating the splined drive shaft, and the forward counter-recoil movement of the gun causes the cam pin/cam track slot interaction to rotate the feed drum in a second direction which rotationally drives the gear train to rotationally drive the sprocket structure and advance the ammunition belt one cartridge.

The operating rod structure of the gun preferably comprises a spaced pair of hollow left and right operating rods extending parallel to the gun barrel. The operating rods have closed front ends, and open rear ends anchored to an operating rod body slidingly carried within the gun body for forward and rearward movement relative thereto. The previously mentioned bolt structure is carried by the operating rod body for forward and rearward movement therewith within the gun body. Guide rods extend forwardly through the operating rods, and springs carried by the guide rods resiliently bias the operating rod structure to a front limit position within the gun body. When the gun is fired, pressurized gas from the fired cartridge is used to rearwardly drive the operating rod structure, against the resilient resistance of the guide rod springs which function to return the operating rod structure, and the bolt structure which it carries, to their forward limit positions.

According to a feature of the invention, the bolt structure is cyclically movable in forward and rearward directions within the gun body between a front limit position disposed rearwardly of the front limit position of the operating structure, and a rear limit position. A lock structure is associated with the operating rod structure and the bolt structure and is shiftable relative thereto between (1) a first position in which the lock structure releasably latches the operating rod structure and the bolt structure for conjoint forward and rearward movement relative to the gun body, and (2) a second position in which the lock structure releasably interlocks with the gun body in a manner preventing forward and rearward movement of the bolt structure relative to the gun body, and unlatches the operating rod structure and the bolt structure to permit forward movement of the rod operating structure relative to the gun body and bolt structure.

First means are provided for shifting the lock structure from its first position to its second position in response to the bolt structure reaching its front limit position, and second means are provided for shifting the lock structure from its second position to its first position in response to rearward movement of the operating structure away from its front limit position.

When the bolt structure with the bolt face structure attached thereto reaches its forward limit position, and is locked therein by the shifted lock member, the bolt face structure depresses the aforementioned bolt sensor switch. When the forwardly moving operating rod structure finishes the lock movement and the lock structure reaches its front limit position it causes a second switch to close. only when both of these two switches close, assuring that the bolt is locked to the gun body and the gun is within the feed system, can the gun be fired.

In response to the operating rod structure reaching its front limit position, with the bolt structure locked to the gun body by the shifted lock member, a secondary mass member slidably carried behind the operating rod body portion forwardly strikes the operating rod body in a manner inhibiting undesirable rearwardly directed impact bounce-back movement of the operating rod structure which might unlock the bolt structure from the gun body. The secondary mass member is spring-biased rearwardly away from the operating rod body portion until the operating rod structure stops upon reaching its front limit position.

As the operating rods are cycled back and forth during firing of the gun, an electrical brush member slides along an electrically insulative strip on the outer side surface of one of the operating rods, the strip having an electrically conductive hot shoe portion at one end thereof and electrically coupled to the operating rod body portion via a wire imbedded in the insulative material. Shortly before the operating rod body reaches its front limit position the brush slides onto the hot shoe as the operating rod body closes the second firing switch. An electrical switch circuit receives a signal from the bolt face sensor switch when it is closed by the bolt face structure and responsively transmits electrical current to the brush to permit the gun to be fired when both switches close. In this manner, electrical firing power is sent to the gun only when needed—it need not be maintained continuously as in most conventional machine gun electrical firing systems.

The recoil system resiliently absorbs the recoil and counter-recoil forces of the gun as it moves rearwardly and forwardly relative to the stationary cradle mounting structure which supports the gun and holds the feed structure. In its preferred embodiment, the recoil system includes a recoil member fixedly securable to the stationary mounting structure, the gun body being movable forwardly and rearwardly relative to the recoil member, the recoil member having opposite front and rear portions. The rear portion of the recoil member is preferable formed from a resilient material.

The recoil system also representatively includes a counter recoil shock absorber anchored to the gun body and having a forwardly projecting depressible plunger member engageable with the rear portion of the recoil member; a recoil spring stop member anchored to the gun body forwardly of the recoil shock absorber, with the recoil member being disposed between the recoil shock absorber and the recoil spring stop member; a rod member having a first end anchored to the recoil member, and a second and slidably extending forwardly through the recoil spring stop member; a recoil damper anchored to the gun body forwardly of the recoil spring stop member and having a rearwardly extending depressible plunger member secured to the second end of the rod member; and a spring structure carried by the rod member and being compressible between the recoil member and the recoil spring stop member in response to rearward movement of the gun body relative to the recoil member.

In a pre-firing condition of the gun the operating rod structure is held in a rearward position thereof, against the resilient force of the guide rod springs, by a specially designed sear system. The sear system utilizes pivotally mounted sear members having roller portions thereon. The sear members are pivotally biased toward first positions in which they engage inner portions of arcuate, forwardly facing ledges formed on the closed front ends of the two operating rods. In such first positions the rollers are below "jam" angles of the ledge/roller interface areas and prevent the front ends of the operating rods from moving forwardly past the rollers.

To unlatch the sear system from the operating rods, and permit the operating rod structure to be spring-driven forwardly to initiate firing of the gun, a sear solenoid is electrically energized to forcibly move a core portion thereof. The solenoid core portion is coupled to the pivotable sear members through a mechanically advantaged linkage system which is driven by the core portion to pivot the sear members to second positions just above the pinch angle of the operating rod ledges, but not out of contact with the ledges. The arcuate ledges then rotate the sear member rollers out of engagement therewith to allow the operating structure to be forwardly driven to initiate firing of the gun. During firing of the gun, each time the ledges rearwardly pass the sear member rollers they permit the rollers to be moved inwardly to their second positions and then kick the rollers back outwardly from the ledges as the ledges forwardly pass the rollers.

During certain pre-firing conditions of the gun, such as when it is being reloaded, the operating rods are stationary in their forwardmost positions within the gun body. To move them back to their "on sear" ready-to-fire positions a specially designed charger system is provided.

Unlike conventional charger systems, the charger system of the present invention (which preferably carries the previously described sear system) is carried on the gun body for recoil and counter-recoil movement therewith. Accordingly, the charger system adds to the overall recoiling and counter-recoiling mass to advantageously lessen the recoil and counter-recoil forces.

Additionally, in contrast to conventional charger systems, the charger system of the present invention does not have a member which must engage and rearwardly move the operating structure to its "on sear" position and then be forwardly returned to its starting system to get it out of the way of the operating structure before the gun can be fired. Instead, the charger system of the present invention, in a preferred embodiment thereof utilizes a motor-driven pinion gear which is shiftable transversely to one of the operating rods into and out of driving engagement with a gear rack portion formed on a flattened exterior side surface portion thereof.

The pinion gear is rotationally driven, via an intermediate gear train, by an electric charger motor and a portion of the pinion gear forms the shiftable core portion of an electrical solenoid. When the charger motor and solenoid are energized with the operating rods in their forwardmost positions within the gun body, the pinion gear is first shifted into driving engagement with the gear rack and then rotationally driven to rearwardly move the operating structure to its "on sear" position at which time it is latched in such position by the sear system.

During rearward charging movement of the operating rod structure by the charger system, an electrically charged brush slides along a strip of electrically insulative material on the other operating rod. When the operating rod structure reaches its "on sear" position, the brush moves off the front end of the strip and is grounded to its associated operating rod. This grounding responsively de-energizes the charger motor to thereby stop the rearward motion of the operating structure and shift the pinion gear out of driving engagement with its associated operating rod rack.

In addition to the recoil reduction achieved by mounting the charger/sear system on the gun body for recoil and counter-recoil movement therewith, various other unique recoil reduction features are incorporated into the machine gun of the present invention.

For example, when the gun is fired the gun body rearwardly recoils. Subsequently, the operating rod structure is gas-driven rearwardly relative to the rearwardly moving gun body at a velocity greater than the velocity of the rearwardly recoiling gun body. Prior to the gun body beginning its forward counter-recoil stroke, the bolt structure carried on the rearwardly moving operating rod body portion strikes a resilient bolt buffer assembly carried on a rear interior end portion of the gun body.

This causes the operating structure and bolt structure to forwardly rebound in a manner such that the operating and bolt structures reach their front limit positions, and fire the gun, while the body is moving forwardly through its counter-recoil stroke. Thus, the firing recoil force is offset to a substantial degree by the mass of the still forwardly moving gun.

Another feature that desirably reduces the recoil force of the gun is a specially designed muzzle brake removably secured to the front end of the gun barrel. The muzzle brake has a hollow body coaxial with the firing axis of the barrel, and open front and rear ends. An axially spaced series of gas discharge openings are formed in the side wall of the muzzle brake body between its inner and outer surfaces, with the flow areas of the gas discharge openings progressively increasing in a rear-to-front direction along the length of the muzzle brake body.

The gas discharge openings are sloped rearwardly and laterally outwardly relative to the axis of the muzzle brake body. When the gun is fired, pressurized gas behind the cartridge projectile being expelled from the barrel is vented outwardly through the gas discharge openings, thereby exerting a forward force on the gun which desirably counteracts its rearwardly directed firing recoil force. The unique progressive cross-sectional increase in a forward direction of the gas discharge openings desirably tends to even out this forward force on the gun during pressurized gas expulsion from the muzzle brake gas discharge openings.

Another desirable attribute of the improved gas-operated, electrically fired machine gun of the present invention is that is easily field strippable for inspection, cleaning and maintenance purposes. For example, the gun is provided with a specially designed barrel lock system that permits the barrel to be rapidly installed and removed. To install the barrel, a rear end portion thereof in rearwardly inserted into a front end opening of the gun body.

The inserted barrel is then rotated ninety degrees about its axis to interlock lugs on the outer side of the barrel with corresponding lugs within the interior of the breech of the gun body to prevent axial removal of the inserted barrel. To releasably prevent unlocking rotation of the barrel, the inner end of a pin member transverse to the barrel is radially moved into an exterior side surface recess in the barrel, and the pin member is locked into place by the engagement of a rotatable pin handle with retaining pins in the gun body front end structure.

To subsequently remove the barrel, the pin handle is rotated to free it from the front end retaining pins. The barrel locking pin is then radially withdrawn from the barrel recess, the barrel is rotated to disengage its lugs from the gun body breech lugs, and the barrel is pulled out of the gun body.

According to another serviceability feature of the gun, a rear end cap portion of the hollow gun body is removably secured to the balance of the gun body, representatively by a pair of quick-release ball pins. The previously mentioned resilient bolt buffer structure and rear ends of the guide rods are secured to this removable end portion of the gun body. When the rear gun body end cap portion is removed, the bolt buffer structure and the guide rods and their associated springs come with it. subsequently, and without using any tools, the overall operating rod structure, and the bolt structure which it carries, can simply be pulled rearwardly out of the gun. The gun body preferably has an open bottom side which further facilitates this easy and rapid field strippability of the gun.

BRIEF DESCRIPTION OF THE DRAWINGS

FIGS. 1, 2 and 3, respectively, are phantomed side elevational, top plan and front end views of a representative light helicopter to which is transversely secured a cabin area support plank structure with specially designed 30 mm machine guns embodying principles of the present invention and carried on cradle structures opposite ends of the support plank structure;

FIG. 7 is a partially exploded perspective view of an aft end portion of the support cradle;

FIG. 8 is an enlarged scale perspective view of an eccentric cam roller assembly used in the support cradle;

FIG. 9 is an exploded perspective view of the cam roller assembly;

FIG. 12 is an enlarged scale forward end perspective view of the assembled cradle, with mount portions of the armament apparatus, less the feed structure;

FIG. 36A is an enlarged scale perspective detail view of a right side breech cutout area shown in FIG. 36;

FIG. 47 is an enlarged scale perspective view of a right side portion of a spring and damper recoil system of the gun, with the system being in an at-rest state;

FIG. 48 is an exploded perspective view of a rear section of the recoil system portion shown in FIG. 47;

FIG. 49 is a view similar to that in FIG. 47 but with the recoil system portion being shown in its orientation created during firing recoil of the gun;

FIGS. 57-59 are enlarged scale cut away rear top side perspective views of a specially designed gear system portion of the charger system sequentially illustrating its operation;

FIG. 60 is a simplified reduced scale side elevational view of a portion of the gun's right operating rod showing a gear rack section formed thereon;

FIG. 61 is an enlarged scale simplified cross-sectional view through a portion of the charger system taken along line 61—61 of FIG. 56;

FIGS. 64–67 are partially,cut away rear top side perspective views of a barrel lock portion of the gun and sequentially illustrate its operation;

DETAILED DESCRIPTION

Figure 4:
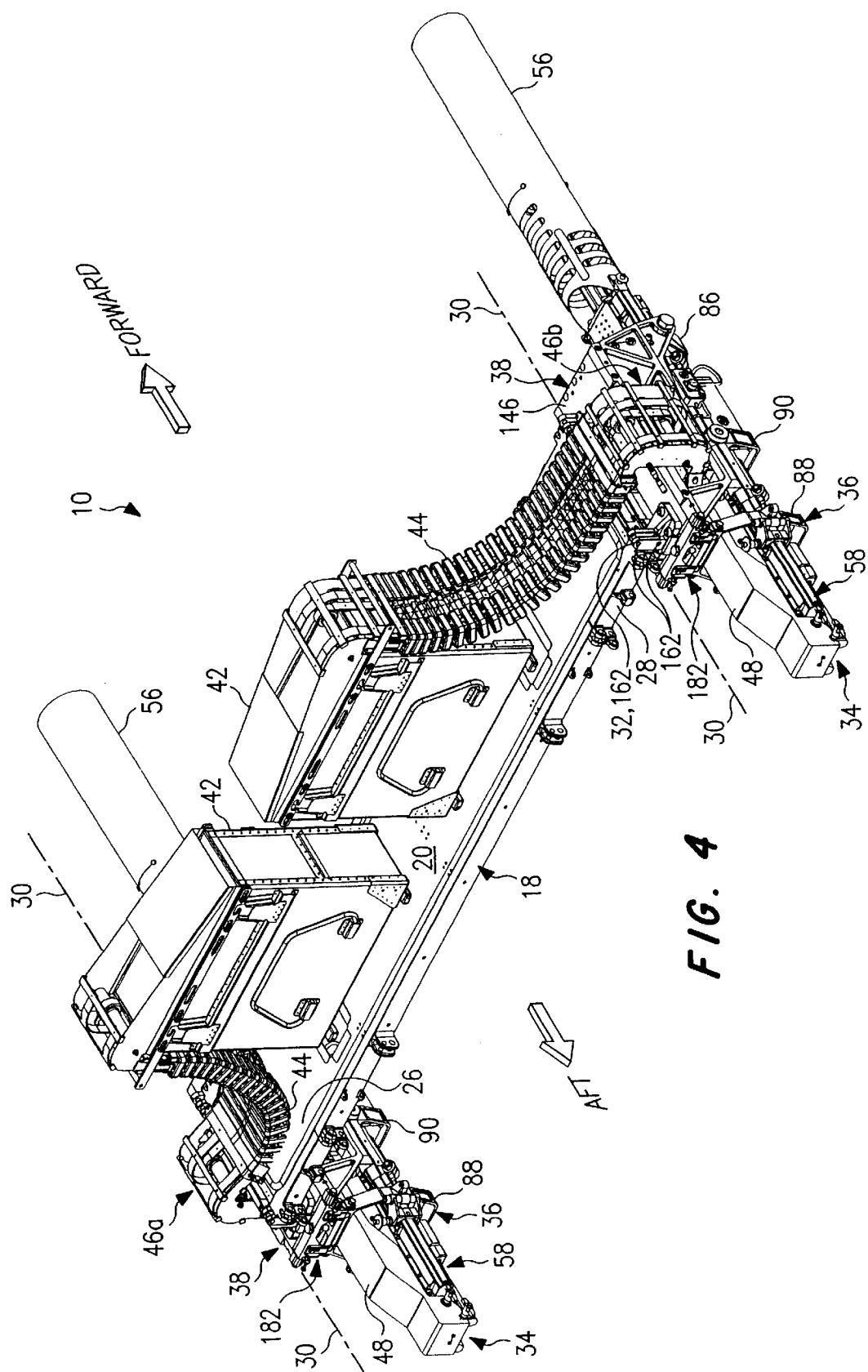
FIG. 4 is an enlarged scale perspective view of the plank-supported aircraft armament apparatus shown in FIGS. 1–3.

Referring initially to FIGS. 1–4A, the present invention provides improved armament apparatus 10 which is operatively connected to a representative helicopter 12 (see FIGS. 1–3) having a cabin area 14 positioned rearwardly of a cockpit area 16. The armament apparatus 10 includes an elongated metal support plank structure 18 which is generally similar to that illustrated and described in U.S. Pat. No. 5,419,234 to Sanderson which has been incorporated herein by reference.

The support plank structure 18 is longitudinally extended transversely through cabin area 14 and has a central longitudinal portion 20 which is suitably anchored to the floor 22 of the cabin area 14, thus operatively securing armament apparatus 10 to the helicopter 12. Left and right, outer end portions 26 and 28 of the support plank 18 (as viewed from the rear of the helicopter 12) project outwardly from opposite sides of the helicopter body. Outer plank end portions 26 and 28 have removable outer tip sections 26a,28a (shown in phantom in FIGS. 2 and 3) which are pivotable, about hinge lines 30 (see FIG. 4), relative to their associated plank portions 26 and 28.

When the armament apparatus 10 is utilized, the plank tip sections 26a,28a are removed, being shown in phantom in FIGS. 2 and 3 for reference purposes only. Mounting tab pairs 32 (see FIG. 4A) are formed on the outer ends of the plank portions 26 and 28 and, using suitable bolts, ball pins or expansion pins (not shown), are securable to corresponding tab pairs (also not shown) on the tip sections 26a,28a to attach these tip sections as illustrated and described in U.S. Pat. No. 4,966,063 to Sanderson et al.

Figure 4A:
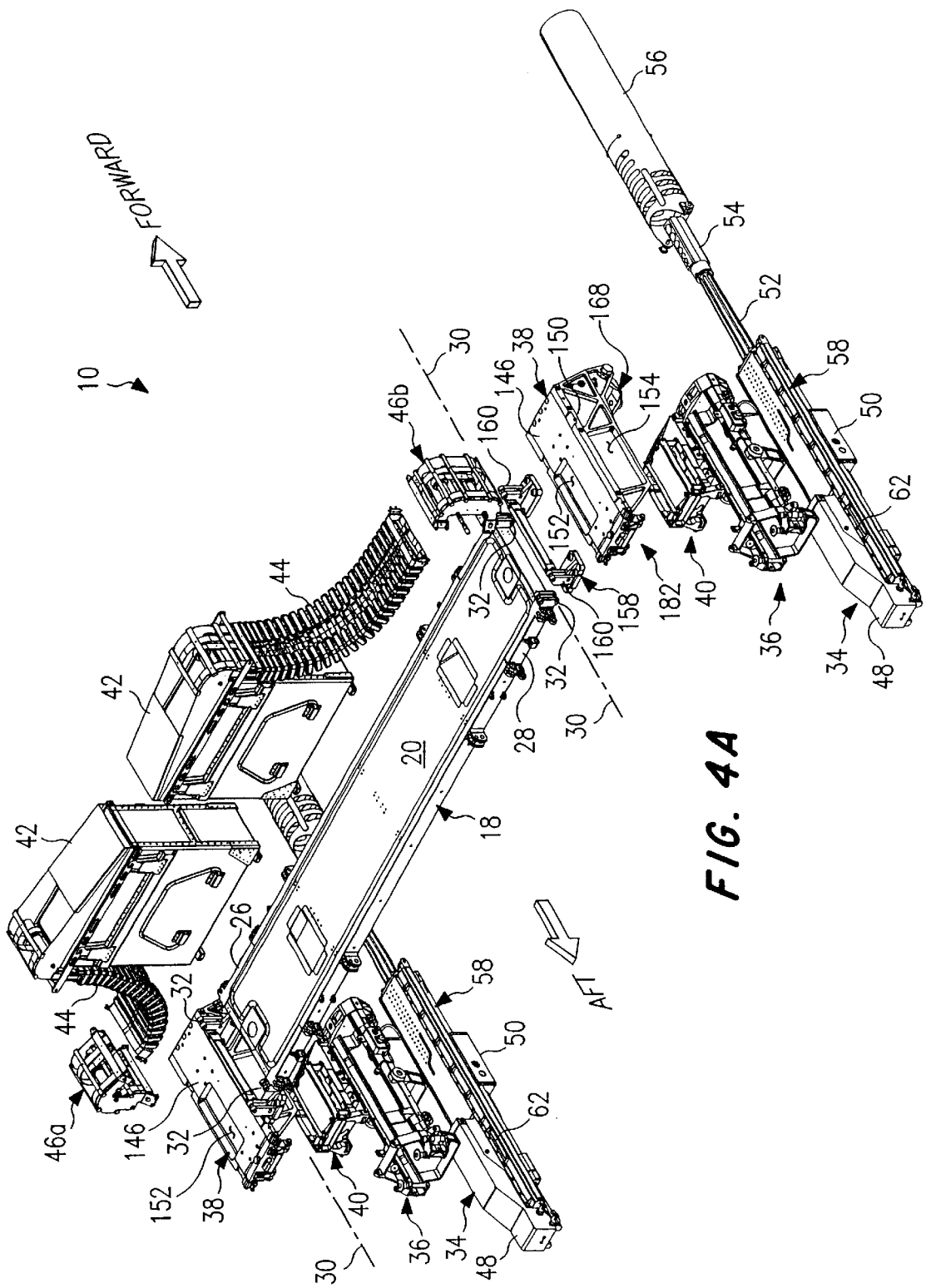
FIG. 4A is a slightly reduced scale exploded perspective view of the FIG. 4 armament apparatus.

Turning now to FIGS. 4 and 4A, in addition to the support plank 18 the armament apparatus 10 also includes below each opposite plank end portion 26 and 28 (1) a machine gun, representatively a 30 mm machine gun 34; (2) a mounting structure operative to secure the gun 34 to its associated plank end portion 26 or 28 and including specially designed cradle and mount structures 36 and 38, and (3) an ammunition feed structure 40.

Armament apparatus 10 further includes (4) a pair of 30 mm magazine boxes 42 secured to the top side of the central plank portion 20 and containing belted 30 mm ammunition (not shown); (5) a pair of elongated flex chute structures 44 through which the belted ammunition passes outwardly from its associated magazine box; and (6) a pair of internally rollered left and right feed adapters 46a,46b respectively interconnected between the left flex chute structure 44 and the left magazine box 42 (as viewed from the rear of the helicopter), and interconnected between the right flex chute structure 44 and the right magazine box 42.

Magazine boxes 42 are similar to those illustrated and described in U.S. Pat. No. 5,419,234 except that they are sized to accept 30 mm belted ammunition. Similarly, internally rollered feed adapters 46a,46b are similar to those illustrated in U.S. Pat. No. 5,419,234 but are sized and shaped to handle 30 mm belted ammunition. Flex chutes 44 are of a conventional construction.

Figure 5:
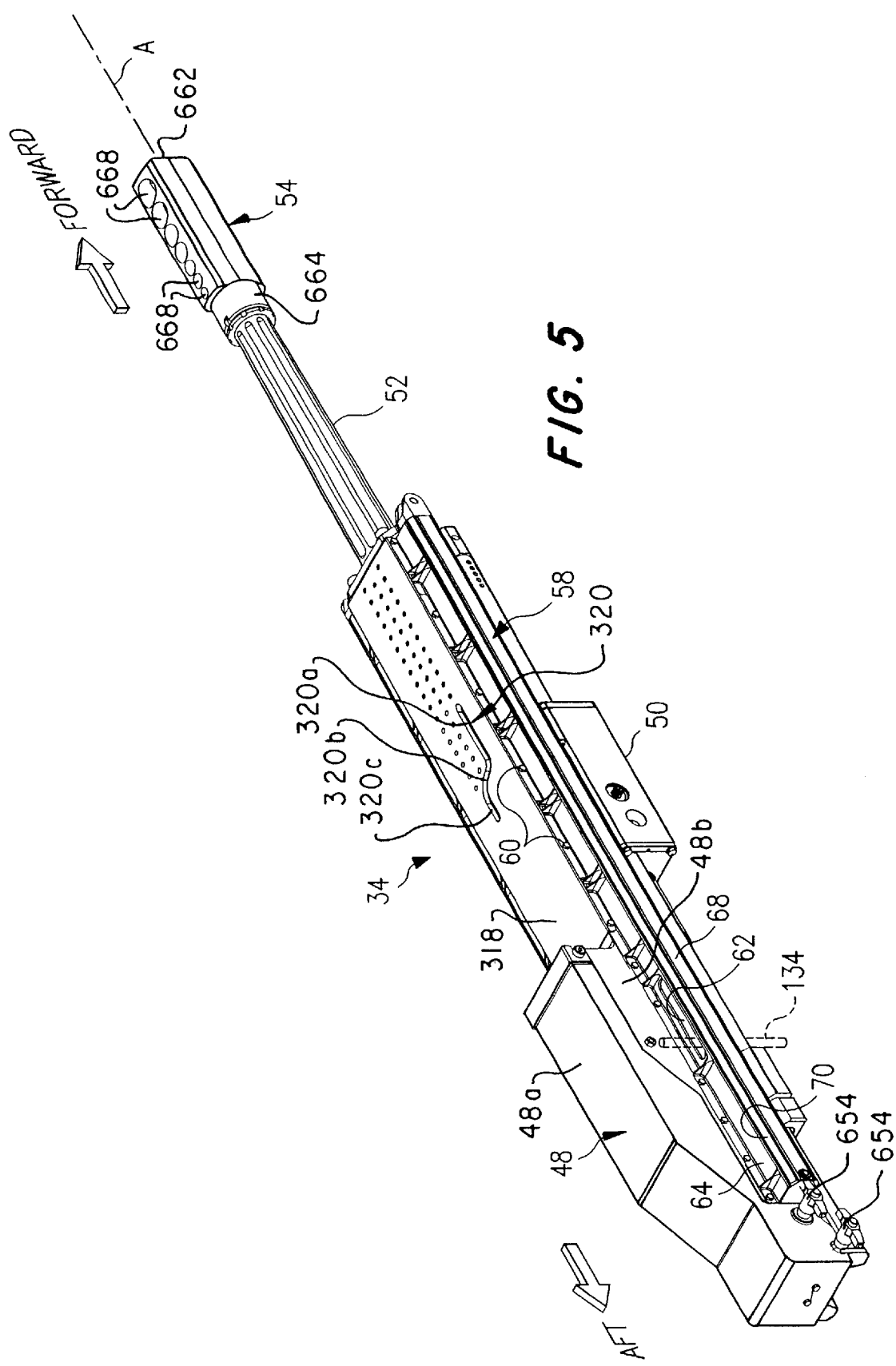
FIG. 5 is an enlarged scale perspective view of a machine gun portion of the armament apparatus.

Each 30 mm machine gun 34, as shown in FIG. 5, has a horizontally elongated, generally rectangularly cross-sectioned receiver or body portion 48, a charging and sear assembly housing 50 mounted on the underside of the receiver 48, a forwardly projecting barrel 52 with a muzzle brake 54 on its forward end and a firing axis A, and a blast suppressor tube 56 (see FIG. 4) coaxially circumscribing and projecting forwardly beyond the muzzle brake. Elongated recoil housings 58 are secured by screws 60 to opposite sides of the receiver 48 and extend longitudinally in front-to-rear directions along their lengths. For purposes later described herein, elongated slots 62 extend through the top and bottom side walls 64,66 of the recoil housings 58 (see FIG. 13) adjacent their rear ends.

Additionally, along their lengths, the recoil housings 58 have outer side walls 68 joined to their top and bottom walls 64,66 by sloping outer top and bottom corner wall portions 70, 72. Top corner wall portions 70 slope downwardly and outwardly at a 45 degree angle, and bottom corner wall portions 72 slope upwardly and outwardly at a 45 degree angle. Resilient recoil assemblies (not shown) are operatively disposed within the interiors of the recoil housings 58.

Turning now to FIGS. 6–9 and 13, each cradle 36 includes a laterally spaced pair of parallel left and right elongated support rail members 74 and 76 that longitudinally extend in front-to-rear directions. Each support rail member 74 and 76 has a generally vertically oriented outer side wall 78, a top edge wall 80 that slopes upwardly and inwardly toward the other support rail member at a 45 degree angle, and a bottom edge wall 82 that slopes downwardly and inwardly toward the other support rail member at a 45 degree angle. For purposes later described herein, rectangular cutout areas 84 are formed in each of the support rail edge walls 80 and 82 adjacent their front and rear ends.

Figure 6:
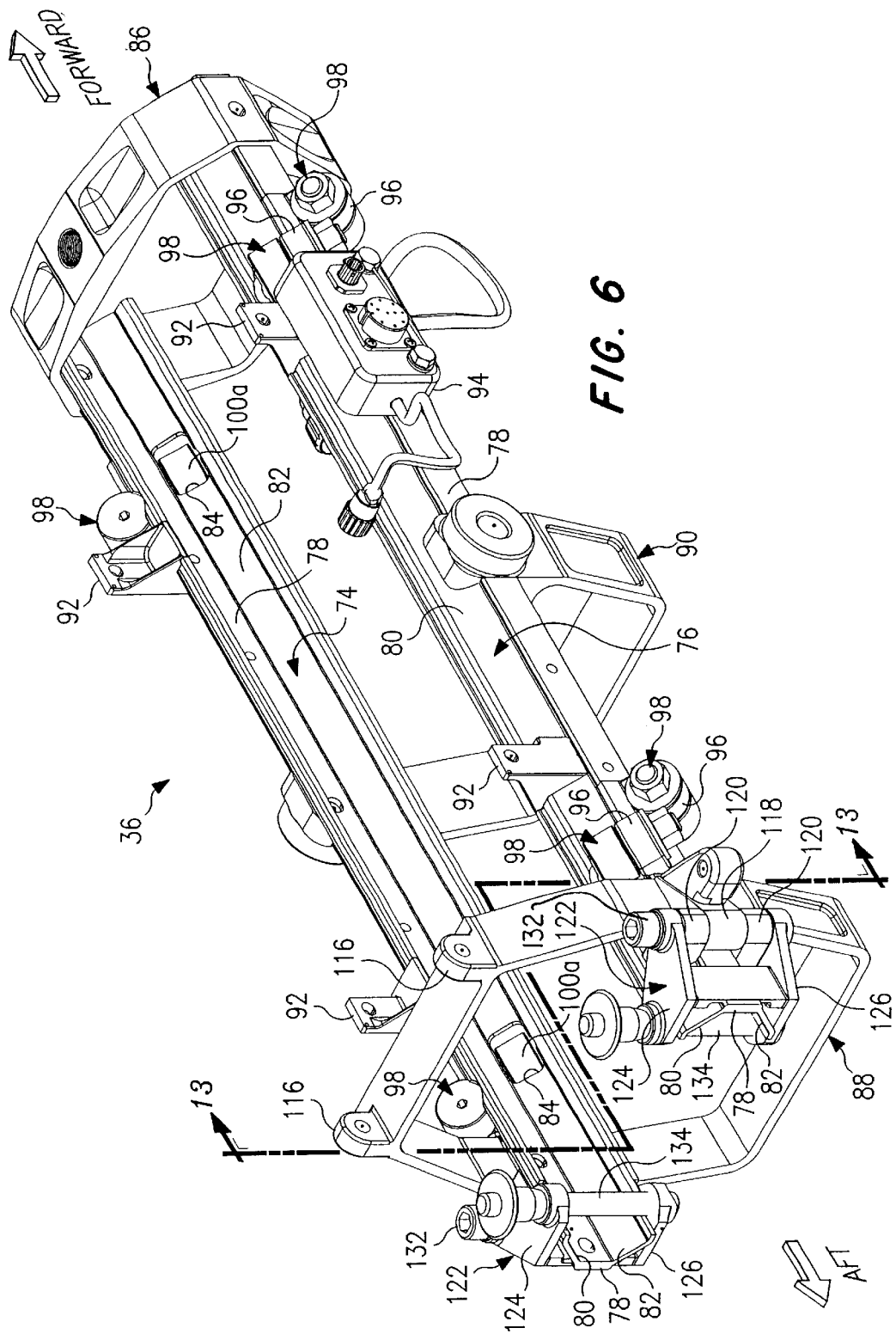
FIG. 6 is an enlarged scale aft end perspective view of a support cradle portion of the armament apparatus.

At their front ends the support rail members 74,76 extend through and are welded to opposite inner side surface portions of a forward ring structure 86. As later described herein, the forward ring structure 86 is used as a bore sighting gimbal ring. Rear end portions of the support rail members 74,76 extend through and are welded to opposite inner side surface portions of an aft ring structure 88, with rear end portions of the support rail members 74,76 extending rearwardly past the ring structure 88 as shown in FIGS. 6 and 7. An intermediate half ring structure 90 is positioned between the ring structures 86, 88 and has opposite upper end portions thereof welded to outer side surface portions of the support rail members 74,76.

Each of the support rail members 74 and 76 has, along its length, a spaced pair of upwardly projecting feeder attachment pads 92 secured thereto, and an electrical connection box 94 is suitably secured to an outer side portion of the right support rail member 76 adjacent its front end. As illustrated in FIGS. 6 and 7, apertured mounting bosses 96 project outwardly from outer side surface portions of the sloping top and bottom edge walls 80,82 of the support rail members 74 and 76 at the rectangular cutout areas 84 thereon. Bosses 96 are used to mount adjustable eccentric cam roller assemblies 98 at the cutout areas 84.

As best illustrated in FIGS. 8 and 9, each of the eight cam roller assemblies 98 used in each cradle structure 36 includes a roller member 100 having a threaded attachment stud 102 centrally secured thereto, a cylindrical bushing 104 with an eccentrically positioned circular opening 106 extending therethrough, a flat washer 108, and a nut 110. Each cam roller assembly 98 is attached to its associated support rail mounting boss 96 by positioning the bushing 104 in the opening of the boss 96, extending the stud 102 outwardly through the bushing opening 106, and then securing the washer and nut 108,110 to the outer end of the threaded stud 102.

Figure 13:
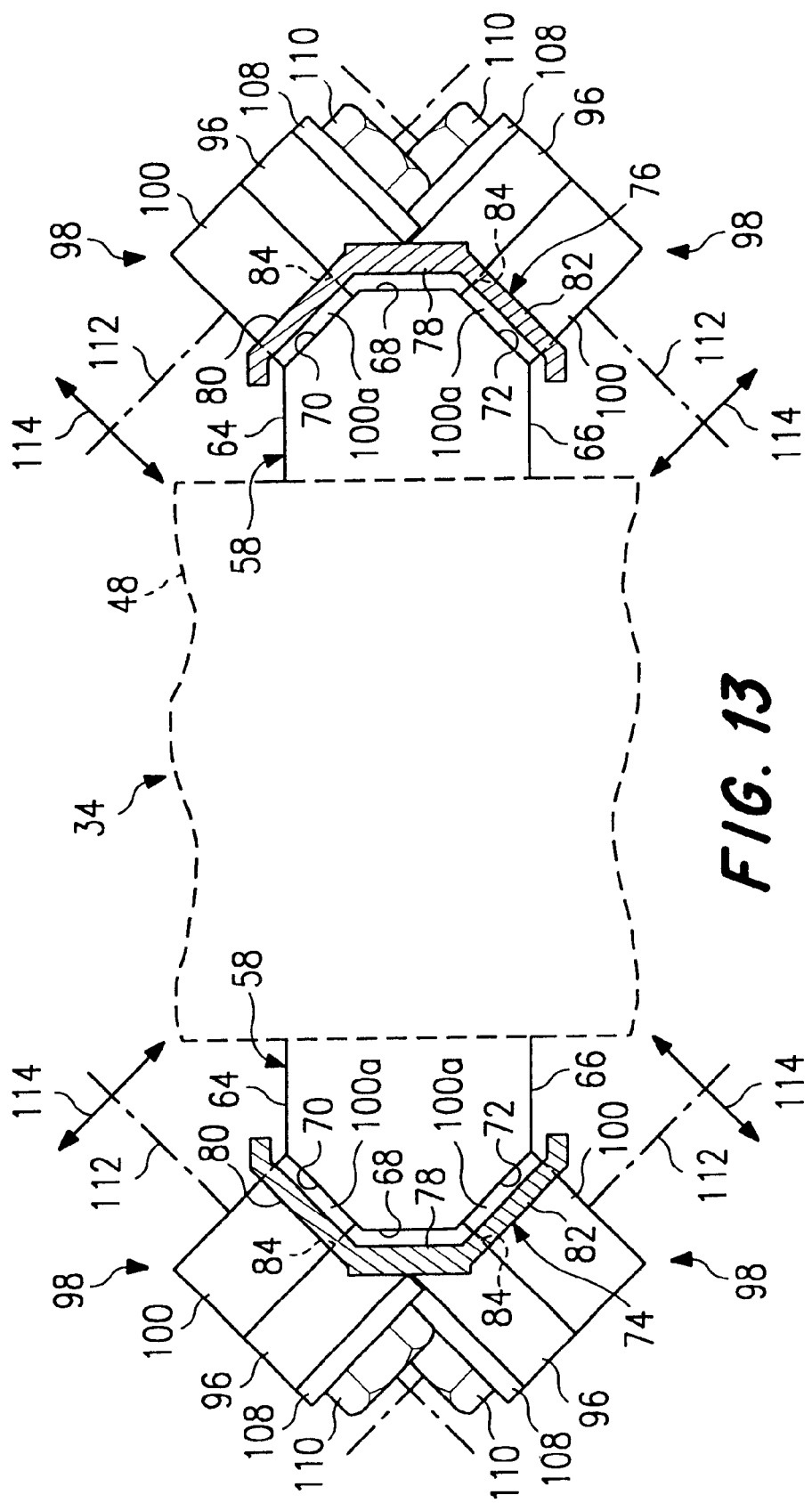
FIG. 13 is an enlarged scale, partially phantomed simplified cross-sectional view through the cradle structure, and the machine gun operatively supported therein, taken generally along line 13—13 of FIG. 6.

This positions the roller member 100 at an associated one of the support rail member cutout areas 84 in a manner permitting the roller member 100 to be laterally adjusted to cause a side portion 100a of the roller member 100 to project a selectively variable distance inwardly through its associated cutout area 84 and past the inner side surface of its associated support rail member (see FIGS. 6 and 13). Such adjustment of the roller member 100 relative to its associated support rail member is achieved by appropriately rotating the roller assembly boss 104 in the opening of its mounting boss 96, and then locking the rotationally adjusted boss 104 in place using, for example, a set screw (not shown). This adjustment of the roller members 100, as best shown in FIG. 13, laterally shifts their rotational axes 112 selected distances inwardly or outwardly, as indicated by the double-ended arrows 114, thereby correspondingly shifting the inwardly projecting roller member side portions 100a inwardly or outwardly relative to the inner side surfaces of their associated support rail member top and bottom edge walls 80 and 82.

With reference now to FIGS. 6 and 7, a spaced pair of upwardly projecting apertured mounting bosses 116 are formed on the top side of the aft ring structure 86, and a pair of outwardly projecting apertured mounting bosses 118 are formed on its opposite vertical side portions. Each of the bosses 118 extends through a corresponding vertically spaced pair of outwardly projecting apertured bosses 120 formed on rear end portions of the support rail members 74 and 76.

Positioned at the aft end of each of the support rail members 74,76 is a pin arm member 122 having a vertically spaced pair of top and bottom flanges 124,126 with apertures 128,130 in their outer ends. Pins 132,134 are respectively extendable through the vertically aligned flange opening pairs 128,130. Each pin arm member 122 is mounted on its associated rear support rail end portion by positioning the flange apertures 128 over the apertures in the mounting bosses 120, and then extending the pin 132 downwardly through the aligned openings in the flanges 124,126 and the openings in the bosses 118 and 120 as best shown in FIG. 6.

On each of the cradle structures 36 the two pins 134 extend through the flange apertures 130 in their associated pin arm member 122. Also, as schematically indicated in phantom in FIG. 5, the pins 134 extend vertically through the elongated slots 62 in the recoil housings. 58 on the opposite sides of the receiver 48 of the machine gun 34 which longitudinally extends through the cradle structure 36 between its left and right support rail members 74,76 as illustrated in simplified form in FIG. 13.

As shown in FIG. 13, outer side portions of the opposite pair of recoil housings 58 are complementarily received in the support rail members 74 and 76, with the suitably adjusted inwardly projecting roller portions 10a rollingly engaging the sloping top and bottom corner wall portions 70,72 of the recoil housings 58. This rolling engagement and support of the machine gun 34 within the cradle structure 36 serves to preclude appreciable lateral movement of the supported gun 34 relative to the cradle structure 36 while at the same time permitting the gun 34 to freely move longitudinally along the cradle structure interior during firing recoil and counter recoil motion of the gun, to the extent permitted by the pins 134 that extend through the recoil housing slots 62 as schematically illustrated in FIG. 5.

Figure 10:
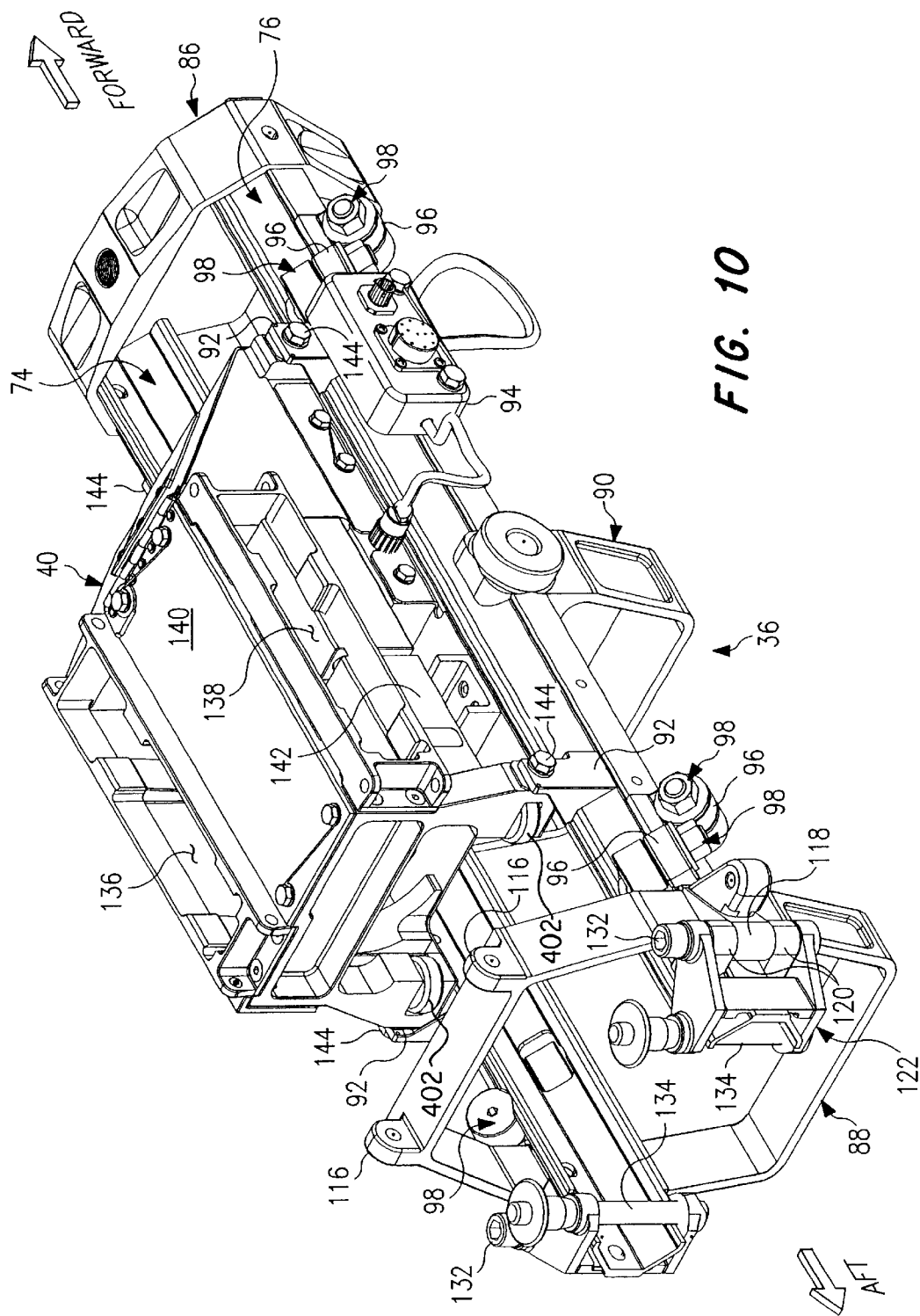
FIG. 10 is an enlarged scale aft end perspective view of the support cradle with ammunition feed structure portion of the armament apparatus secured to the top side of the cradle.

Referring now to FIG. 10, the ammunition feed structure 40 has a generally rectangular configuration, with elongated rectangular ammunition feed openings 136 and 138 being respectively formed in horizontal top wall and vertical side wall portions 140,142 of the feed structure. Each of the two feed structures 40 is secured to the top side of an associated cradle structure 36 by means of bolts 144 extending through the feeder attachment pads 92 into bottom corner portions of the ammunition feed structure 40. In a manner not pertinent to the present invention, and thus not described herein, the feed structures function to supply belted ammunition from the magazines 42 (see FIGS. 4 and 4A) to the machine guns 34 supported as described above within the cradle structures 36.

Figure 11:
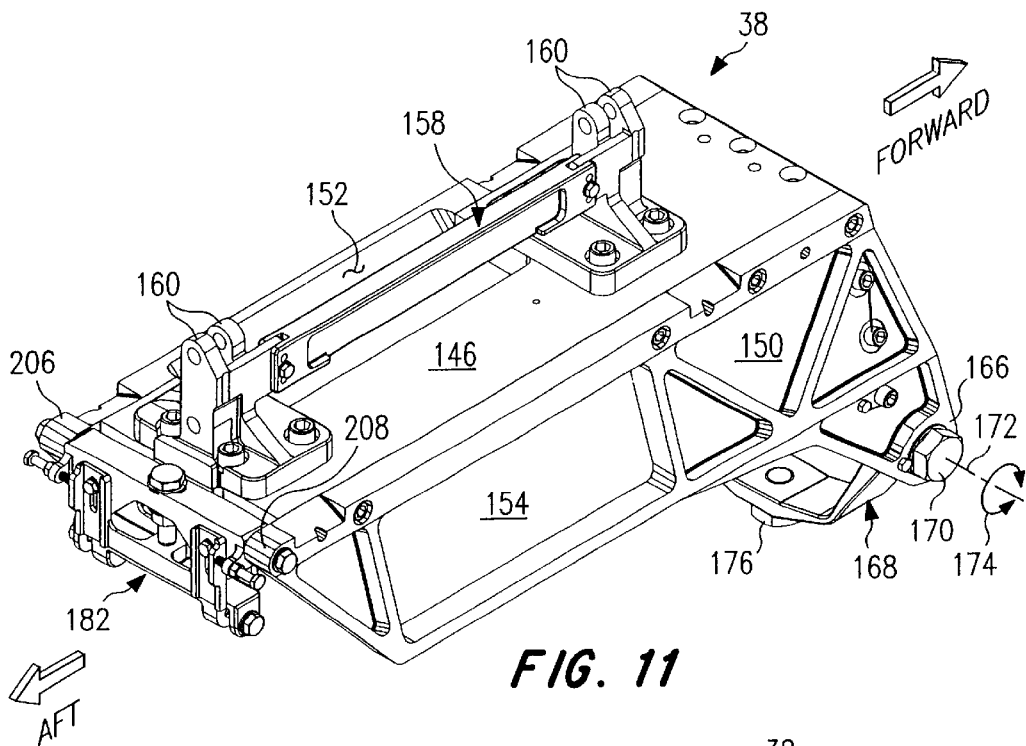
FIG. 11 is an enlarged scale aft end perspective view of a mount structure portion of the armament apparatus

The mount portion 38 of each of the two overall gun mounting structures is shown in FIGS. 11 and 12 and has a generally inverted U-shaped configuration defined by a generally rectangular top deck plate 146 and left and right side plates 148,150 respectively depending from left and right side edge portions of the deck plate 146. Elongated rectangular ammunition feed openings 152,154 are respectively formed in aft portions of the top deck plate 146 and the right side plate 150. As can be seen in FIG. 12, a front bulkhead plate 156 extends between forward end portions of the side plates 148 and 150.

Figure 11A:
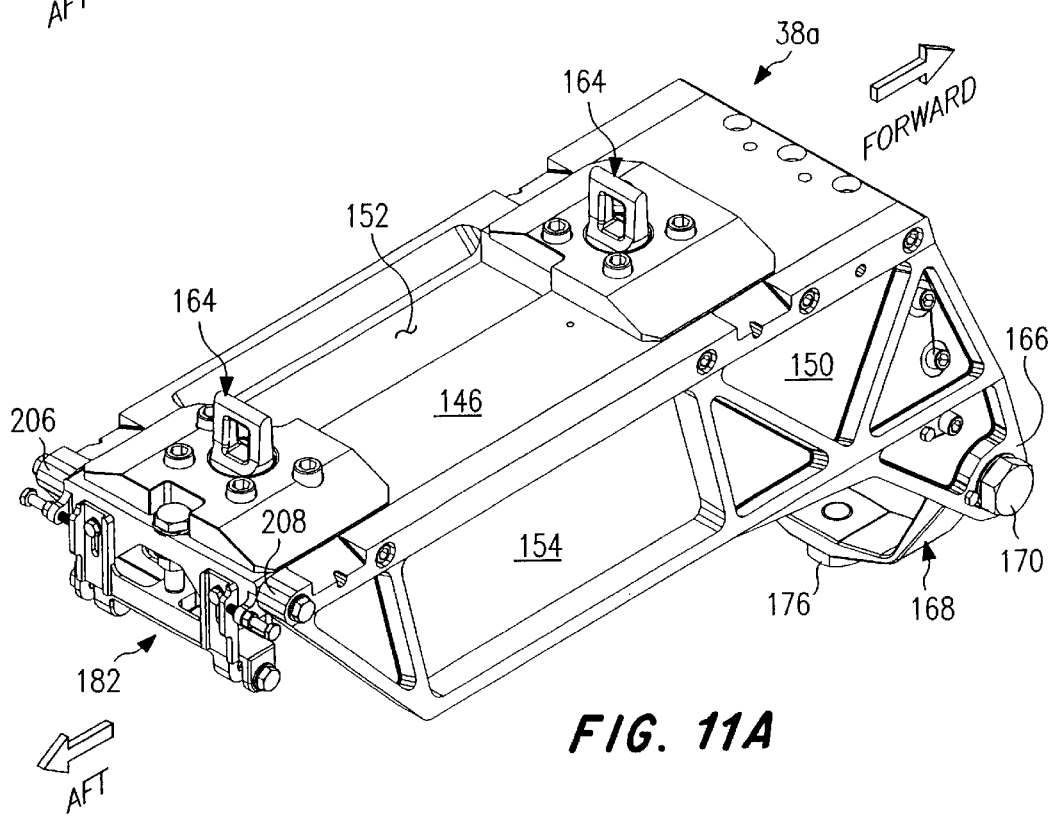
FIG. 11A is an aft end perspective view of an alternate embodiment of the mount structure.

Each of the two mount structures 38 is hung from one of the outer plank end portions 26,27 at its hinge line 30 (see FIGS. 4 and 4A) using a hinge line adapter structure 158 bolted to the top side of the deck plate 146 and including two spaced pairs of upwardly projecting tabs 160. Each tab pair 160 is interdigitated with a corresponding tab pair 32 on the associated plank end (see FIG. 4A) and releasably secured thereto using suitable retaining pin members 162 (see FIG. 4) extended through the interdigitated tab pairs. An alternate embodiment 38a of the mount structure 38 is illustrated in FIG. 11A and is identical to the mount structure 38 with the exception that the hinge line adapter structure 158 is replaced with a pair of bomb lug adapter structures 164 that may be removably secured to corresponding conventional bomb rack structures (not shown herein) mounted on the plank end portions 26 and 28.

The mount structure 38 is secured to the cradle structure 36, over the feed structure 40 (see FIG. 10), at forward and aft portions of the mount structure 38 in a manner which will now be described with continuing reference to FIGS. 11 and 12. Lower forward corner portions 166 of the side plates 148,150 are positioned outwardly over opposite left and right side portions of an outer gimbal ring member 168 and secured thereto by bolts 170 which extend inwardly through openings in the corner portions 166 and are threaded into the ring 168. Bolts 170 are rotatably received in the corner portion openings in a manner permitting the outer gimbal ring 168 to rotate relative to the mount structure 38 about a horizontal axis 172 as indicated by the double-ended arrows 174 in FIGS. 11 and 12.

The forward cradle end ring 86, as best illustrated in FIG. 12, serves as an inner gimbal ring and is received within the outer gimbal ring portion 168 of the mount structure 38. A diametrically opposite pair of bolts 176 extend inwardly through openings in top and bottom portions of the outer gimbal ring 168 and are threaded into top and bottom side portions of the inner ring 86. Bolts 176 are rotatable within their associated outer ring openings and thus permit the inner gimbal ring 86 to rotate relative to the outer ring 168 about a vertical axis 178 as indicated by the double-ended arrows 180 in FIG. 12.

Inner and outer gimbal rings 86 and 168, as described above, permit the cradle 36 (and thus the machine gun 34 supported by the cradle 36) to be rotated relative to the mount structure 38 about the horizontal and vertical axes 172,178 at a forward end of the mount structure 38 to thereby selectively adjust the gun bore sight elevation and azimuth angles. These elevation and azimuth angles may be selectively adjusted and then locked in by means of a specially designed bore sight adjustment subassembly 182 which is supported on an aft end portion of the mounting structure top deck plate 146 and interconnects aft end portions of the mounting structure 38 and cradle 36 as will now be described in conjunction with FIGS. 14 and 14A.

The bore sight adjustment subassembly 182 is of a quite simple construction, comprising only two primary parts—(1) an upper bracket member 184, and (2) a lower bracket member 186. The upper bracket member 184 has a generally rectangular body portion 188 which is elongated in a left-to-right direction and has downwardly thickened left and right end portions 190,192 with end surfaces 194 and 196. Slots 198,200 are elongated in left-to-right directions and pass in front-to-rear directions through the end portions 190,192. Additionally, a slot 202 extends downwardly through a longitudinally central portion of the body 188 and is elongated in a left-to-right direction.

Upper bracket member 184 is positioned in a top rear end cutout area 204 of the mount structure 38 between rearwardly projecting top left and right corner portions 206,208 of the side plates 152 and 150, and is pivotally secured to the corner portions 206,208 by bolts 210,212 extending through the corner portions 206,208 and threaded into openings 214 extending inwardly into the opposite end surfaces 194,196 of the body 188. A pair of rearwardly projecting apertured retaining ears 216 are formed on the left and right body end portions 190,192 and have adjustment bolts 218 extending horizontally inwardly therethrough and provided with jam nuts 220 on the outer sides of the ears 216. A larger adjustment bolt 222 passes downwardly through the top side body slot 202, through a flat washer 224, and is threaded through a jam nut 226.

The lower bracket member,186 has a generally U-shaped configuration defined by a generally rectangular body portion 228 elongated in a left-to-right direction and having an upwardly thickened longitudinally central section 230, and laterally spaced front and rear support plate pairs 232,234 projecting upwardly from opposite end portions of the body 228. Vertically elongated slots 236,238 are respectively formed in the front and rear support plates 232 and 234, and adjustment ears 240 project rearwardly from upper portions of the rear support plates 234. Projecting downwardly from each of the opposite ends of the lower bracket member body 228 are longitudinally spaced apertured mounting tab pairs 242,244.

Figure 14:
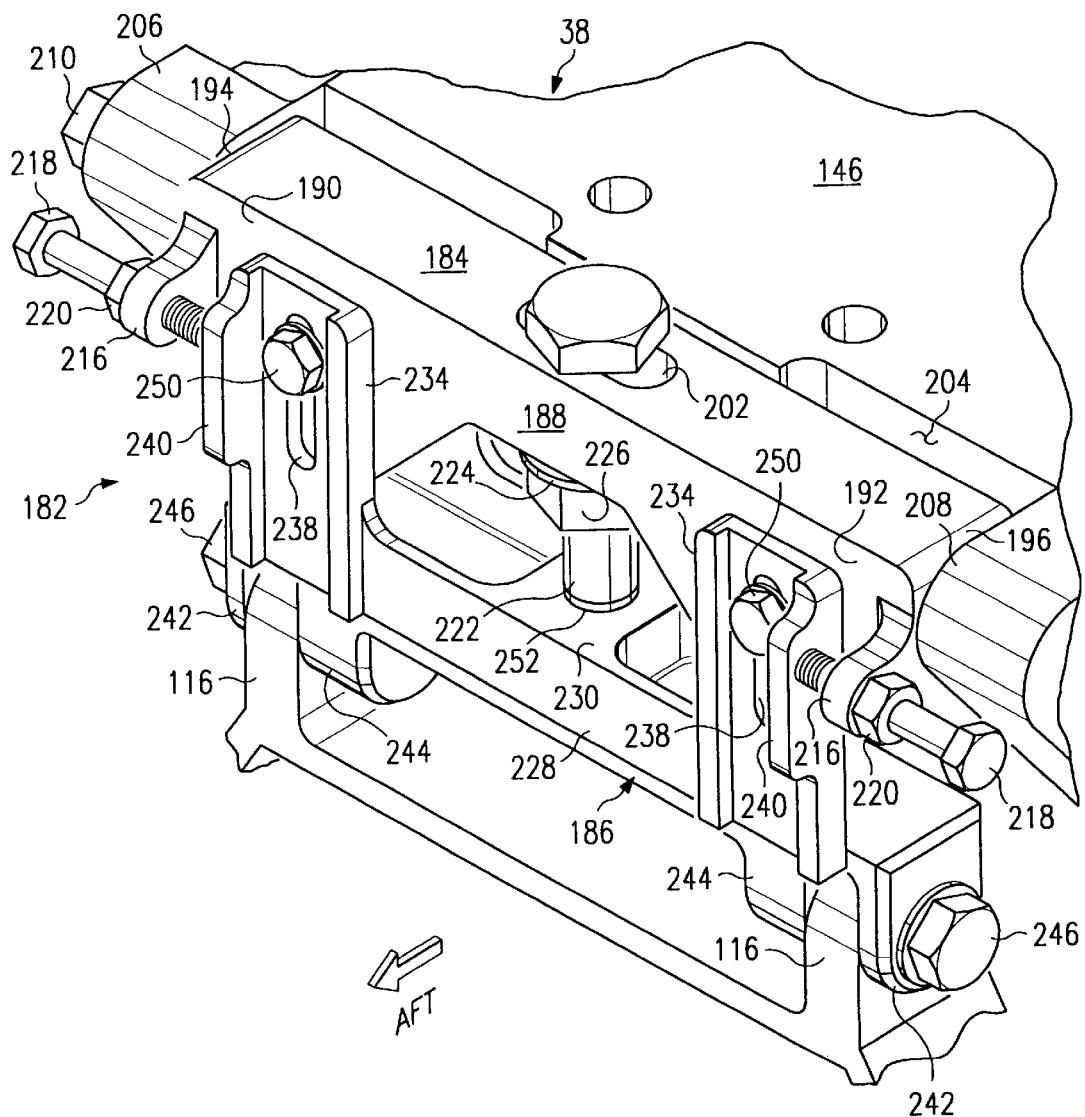
FIG. 14 is an enlarged scale aft side perspective view of a bore sight adjustment subassembly attached to the mount portion.
Figure 14A:
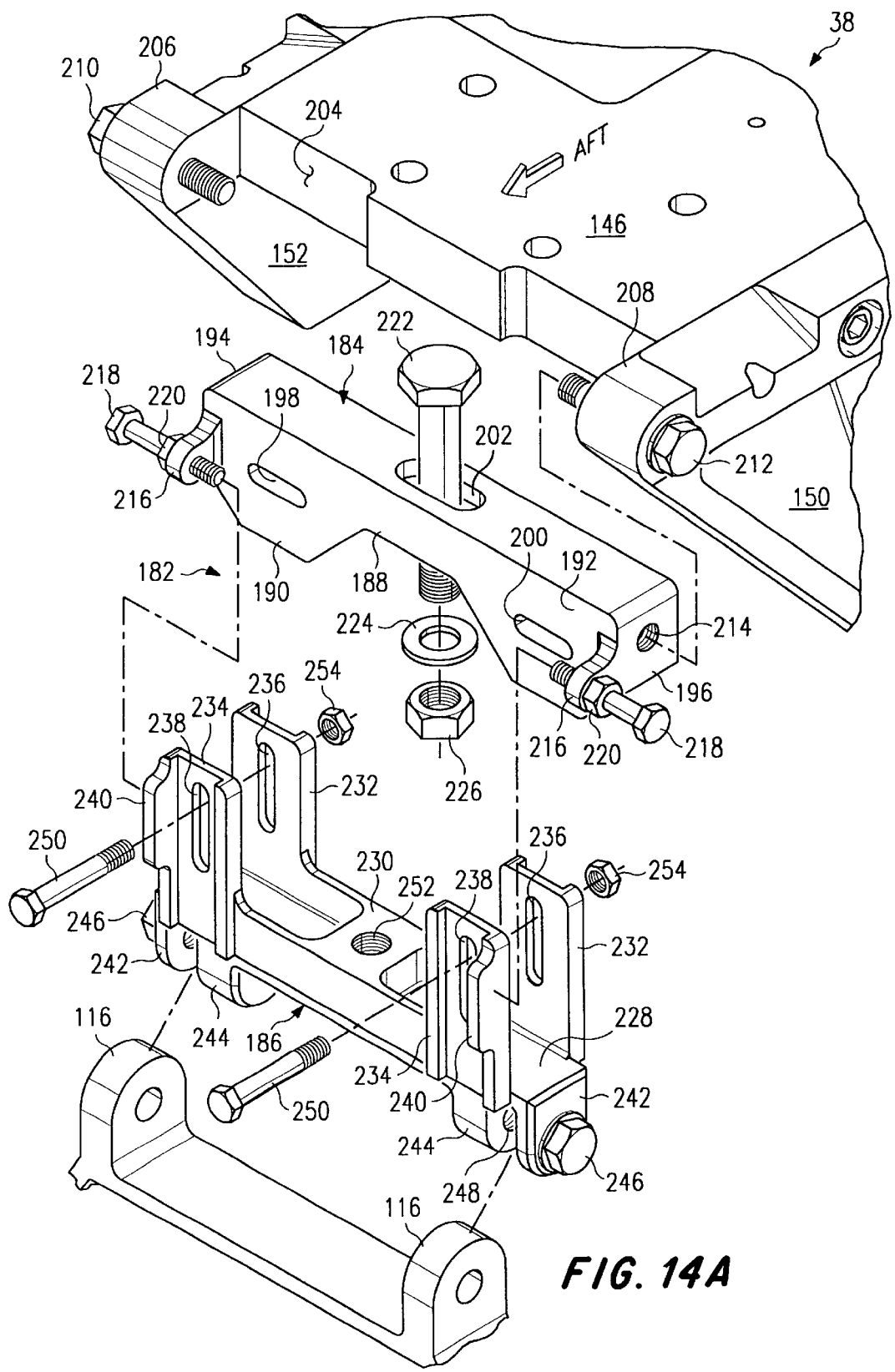
FIG. 14A is an exploded perspective view of the bore sight adjustment subassembly.

Lower bracket member 186 is pivotally secured to an aft end portion of the cradle structure 36 by passing the aft ring structure mounting bosses 116 (see also FIGS. 6 and 7) upwardly into the spaces between the downwardly projecting lower bracket member tab pairs 242,244 (see FIG. 14) and then passing connecting bolts 246 inwardly through apertures in the tabs 242 and bosses 116 and threading the inner ends of the bolts 246 into threaded openings 248 in the tabs 244 (see FIG. 14A). The opposite end portions 190,192 of the upper bracket member 184 are slidably received between the lower bracket member front and rear support plate pairs 232,234 in a manner permitting relative horizontal and vertical sliding movement between the nested upper and lower bracket members 184,186.

Still referring to FIGS. 14 and 14A, the nested upper and lower bracket members 184,186 are releasably retained in selectively variable vertical and left-to-right horizontal orientations relative to one another by the vertical adjustment bolt 222, the horizontally oriented adjustment bolts 218, and a pair of horizontally oriented adjustment bolts 250. The lower end of the vertical bolt 222 is threaded into an internally threaded opening 252 in the central section 230 of the lower bracket member body 228 and is locked in its rotational orientation by the jam nut 226, and the inner ends of the adjustment bolts 218 bear against the outer sides of the ears 240, with the bolts 218 being locked in their rotational orientations by their associated jam nuts 220. The adjustment bolts 250 forwardly pass sequentially through the vertical support plate slots 238, the horizontal upper bracket member slots 198, and the vertical support plate slots 236, and are threaded into nuts 254 positioned on the front sides of the lower bracket member front support plates 232.

It can be seen that with the bolts 218,222 and 250 loosened the lower bracket member 186 may be vertically moved relative to the upper bracket member 184, thereby correspondingly moving an aft portion of the cradle structure 36 vertically relative to an aft portion of the mount structure 38. This, in turn, causes the cradle structure 36 (and thus the machine gun 34 supported therein) to pivot about the horizontal front gimbal axis 172 (see FIG. 12) in a manner correspondingly varying the gun's bore sight elevational angle. Also, the lower bracket member 186 may be moved horizontally in a left-to-right direction relative to the upper bracket member 184, thereby correspondingly moving an aft portion of the cradle structure 36 horizontally relative to an aft portion of the mount structure 38. This, in turn, causes the cradle structure 36 (and thus the machine gun 34) to pivot about the vertical front gimbal axis 178 (see FIG. 12) in a manner correspondingly varying the gun's bore sight azimuth angle.

As an example, with reference to FIG. 14, to change the gun's azimuth angle the jam nut 226 and the bolts 218 and 250 are loosened, and the lower bracket member is slid leftwardly or rightwardly as needed relative to the upper bracket member 184. The jam nut 226 and the bolts 218 and 250 are then retightened to hold the gun in its new azimuth-adjusted position.

Similarly, to adjust the elevation angle of the gun, the jam nut 226 and the bolts 218 and 250 are loosened, and the vertical bolt 222 is tightened or loosened in the threaded body opening 252 as necessary to raise the lower bracket member 186 relative to the upper bracket member 184, or permit the lower bracket member 186 to be moved downwardly relative to the upper bracket member 184. The jam hut 226 and the bolts 218 and 250 are then retightened to hold the gun in its new elevation-adjusted position.

Referring now to FIGS. 4, 4A, 10 and 11, in the overall armament apparatus 10 (see FIGS. 4 and 4A) the feed chute adapters 46a,46b are similar in construction and operation to those illustrated and described in the aforementioned U.S. Pat. No. 5,419,234 but are sized to handle 30 mm ammunition. The left feed chute adapter 46a has a generally L-shaped configuration, with its open top end being operatively connected to the outer end of the left flex chute structure 44, and its open bottom end being coupled to the left feed structure 40 via the top openings 152,136 in the left mount structure 38 (see FIG. 11) and the left feed structure 40 (see FIG. 10). The right feed chute adapter 46b has a generally U-shaped configuration, with its open top end being operatively connected to the outer end of the right flex chute structure 44, and its open bottom end being coupled to the right feed structure 40 via the side openings 154,138 in the. right mount structure 38 (see FIG. 11) and the right feed structure 40 (see FIG. 10).

The unique machine gun mounting structure just described, which serves to support the machine guns 34 on the outer plank end portions 26 and 28, provides several advantages over conventionally constructed external aircraft machine gun mounting apparatus. For example, the axis-adjustable roller support of the cradle-mounted machine gun 34 firmly precludes appreciable lateral movement of the gun relative to its cradle structure 36, and thus with respect to the overall mounting structure, while permitting free longitudinal travel of the gun relative to the mounting structure. This precise lateral support of the gun permits the weapon system shown in FIG. 4 to be a "point" weapon system instead of a decidedly less accurate "area" weapon system.

Moreover, the pin and slot connection of the cradle structure 36 to its associated gun 34 permits the gun 34, during firing thereof, to move through a substantially longer recoil and counter recoil stroke than conventional 30 mm machine guns, thereby reducing the maximum firing forces transmitted to the mounting structure and to the support plank. Aiding this recoil force reduction is the unique mounting of the feed structure 40 to the stationary mounting structure instead of on the gun 34 for recoil and counter recoil longitudinal reciprocation therewith.

Complementing the firing accuracy improvement obtained by the previously described roller-support of the cradle mounted machine gun is the simplicity and accuracy of the aft-mounted bore sight adjustment structure 182 that, with the forward cradle-to-mount gimbaling system, provides for rapid, easy and reliable firing elevation and azimuth angle adjustment of the gun.

While the mounting structure described herein has been representatively illustrated and described in conjunction with 30 mm machine guns, it will be readily appreciated by those skilled in the aircraft armament art that the principles of the present invention could be advantageously applied to other types of machine guns as well if desired.

Gun Structure and Operation

The basic structure and operation of one of the guns 34 will now be generally described primarily with reference to FIGS. 15–44 which sequentially illustrate the movement of the gun components through a single feed and firing cycle of the gun. As used herein with respect to components of the gun, the terms "left" and "right" are as viewed from the rear of the gun with the top side of the gun facing upwardly.

Figure 15:
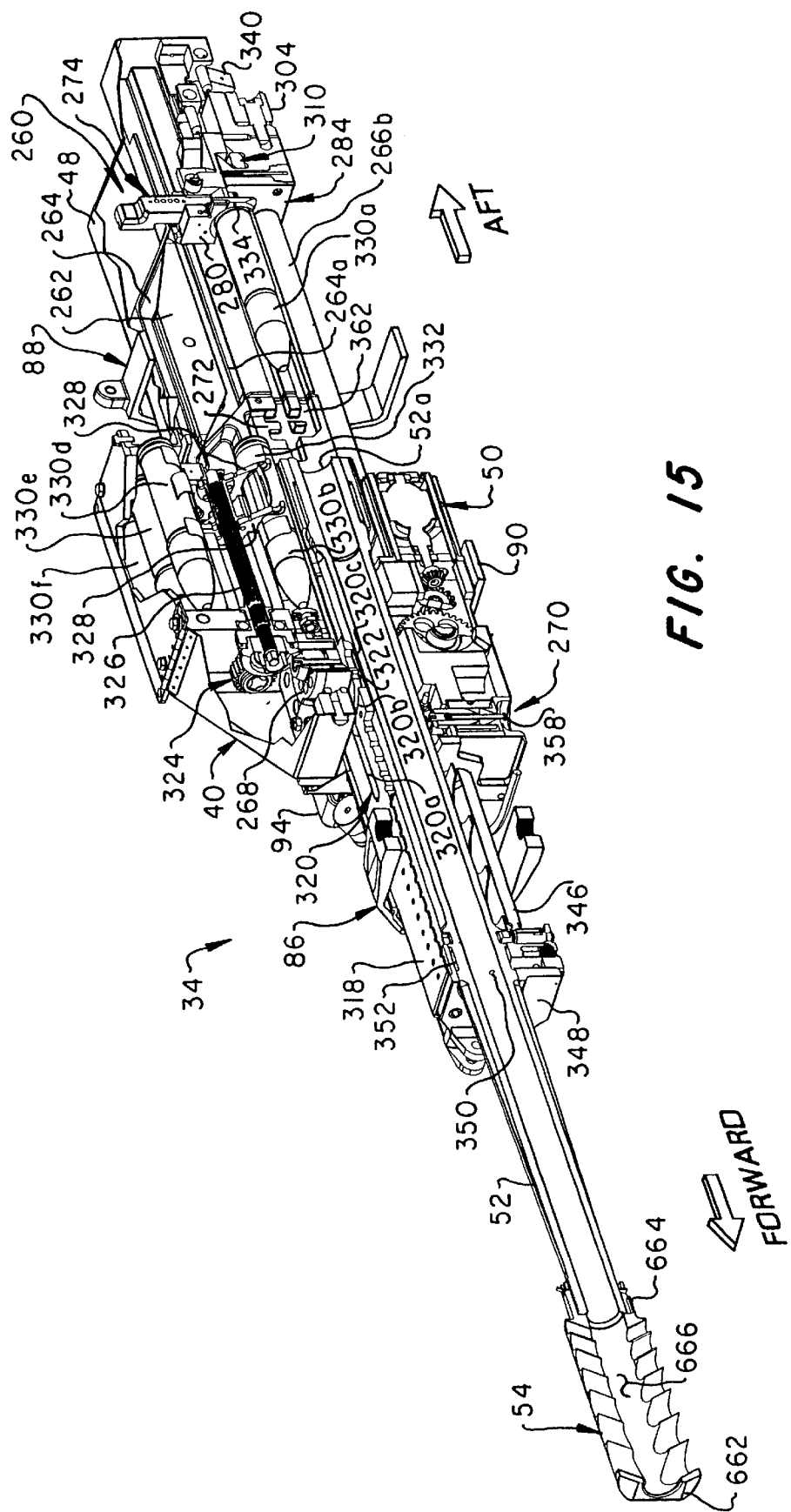
FIG. 15 is a laterally cut away left front perspective view of one of the 30 mm machine guns with its components in their open bolt, ready-to-fire orientations.
Figure 16:
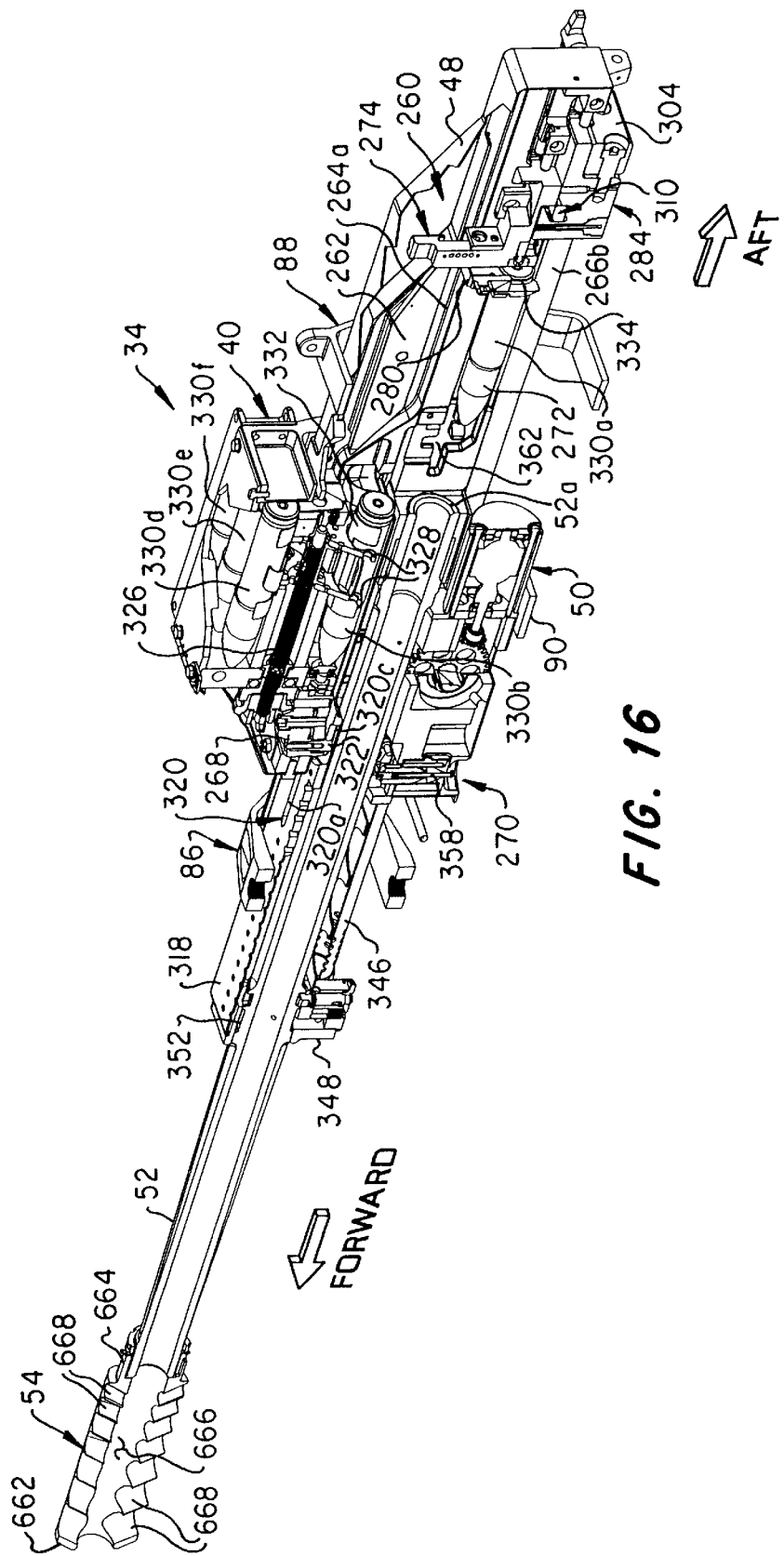
FIG. 16 is a laterally cut away left rear perspective view of the gun with its components in their open bolt, ready-to-fire orientations.

Generally, the machine gun 34 is of a gas-operated, electrically fired construction. Referring initially to FIGS. 15 and 16, in addition to the previously mentioned components thereof the gun 34 includes, generally from its aft end to its forward end, a bolt unit 260; opposing left and right pivotally mounted switch plates 262 (only the right one being shown in the drawings) each surrounded by a generally parallelogram-shaped cam track 264; a side-by-side pair of hollow left and right operating rods 266a and 266b (only the right operating rod 266b being visible in FIG. 15); a rotatable feed drum 268 mounted in a lower forward portion of the feed structure 40 above the barrel 52; and a sear assembly 270 carried in a front end portion of the charger and sear assembly housing 50 below the barrel 52. Immediately rearwardly of the inner end portion 52a of the barrel 52, which forms the chamber of the gun, is a breech portion 272 of the overall gun body structure which carries the barrel 52.

Figure 18:
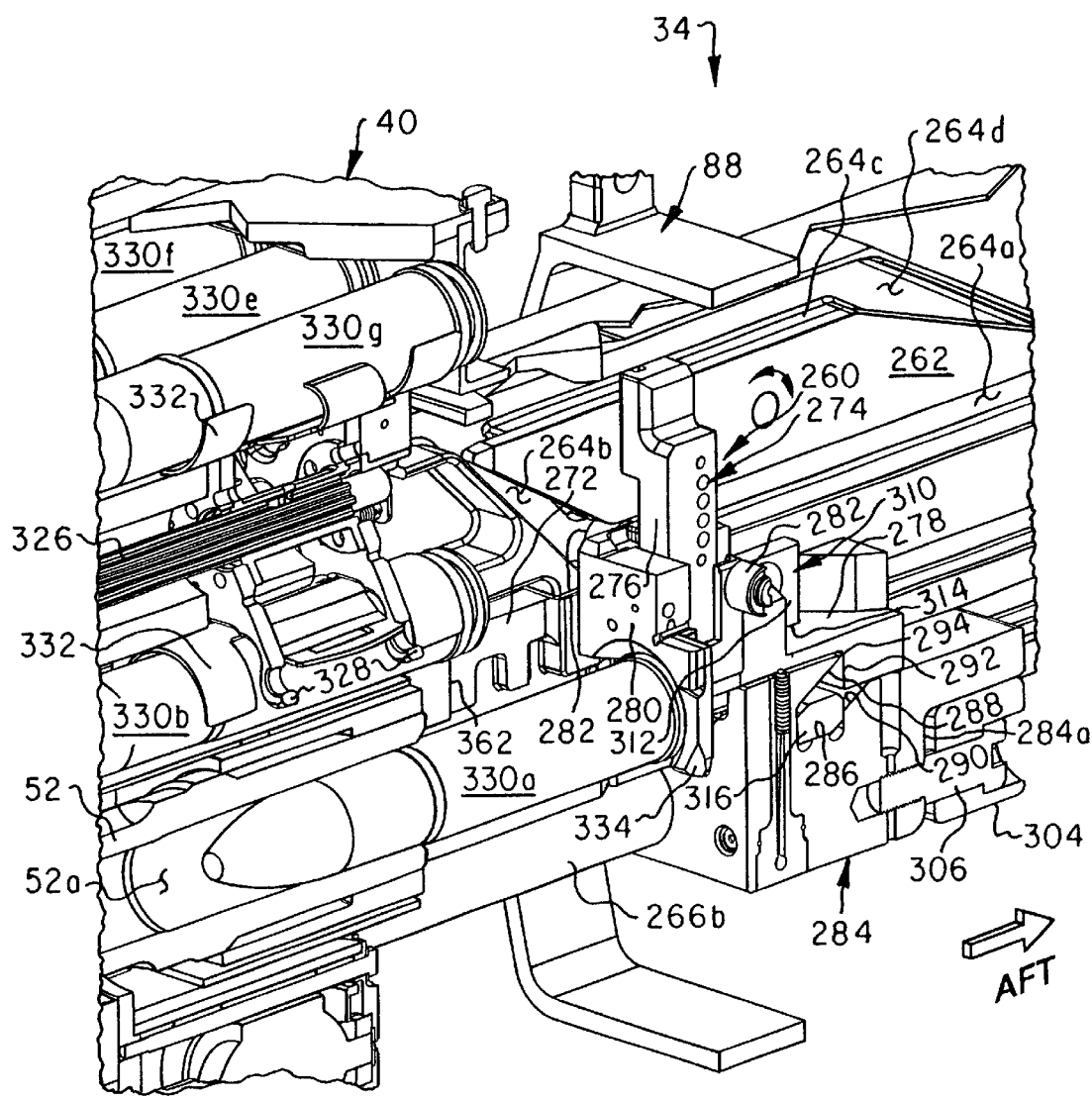
FIG. 18 is an enlarged scale perspective detail view of the bolt, lock and feed system portions of the gun in their FIG. 17 positions.
Figure 45:
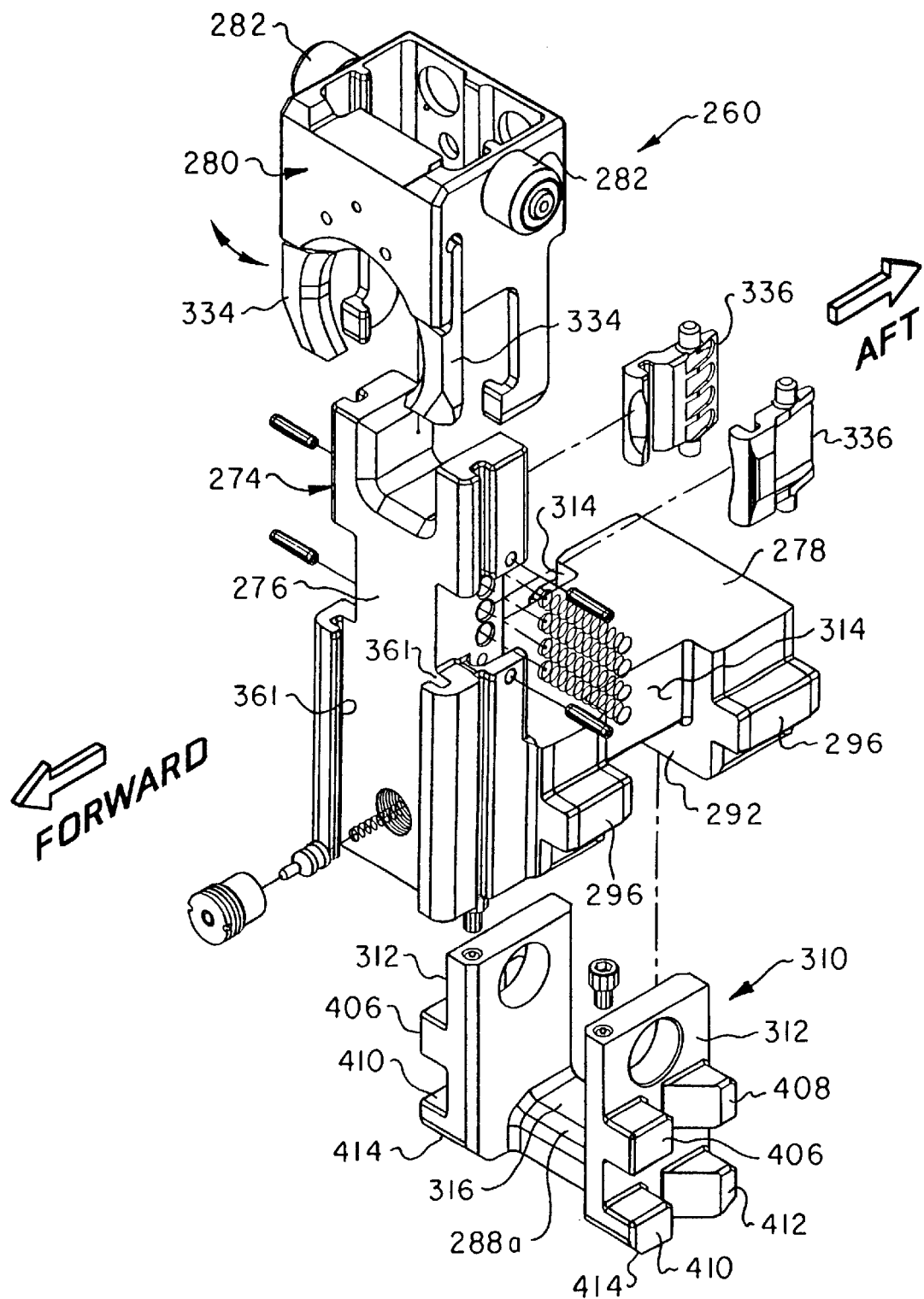
FIG. 45 is an enlarged scale exploded perspective view of the bolt unit.

Turning now to FIGS. 18 and 45, the bolt unit 260 includes a vertically elongated bolt member 274 having an upwardly projecting vertical portion 276 and a rearwardly projecting horizontal portion 278, and a bolt face member 280 carried on the bolt member portion 276 for forward and rearward movement therewith and vertical movement relative thereto. Left and right side rollers 282 are carried on the bolt face member 280. The rear ends of the hollow left and right operating rods 266a and 266b are anchored to an operating rod body structure 284 that underlies the horizontal portion 278 of the bolt member 274. A top side portion of the body structure 284 has a cutout area 286 with opposing upper and lower cam surfaces 288,290 that are rearwardly and upwardly inclined. A forwardly facing vertical ledge surface 292 formed on the bolt member portion 278 opposes a rearwardly facing abutment surface 294 on the operating rod body structure 284.

Figure 25:
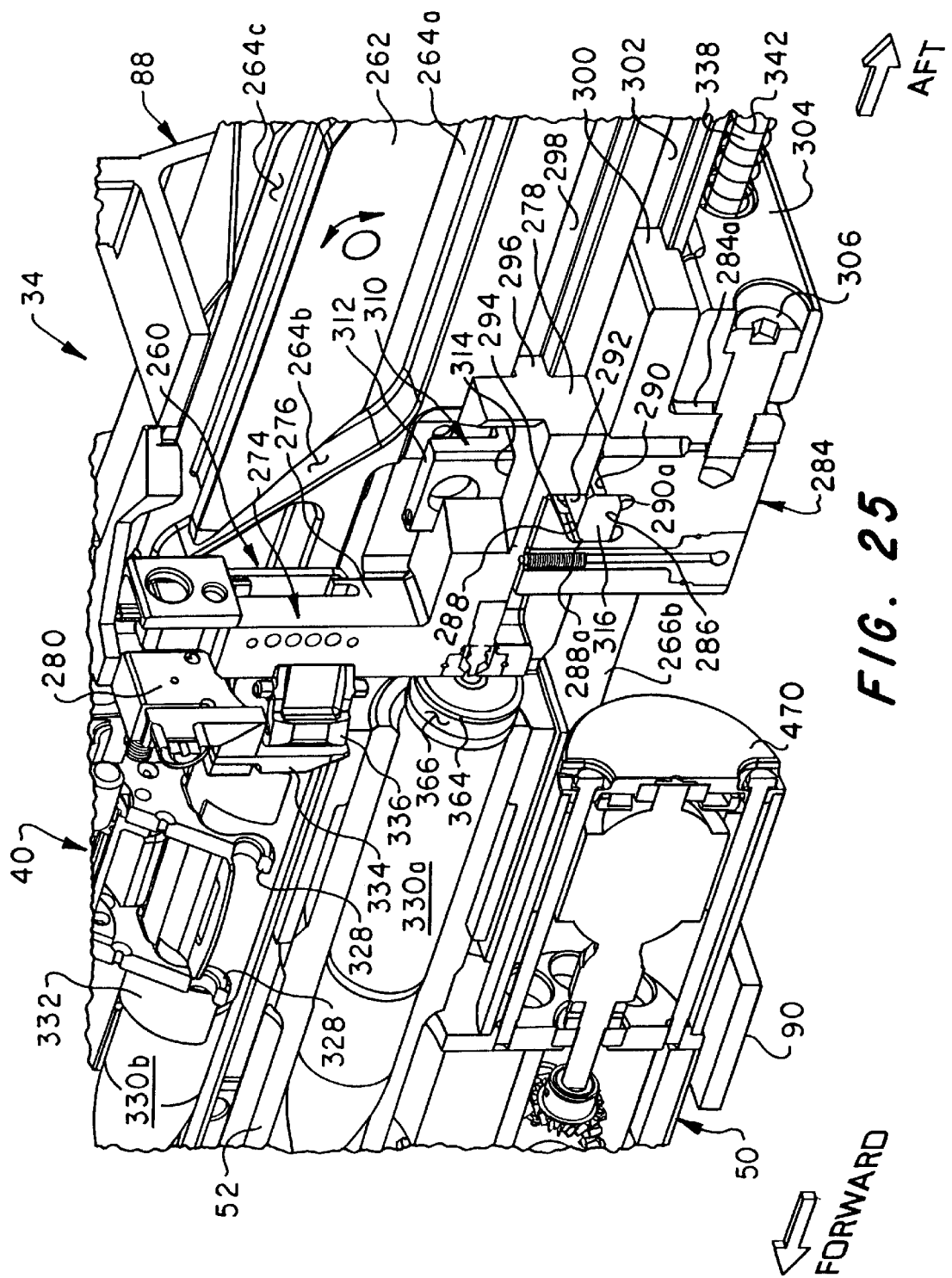
FIG. 25 is rear perspective view of the bolt and feed portions of the gun shown in FIG. 24.
Figure 26:
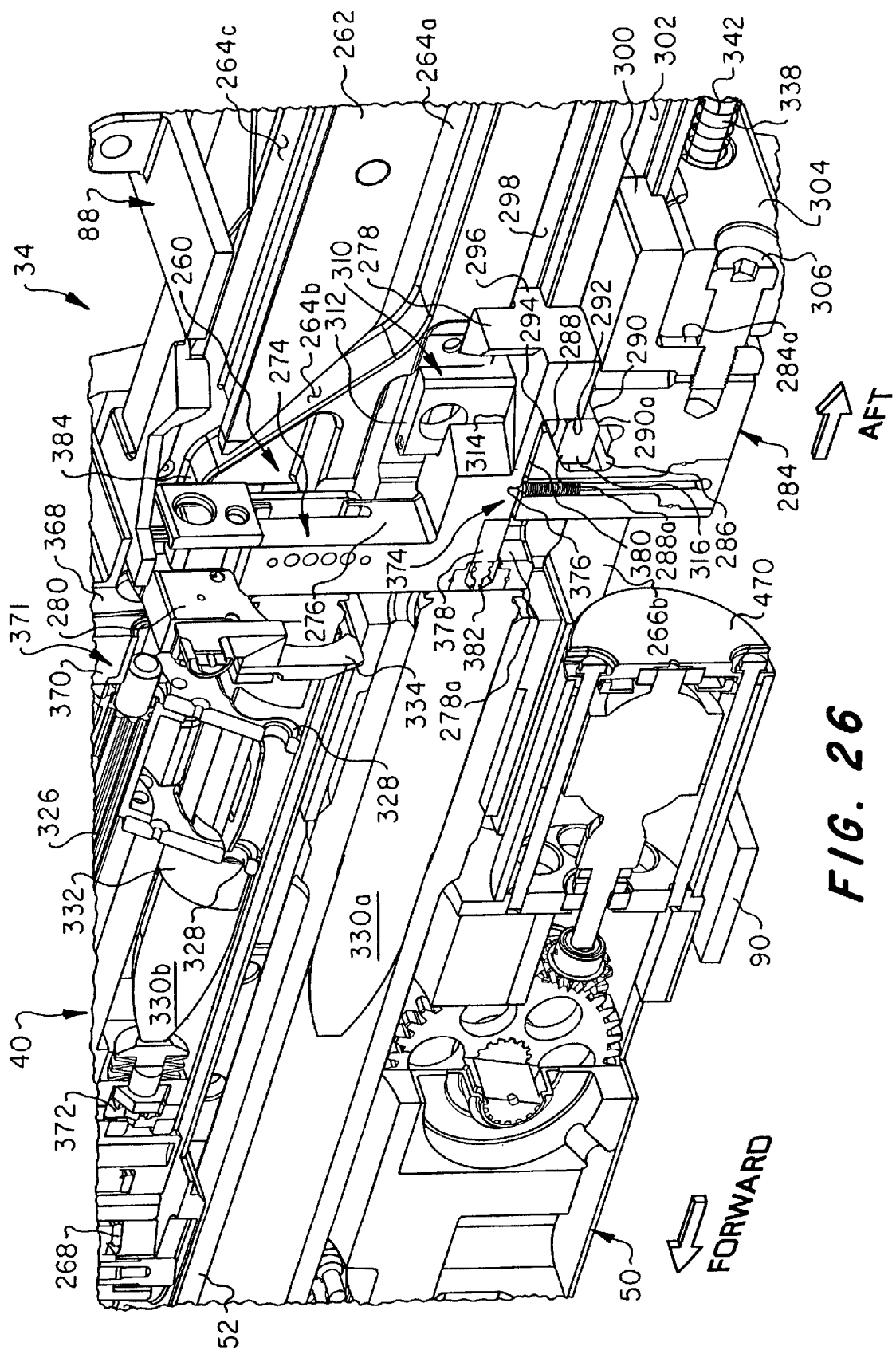
FIG. 26 is a rear perspective view similar to that in FIG. 25 but showing the bolt unit "locking up" into the breech of the gun.
Figure 27:
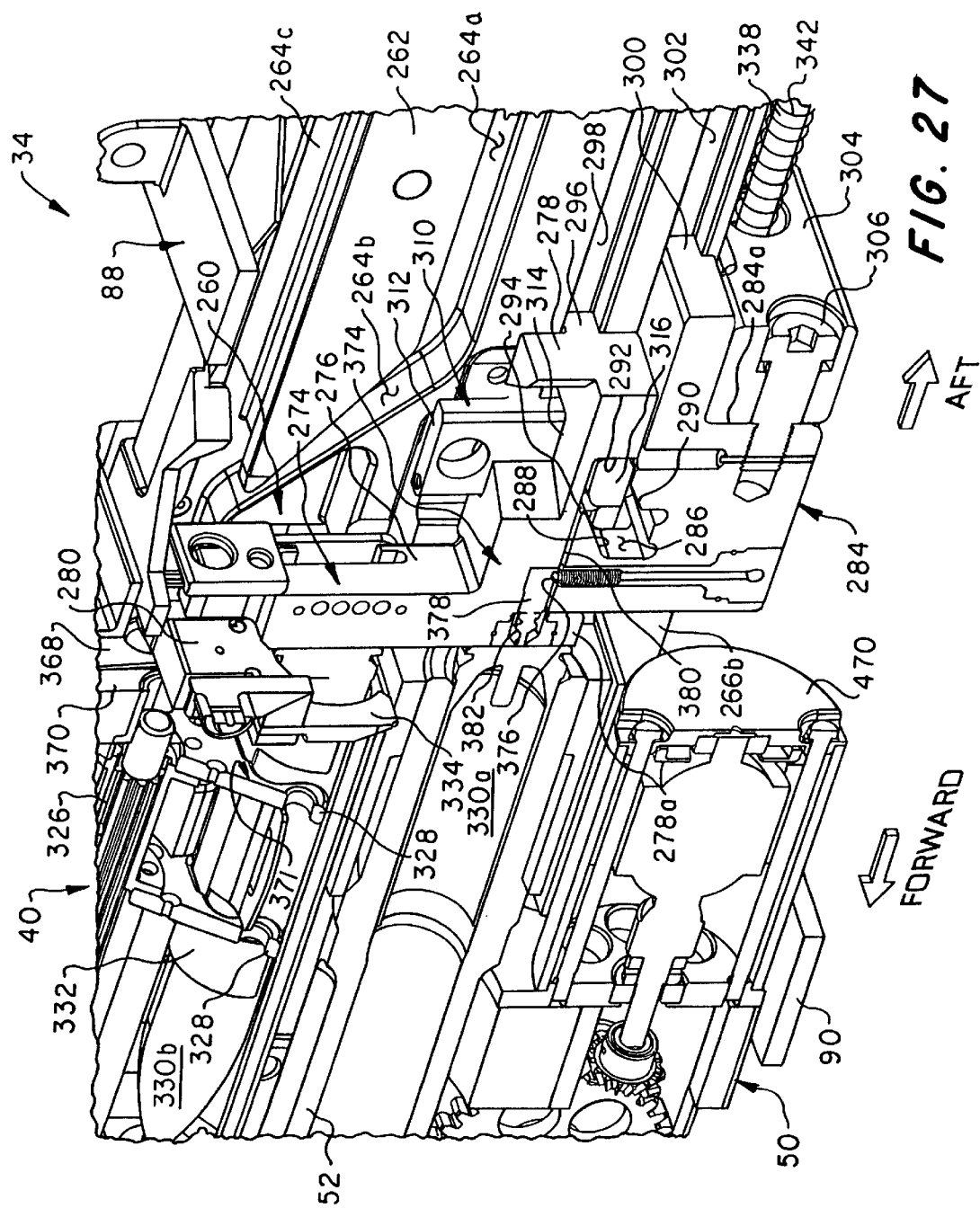
FIG. 27 is a rear perspective view similar to that in FIG. 26 but showing the bolt unit fully locked to the breech to permit an operating rod structure to fire the gun.

As best illustrated in FIGS. 25–27, the bolt member 274 is permitted to move forwardly and rearwardly relative to the receiver 48, but is precluded from vertical movement relative thereto by opposite side tongue portions 296 formed on the horizontal bolt member portion 278 (see FIG. 45 also) and slidingly received in corresponding horizontally extending interior receiver grooves 298. In a similar manner, the operating rod body structure 284 is permitted to move forwardly and rearwardly relative to the receiver, but is precluded from vertical movement relative thereto, by opposite side tongue portions 300 formed on the body structure 284 and slidingly received in corresponding horizontally extending interior receiver grooves 302.

For purposes later described herein, a generally rectangular secondary mass member 304 (see FIG. 25) is secured to the rear side of the operating rod body structure 284 by shoulder bolts 306 (only one of which is visible) which permit the secondary mass member to slide forwardly toward and rearwardly away from the rear side abutment surface 284a of the body structure 284 respectively into and out of contact with the rear side surface 284a. A spring structure 307 (schematically shown in FIG. 24) resiliently biases the secondary mass member 304 rearwardly away from the body structure abutment surface 284a.

Figure 22:
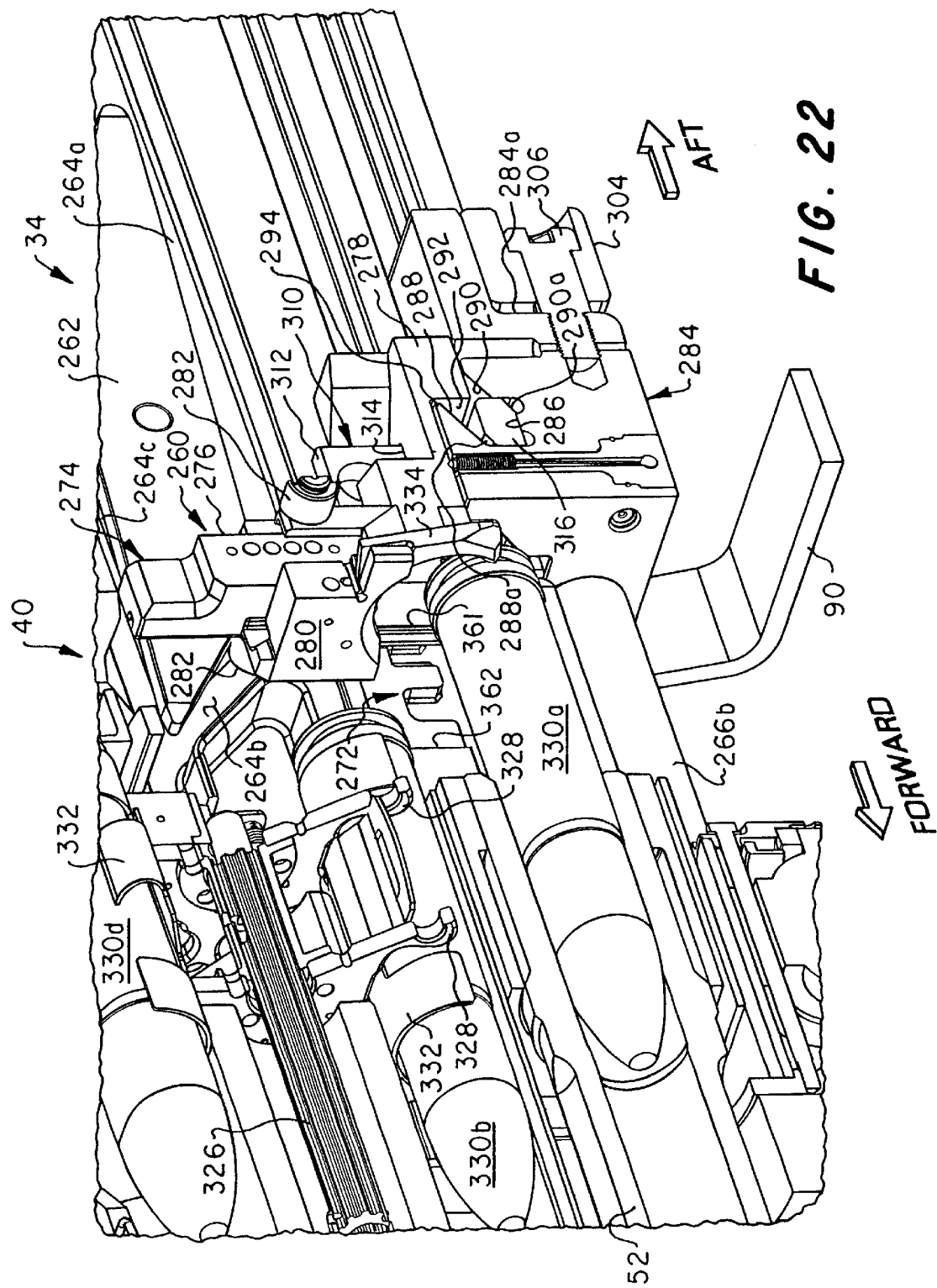
FIG. 22 is an enlarged scale perspective detail view of the bolt and feed portions of the gun in their FIG. 21 orientations.

During portions of each feed and firing cycle of the gun 34 as later described herein, the bolt member 274 is releasably locked to the breech 272, and the operating rod body structure 284 is releasably locked to the bolt member 274, by means of a lock member 310 (see FIGS. 18 and 45) which is captively retained by the bolt member 274 for vertical movement relative thereto. The lock member 310 is of a generally U-shaped configuration (see FIG. 45), and has vertically extending left and right upper portions 312 that slidably extend through left and right cutout areas 314 in the rearwardly projecting lower bolt member portion 278, and a horizontally extending lower portion 316 that passes through the cutout area 286 in the operating rod body structure 284. As later described herein, parts of the vertical portions 312 of the lock member 310 are releasably interlockable with corresponding breech recesses, and the lower lock member portion 316 has (as best illustrated in FIG. 22) sloped top front and bottom rear corner surfaces 288a,290a which are respectively parallel to the upper and lower cam surfaces 288,290 on the cutout area 286 in the operating rod body structure 284.

With reference now to FIGS. 5, 15 and 16, immediately forward of the receiver 48 the gun body is provided with a top side feed cover plate 318 in which an elongated cam slot 320 is formed. Cam slot 320 has a front recoil dwell or "overrun" portion 320a which is parallel to the axis A, a central drive portion 320b which is angled relative to the axis A, and a rear counter-recoil dwell portion 320c which is parallel to the axis A. A drive pin 322 projects downwardly from the rotatable feed drum 268 and is slidably received in the cam slot 320. Via a ratcheted gear train generally denoted at 324, the feed drum 268 is drivingly connected to the forward end of a splined drive shaft 326 that is positioned above the drum 268 and longitudinally extends parallel to the gun axis A.

Shaft 326 is coaxially anchored to an axially spaced pair of ammunition feed sprockets 328 (which are more completely illustrated in FIGS. 37-39) used to operatively draw cartridges 330 into and through the feed structure 40 as later described herein. Cartridges 330 are held in conventional belt form, for passage through their associated flex chute 44 (see FIG. 4) by a series of detachable link members 332. Representative cartridges 330a, 330b, 330d, 330e and 330f are shown in FIGS. 15 and 16, with cartridge 330a being the next cartridge to be chambered and cartridge 330c having been removed from between cartridges 330b and 330d for illustrative clarity. As later described herein, during each feed and firing cycle of the gun 34, the drum 268 is first rotated in a back-indexing direction, during which time the ratcheted gear train 324 does not rotate the sprocket shaft 326, and is then rotated in the opposite direction to rotate the sprockets 328 in a feed direction.

For ammunition handling purposes later described herein, a pair of generally arcuate spring-loaded ejector members 334 (see FIGS. 18 and 45) are mounted on a front part of the bolt face member 280 on opposite sides thereof for pivotal movement outwardly from and inwardly toward the bolt face member 280. A pair of spring-loaded extractor members 336 (see FIGS. 24, 25 and 45) are carried on opposite sides of the bolt member 274 behind the ejector members 334.

A side-by-side pair of elongated guide rods 338 (see FIG. 17) are anchored at their rear ends to a pair of mounting blocks 340 secured to a lower rear end portion of the receiver 48. From the blocks 340 the guide rods 338 longitudinally extend forwardly through openings in the operating rod body structure 284 and coaxially through the interiors of the left and right operating rods 266a and 266b. Coiled drive spring members 342 circumscribe the guide rods 338 and also extend through the interiors of the operating rods 266a, 266b. The drive spring members 342 bear at their rear ends against the mounting blocks 340, and at their front ends against front end cap portions 344 of the operating rods 266a,266b (see FIGS. 30 and 32), thereby resiliently biasing the operating rods 266a,266b (and thus the operating rod body structure 284) in a forward direction.

Figure 30:
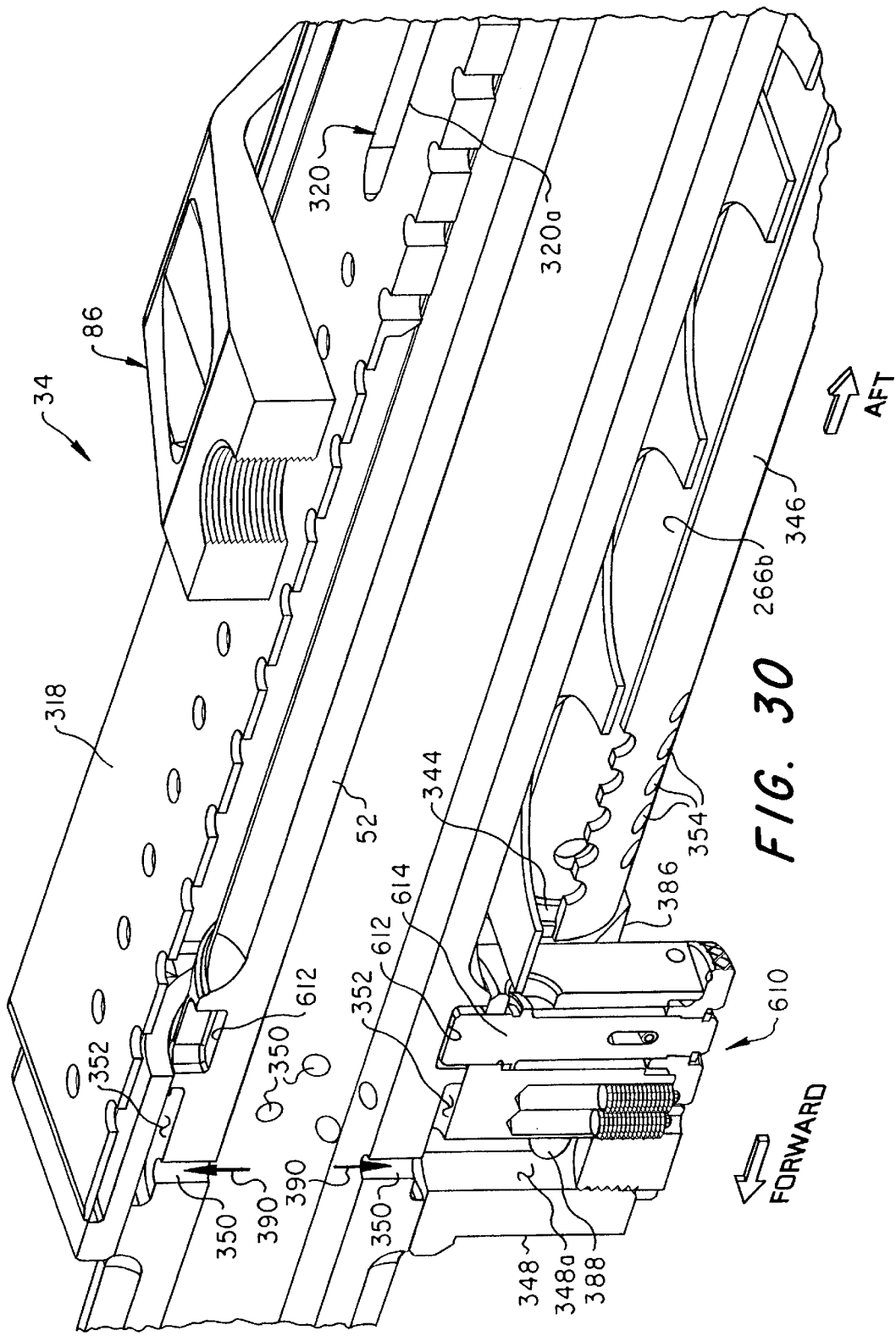
FIG. 30 is an enlarged scale laterally cut away left rear perspective detail view of a front end portion of the gun just after the initial firing thereof.

During operation of the gun 34 as later described herein, the left and right operating rods 266a,266b are forwardly and rearwardly movable coaxially through the interiors of a side-by-side pair of extension tubes 346 having front ends that open into the interior of a hollow front end unit 348 (see FIGS. 30 and 32) disposed on a lower front end portion of the gun body. As best illustrated in FIG. 30, rearwardly adjacent the front end of the feed cover plate the gun barrel 52 has a circumferentially spaced series of side wall gas outlet ports 350 that communicate the interior of the barrel 52 with an annular plenum 352 formed on the outer side of the barrel 52 and communicating on a lower side portion thereof with the interior of the hollow front end unit 348. Along a front end portion thereof each of the two extension tubes 346 is provided with an annularly spaced series of side wall gas vent openings 354 (see FIGS. 30 and 32).

Figure 19:
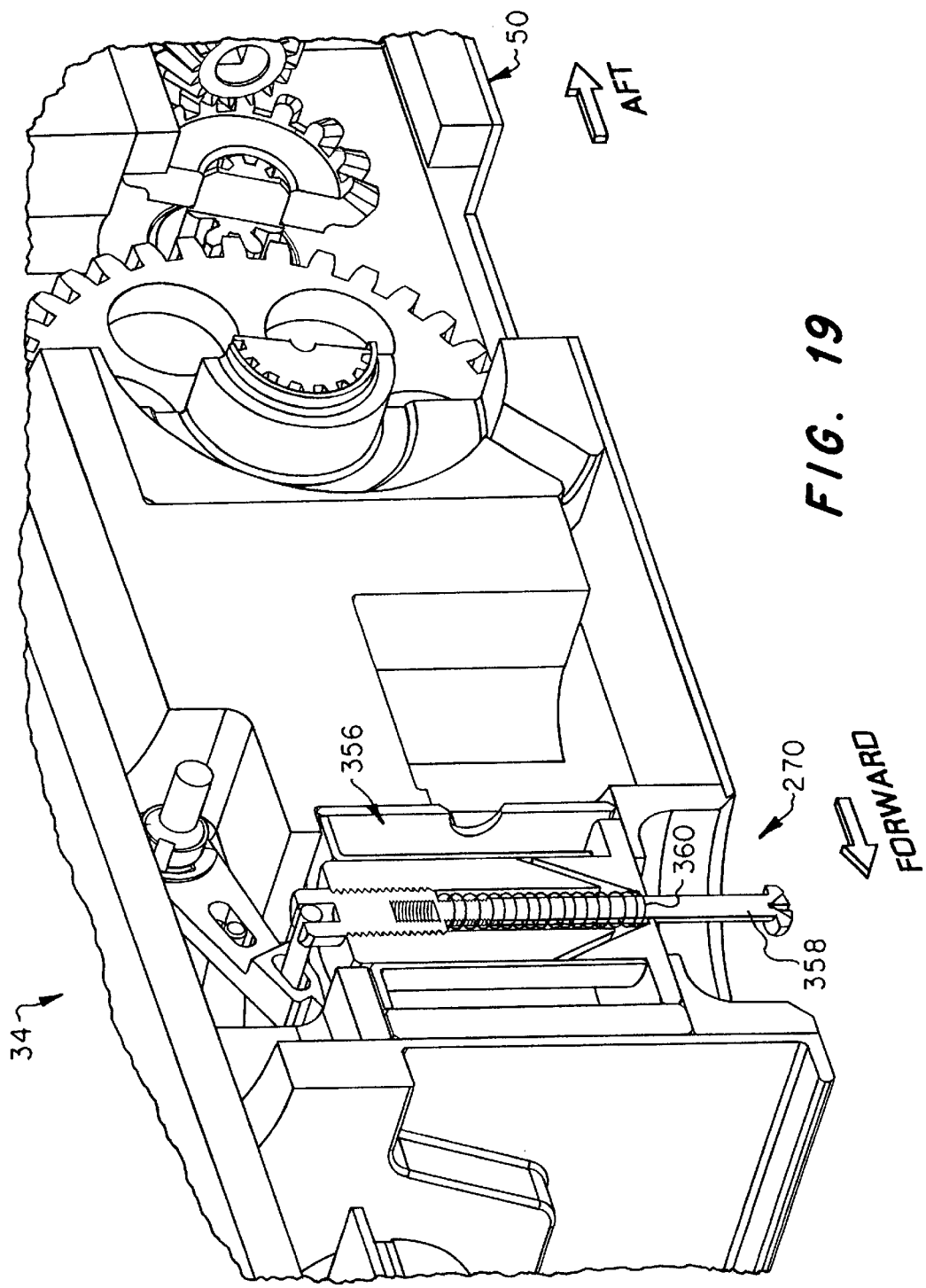
FIG. 19 is an enlarged scale perspective detail of a sear assembly portion of the gun in its FIG. 17 position.

Referring briefly now to FIG. 19, the sear assembly 270 includes a sear solenoid 356 having a vertically movable elongated plunger portion 358 which is upwardly biased toward an "on-sear" or pre-firing position (see FIGS. 15 and 16) by a coil spring member 360. With the sear plunger 358 in such on-sear position, cartridge chambering in the gun is precluded. As later described herein, when the solenoid 356 is energized, the plunger 358 is driven downwardly to its FIG. 19 "off-sear" position (see also FIG. 17), against the resilient resistance of the spring 360, chambering of successive cartridges 330 (i.e., operative positioning of the cartridges in the rear end portion of the barrel) in conjunction with the overall feed and firing cycles of the gun is permitted.

With initial reference to FIGS. 15 and 16, the basic firing cycle of the gun 34 will now be described. Subsequent to this operational description, various previously mentioned structures and assemblies, and other unique features of the gun 34 will be described in greater detail.

The gun 34 is shown in FIGS. 15 and 16 in its stationary, ready-to-fire open bolt position, with no cartridge chambered, in which the gun is at rest in its forward position within the previously described cradle structure 36. Bolt unit 260 is "on sear" and in its rearwardmost, open bolt position. The sear plunger 358 is in its upper "on-sear" position and functions as later described herein to hold the left and right operating rods 266a, 266b in rearwardly retracted positions thereof, against the resilient biasing force of the guide rod springs 342 (see FIG. 17), with the operating rod body structure 284 rearwardly abutting the mounting blocks 340.

The bolt face rollers 282 (see FIGS. 18 and 45) are disposed within rear end portions of the horizontal bottom sections 264a of the switch plate cam paths 264, and the bolt face member 280 is in its lowermost position on the bolt member 274. Along its front side the bolt member 274 has a generally conventional "T-bolt" configuration, with a spaced pair of left and right vertical extractor grooves 361 being formed in a front side portion of the bolt member 274 as best illustrated in FIG. 45. Opposite left and right side portions of the rear end casing rim portion 364 of the initial cartridge 330a (see FIG. 24) are captively and slidably retained in the integral extractor grooves 361 on the bolt member 274, with the cartridge 330a being ready to be forwardly moved into the chamber 52a, and the ready cartridge 330b (i.e., the next cartridge to be chambered) being positioned to be captured by the bolt during the subsequent feed and firing cycle of the gun as later described herein. Bolt face ejectors 334 are held laterally inwardly against the cartridge 330a, above and slightly forwardly of the integral extractor grooves 361, by facing left and right interior side surface portions of the receiver 48.

In this initial position of the gun 34 the feed cycle is static, and the feed drum 268 has rotationally moved to its maximum feed rotation position, with the depending peripheral pin portion 322 of the feed drum being received in the straight counter-recoil "overrun" portion 320c of the feed cover plate cam slot 320 (see also FIG. 5). The lock member 310 is in its lowermost position, and is thus not locking the bolt member 274 to the breech 272. In its lowermost position the lock member 310 is, however, interlocking the operating rod body structure 284 to the bolt member 274 in a manner such that forward movement of the body structure 284 relative to the gun body will correspondingly move the bolt member 274 in a forward direction relative to the gun body.

Referring now to FIGS. 17–20, upon initiation of firing of the gun 34 electrical power is transmitted to the sear solenoid 356 (see FIG. 19) in a manner causing the plunger 358 to downwardly driven to its "off-sear" position which, as previously mentioned, releases the left and right operating rods 266a and 266b, and their associated body structure 284, and permits the body structure 284 to be forwardly driven away from the mounting blocks 340, by the guide rod springs 342, as may be seen by comparing FIGS. 17 and 20 to FIGS. 15 and 16. This, in turn, forwardly drives the operating rods 266a and 266b into the interiors of their extension tubes 346.

Via the lock member 310, the spring-driven forward movement of the overall operating rod structure 266,284 also forwardly moves the bolt unit 260 relative to the balance of the gun, with the bolt face rollers 282 (see FIG. 18) reaching the forward ends of their associated lower horizontal switch plate cam path portions 264a and approaching forwardly and upwardly sloped front portions 264b of the cam paths 264. Since the bolt face rollers 282 are still in their associated horizontal lower switch plate cam track portions 264a, the bolt face member 280 remains in its lowermost position on the bolt member 274.

Figure 17:
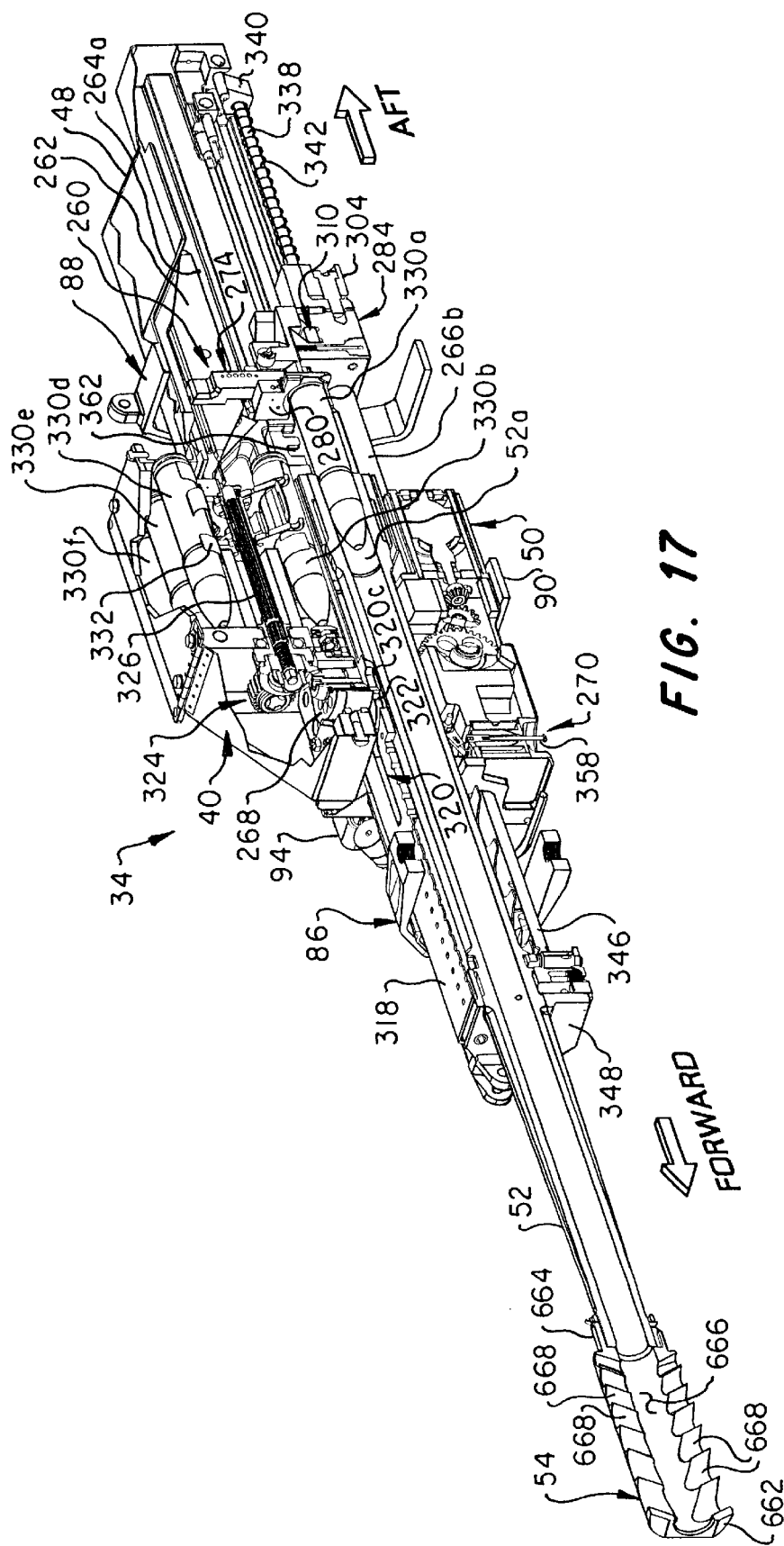
FIG. 17 is a laterally cut away left front perspective view of the gun showing its bolt moving forward from its "on sear" position in response to the initiation of the first shot from the gun's previous open bolt, ready-to-fire position.
Figure 20:
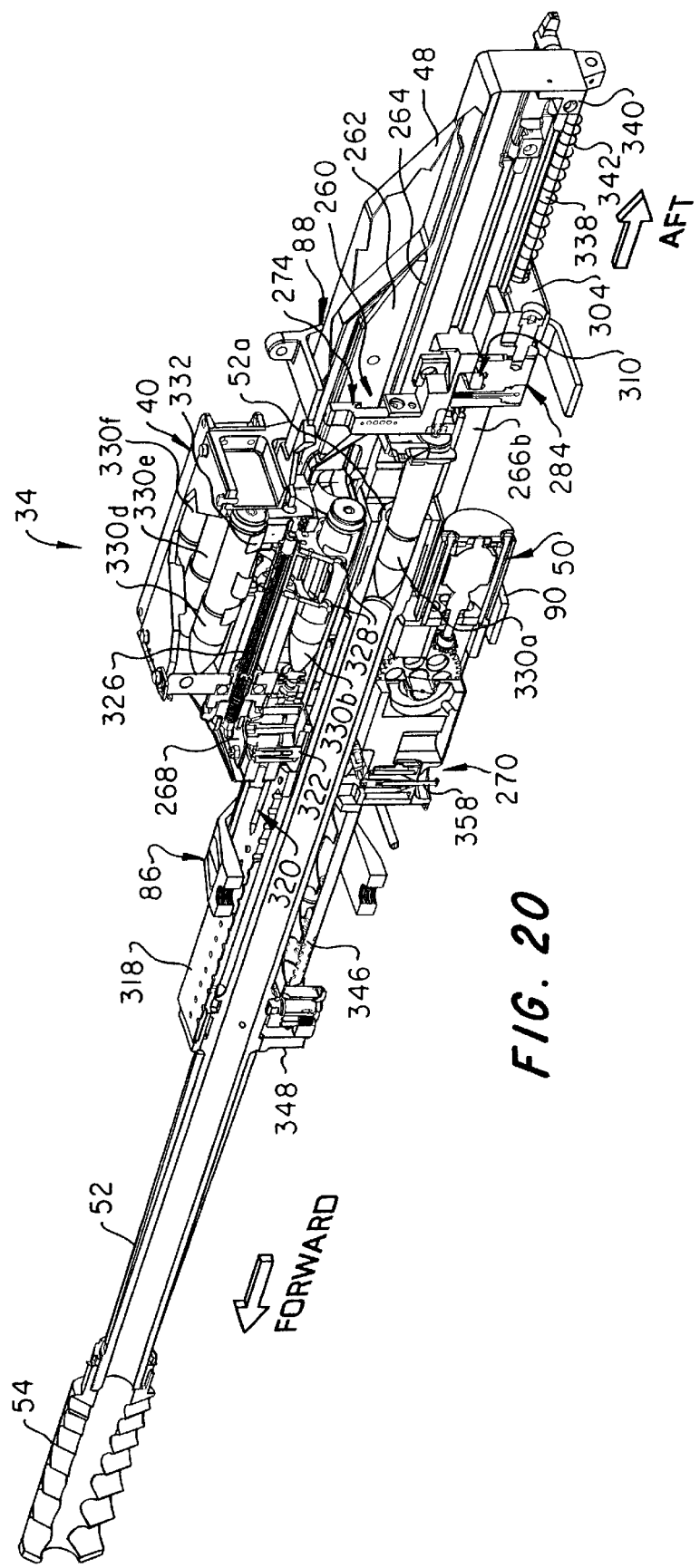
FIG. 20 is a laterally cut away left rear perspective view of the gun as shown in FIG. 17.

During this initial portion of the gun's firing cycle only the operating rod structure 266,284 and the bolt unit 260 are moving—the balance of the gun 34 is still in its forward stationary battery position within the cradle structure 36. The feed cycle is still static, since the feed drum 268 has not been rotated because the gun 34 is not moving, and the feed drum pin 322 is still in the feed cover plate cam slot portion 320c. As illustrated in FIGS. 17, 18 and 20, during this initial portion of the firing cycle the bolt-captured cartridge 330a is being driven into the chamber 52a by the forwardly moving bolt member 274.

The bolt face member 280 is ready to be cammed upwardly along the bolt member 274 when the bolt face rollers 282 forwardly traverse the upwardly and forwardly sloped switch plate cam track front end portions 262b. Additionally, the ejectors 334 are still precluded from moving laterally outwardly by opposing left and right interior side surface portions of the receiver, but are forwardly approaching left and right side breech clearance cutout areas 362 (the right breech cutout area 362 being visible in FIG. 18) which will permit the ejectors 334 to swing outwardly therethrough and out of operative engagement with the captured cartridge 330*a*.

Figure 21:
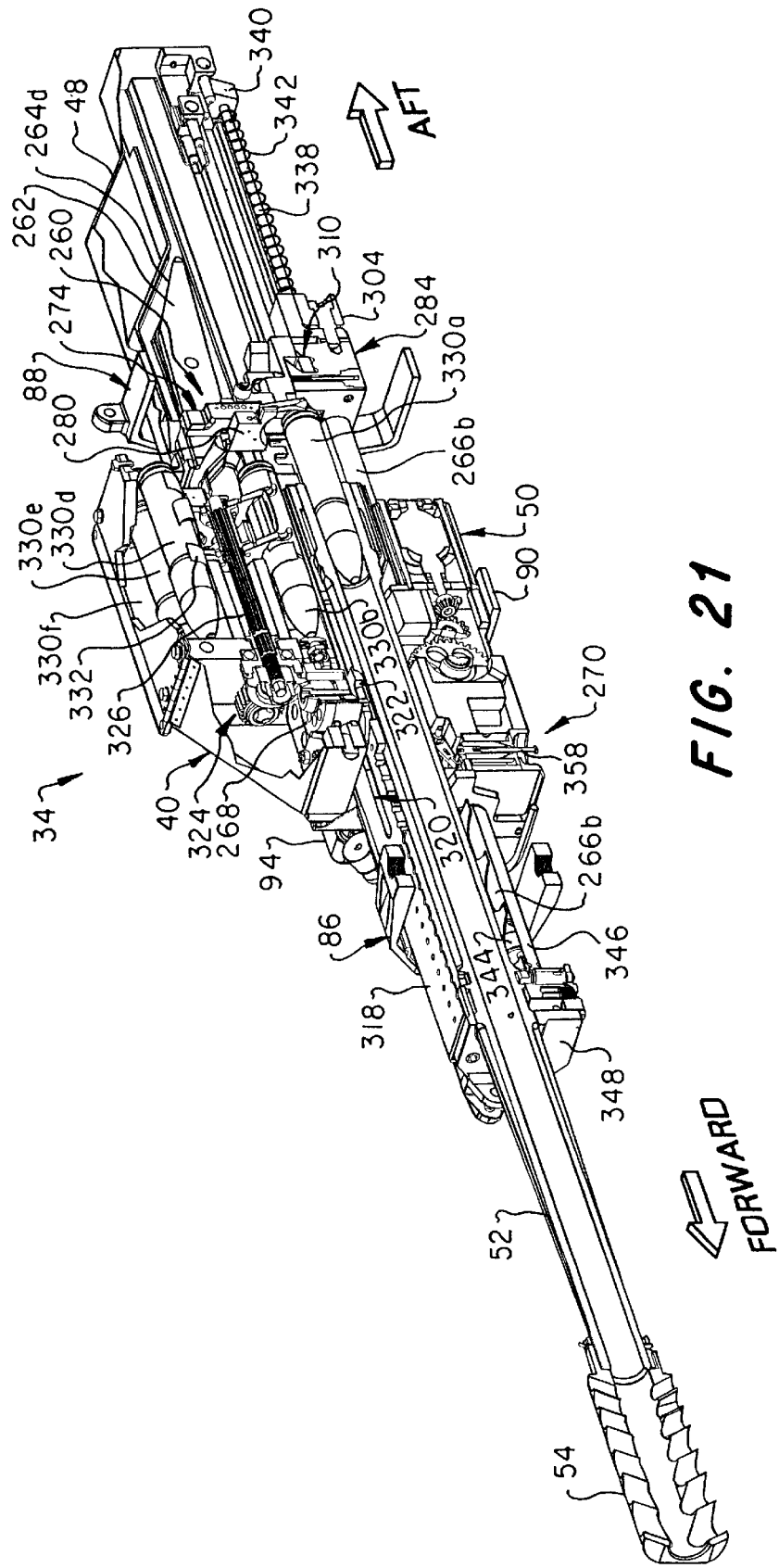
FIG. 21 is a laterally cut away left front perspective view of the gun, during chambering of an initial cartridge, with the gun's bolt face moving up into an upper cam path portion in preparation for capturing a new ready cartridge.

During further spring-driven forward movement of the operating rod structure 266,284 and bolt unit 260 relative to the still stationary balance of the gun 34 the captured cartridge 330 is nearly chambered as illustrated in FIGS. 21 and 22, the bolt face rollers 282 (see FIG. 22) are moving upwardly and forwardly along their switch plate cam track portions 264*b* to correspondingly move the bolt face member 280 upwardly along the forwardly moving bolt member 274, and the ejectors 334 have swung laterally outwardly into the facing left and right breech cutout areas 362 to permit the bolt face member 280 to move upwardly in preparation for capture of the ready cartridge 330*a* by the bolt unit 260. Since the gun 34 has still not moved relative to its associated cradle structure 36, the ammunition feed cycle is still static, with the feed drum drive pin 322 still being received in the rear feed cover plate cam slot portion 320*c*.

As the bolt face rollers 282 are moving up their associated switch plate cam track portions 264*b* they pivot the spring-loaded switch plates 262 in a clockwise direction as viewed in FIG. 22. When the rollers 282 reach the upper ends of the cam track portions 264*b*, the spring-loaded switch plates 262 snap back to their original positions in a manner causing the rollers 282 to traverse their horizontal upper cam track portions 264*c* during the subsequently described rearward movement of the bolt unit 260. As the captured cartridge 330*a* is being chambered, the operating rod end caps 344 (see FIG. 21) are about to enter the hollow gas piston area of the front end unit 348. The balance of the gun 34 is still stationary relative to its associated cradle structure 36. Lock member 310 is still in its lowermost position and has not yet locked the bolt member 274 to the breech 272.

Figure 23:
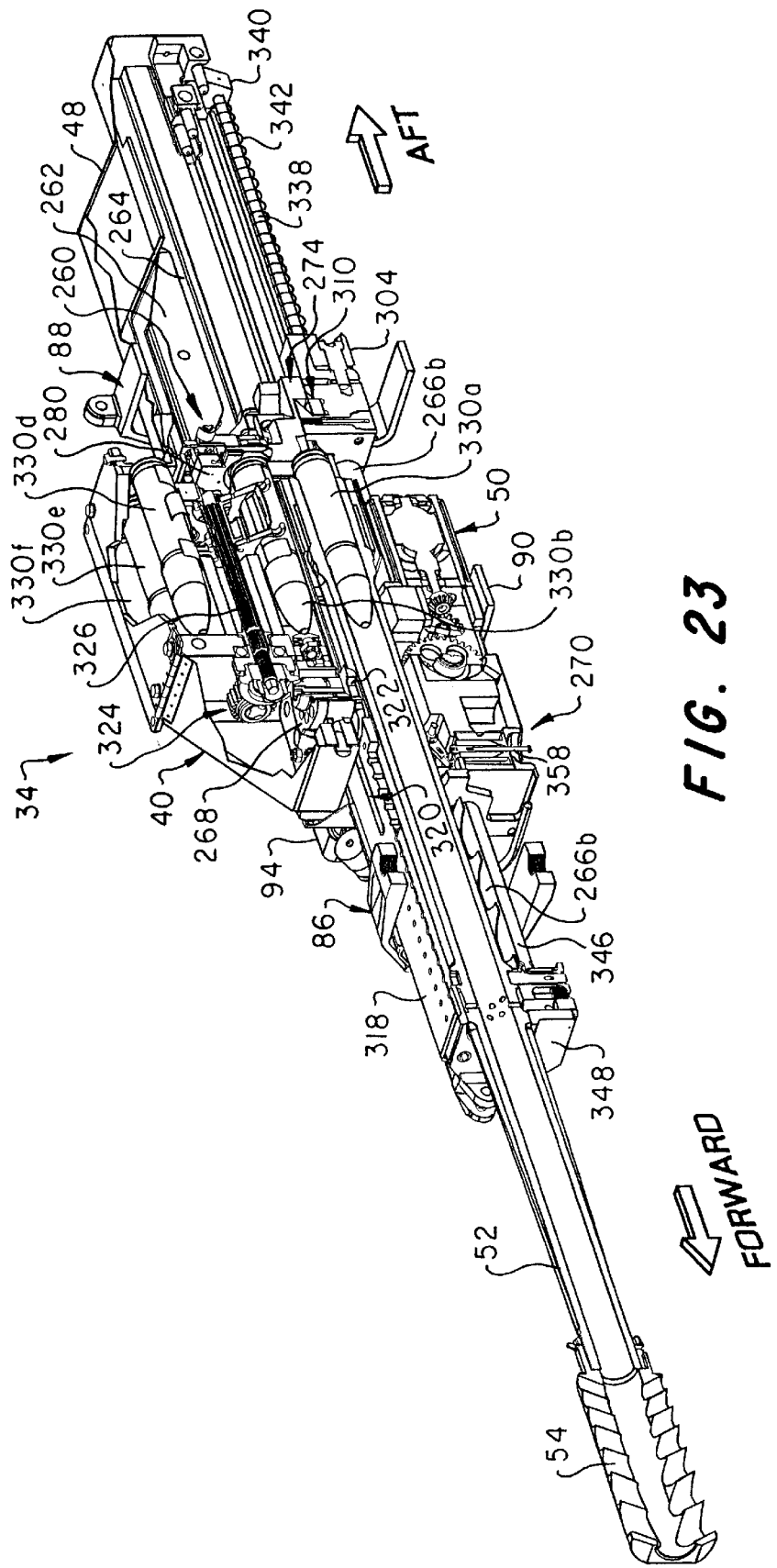
FIG. 23 is a laterally cut away left front perspective view of the gun with the bolt unit capturing the ready cartridge.
Figure 24:
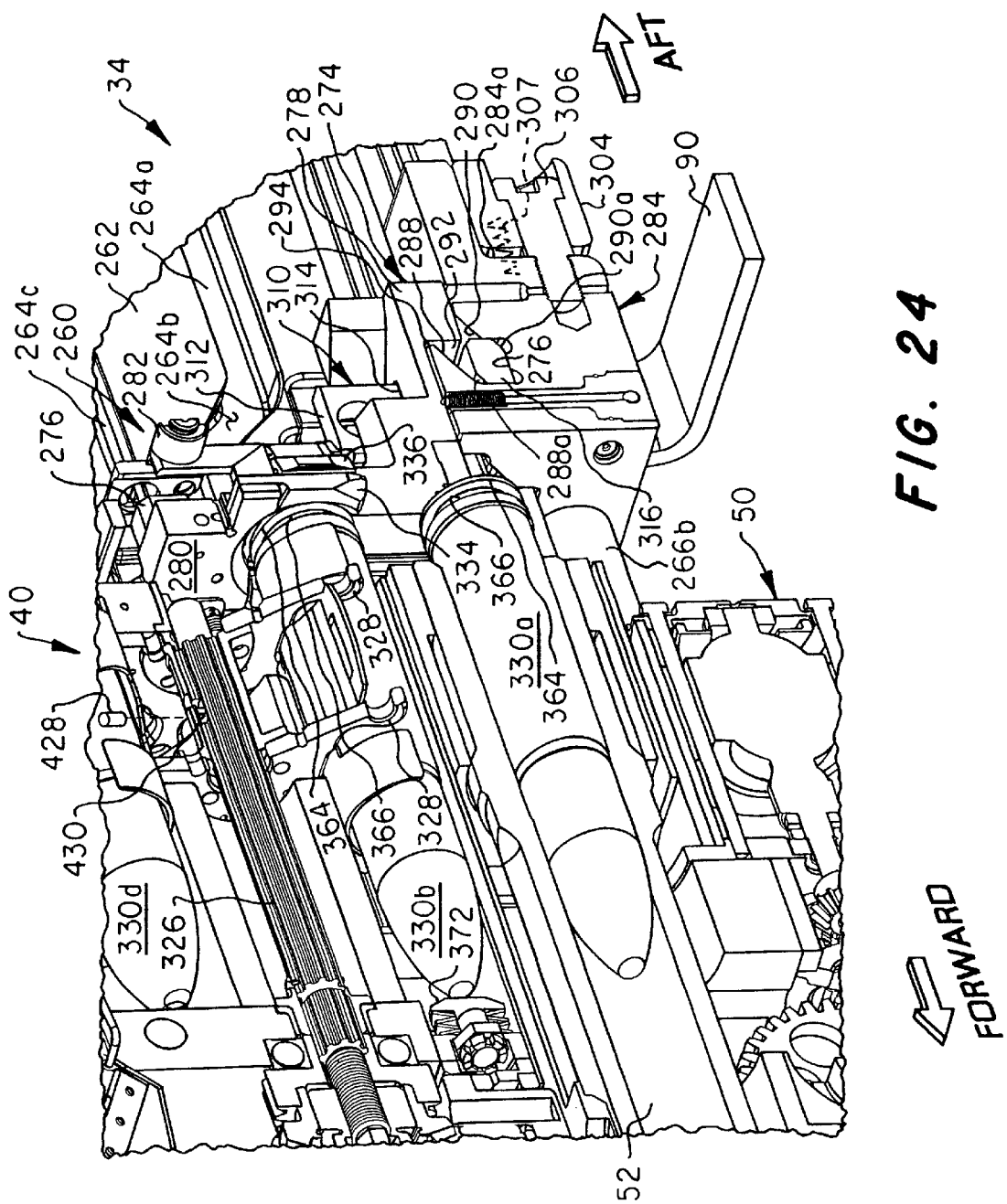
FIG. 24 is an enlarged scale perspective detail view of the bolt and feed portions of the gun in their FIG. 23 orientations.

Turning now to FIGS. 23–25, during continued spring-driven forward movement of the bolt unit 260 the bolt unit further chambers the captured cartridge 330*a* and begins to capture the ready cartridge 330*b* as the bolt face rollers 282 move forwardly through their upper switch plate cam track portions 264*c*. The gun 34 is still stationary, and in its forward battery position within the cradle structure 36, and the feed cycle is still static. Additionally, the front end cap portions of the operating rods 266 are forwardly entering the interiors of subsequently described cylinder portions of the front end unit 348. cartridge 330*a* has been almost chambered, and the bolt face ejectors 334 are now back in their "down" positions around a rear end portion of the ready cartridge 330*b* and are again held from swinging outwardly by side portions of the receiver above the opposing left and right breech clearance cutout areas 362.

Additionally, as best illustrated in FIG. 25, the extractors 336 are being cammed outwardly by the rear end casing rim 364 of the ready cartridge 330*b* in the feeder in preparation to snap into the annular casing groove 366 immediately forward of the rim 364. For purposes of illustrative clarity the left extractor 336 is shown in FIG. 25 without the supporting structure that mounts it on the bolt member 274. The forwardly moving bolt face unit 280 is still rearwardly spaced apart from a bolt sensor electrical switch 368 (see FIG. 26), located on the rear face 370 of the sprocket support structure 371, which the bolt face unit 280 will later forwardly engage and depress to close a portion of an overall electrical firing circuit as later described herein. Additionally, with the gun components in their relative positions shown in FIGS. 23–25, the lock member 310 is still in its lowermost position in which it latches the operating rod body structure 284 and the bolt member 274 together for conjoint forward movement but has not yet locked the bolt member 274 to the breech 272.

Next, as illustrated in FIG. 26, the forwardly moving bolt face member 280 contacts, depresses and closes the bolt sensor switch 368, with an ogive bumper structure 372 operating to limit the forward travel of the ready cartridge 330*b* in the feeder. As can be seen from the foregoing portion of the overall operational sequence of the gun 34, the bolt sensor switch 368 can only be closed after the bolt unit 260 has captured the new ready cartridge 330*b*.

At the FIG. 26 stage in the operational sequence of the gun 34 the initial cartridge 330*a* has been fully chambered, and the bolt member 274 has reached the forward limit of its travel relative to the still stationary gun. However, the inertia of the operating rod structure 266,284 now carries it forwardly relative to the now stationary bolt unit 260 toward a lower front portion 278*a* of the bolt member 274. As will now be described, this forward motion of the operating rod body structure 284 relative to the now stationary bolt member 274 causes the lock member 310 to be cammed upwardly toward its breech locking position in which the lock member 310 functions to lock the bolt member 274 to the breech 272.

Figure 36:
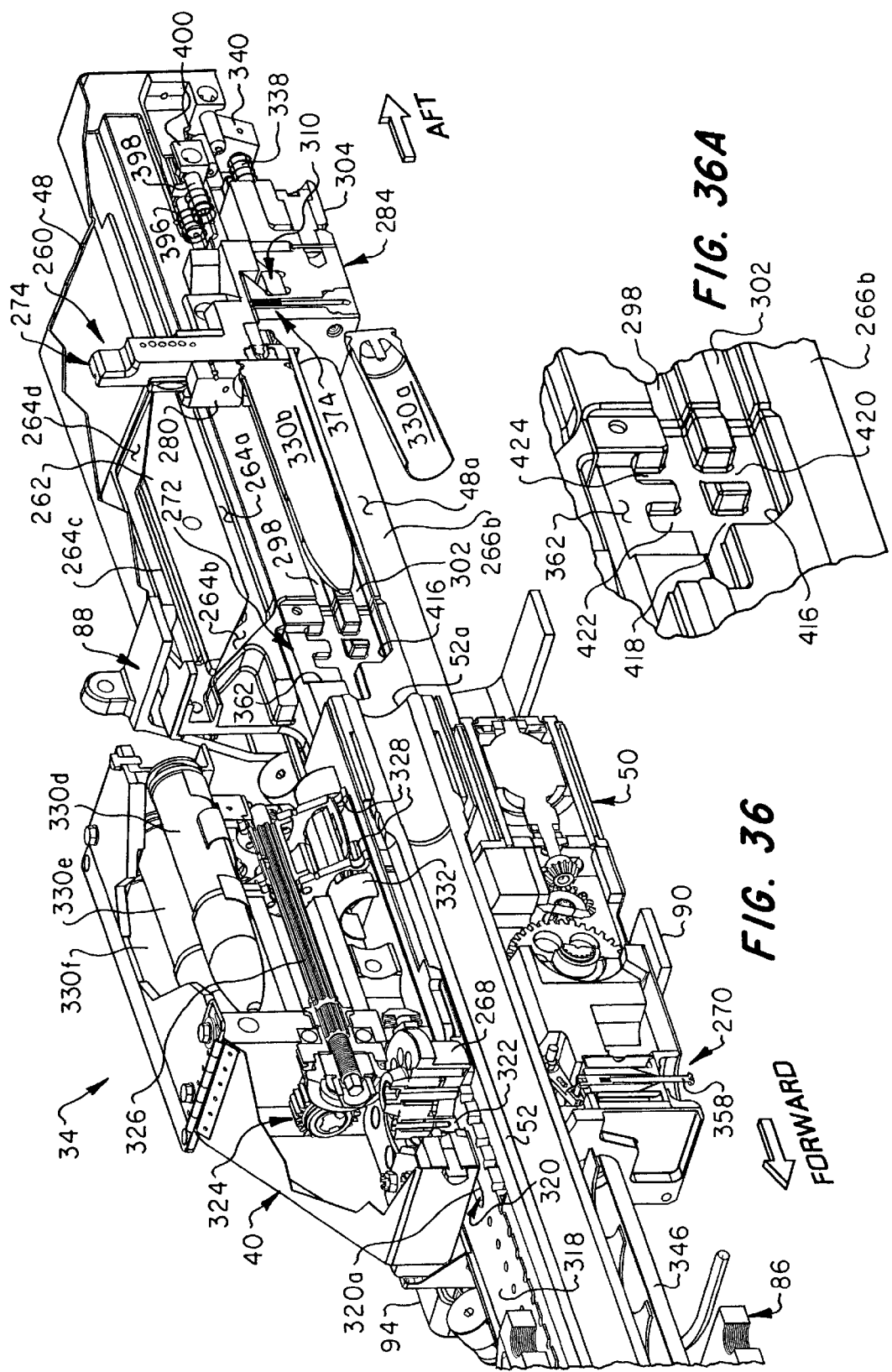
FIG. 36 is a laterally cut away left front perspective view of the gun in which it has reached its recoil travel limit.

Referring now to FIGS. 36, 36A and 45, each of the opposite vertical portions 312 of the lock member 310 (see FIG. 45) has, on its outer side, outwardly projecting front and rear top lugs 406 and 408, and outwardly projecting front and rear bottom lugs 410 and 412. Each of the front bottom lugs 410 has a downwardly and rearwardly sloped front bottom corner surface 414. As the bolt unit 260 forwardly approaches the left and right breech cutout areas 362 (see FIGS. 36 and 36A), the top lugs 406,408 are received in and slide longitudinally along the opposite top receiver grooves 298, and the bottom lugs 410,412 are received in and longitudinally slide along the opposite bottom receiver grooves 302, to thereby prevent the lock member from moving upwardly relative to the horizontal portion 278 of the bolt member 274.

Each of the opposing left and right breech cutout areas 362 (see FIG. 36A) has formed therein a forwardly and upwardly inclined starting cam surface 416 at the front end of its associated lower receiver groove 302; front and rear bottom lateral recesses 418,420 extending vertically between portions of the receiver grooves 298 and 302*p*; and front and rear top lateral recesses 422,424 positioned along the top side of the upper receiver groove 298 and respectively above the recesses 418,420.

As the bolt unit-carried lock member 310 forwardly reaches the opposing left and right breech cutout areas 362, the inclined lock member lug corner surfaces 414 (see FIG. 45) contact the breech starting cam surfaces 416 (see FIGS. 36 and 36A) to initiate the upward travel of the lock member 310 relative to the bolt member 274 as the lock member lug pairs 406,410 and 408,412 respectively come into horizontal alignment with the vertical breech recess pairs 422,418 and 424,420.

Next, by he interaction between the sloping upper and lower cam surfaces 288,290 on the operating rod body structure 284 with the facing surfaces 288*a*,290*a* on the lower lock member portion 316 (see FIG. 26) the lock member 310 is cammed upwardly to its breech locking position in which the lock member lugs 406,410 (see FIG. 45) are respectively received in the breech cutout area recesses 422 and 418, and the lock member lugs 408,412 are respectively received in the breech cutout area recesses 424,420. This lug receipt prevents rearward movement of the lock member 310, and thus the balance of the bolt unit 260, relative to the breech 272.

As previously mentioned, the bolt sensor switch 368 is a first switch portion of an electrical firing circuit which must be closed in order to fire a chambered cartridge. A second switch portion 374 is disposed in series with the bolt sensor switch 368, and both switches must be closed to close the firing circuit and permit a chambered cartridge to be fired.

Second switch portion 374 includes a metal electrical probe 376 (see also FIGS. 27 and 29) extending upwardly beyond the top side of the operating rod body structure 284, a metal bolt primer hot shoe 378 positioned on an undercut bottom side section of the bolt portion 278 immediately behind the bolt surface 278a, and a dielectric plate member 380 extending along the undercut bottom side section immediately behind the hot shoe 378. Hot shoe 378, in turn, engages an electrical firing contact structure 382 which operatively engages a central rear casing end portion of the chambered cartridge 330a. The second switch portion 374 is closed when the electrical probe 376 contacts the hot shoe 378, and is opened when the probe 376 contacts the dielectric plate 380.

As can be seen in FIG. 26, the forwardly moving electrical probe 376 is forwardly sliding along the dielectric plate 380, and has not yet engaged the hot shoe 378 to close the second switch 374. Additionally, with the bolt member 274 in its forward limit position, the bolt face rollers 282 (not visible in FIG. 26) have rolled upwardly onto associated ramp surfaces 384 positioned at the front ends;of the horizontal top switch plate cam track portions 264 and slightly elevated with respect thereto.

Referring now to FIG. 27, further forward movement of the operating rod body structure 284 relative to the now stationary bolt member 274 brings the body structure 284 and the operating rods 266 to their forward limit position. At this point the forwardly moving operating rod body structure 284 has cammed the lock member 310 upwardly to its uppermost position in which it locks the bolt member 274 to the breech 272, and the operating rod body structure 284 has hit the bolt portion 278a so that now neither the lock member 310 nor the overall operating rod structure 266,284 are moving within the receiver. The secondary mass member 304 now slams forward into the stopped operating rod body structure 284 to prevent it from bouncing rearwardly off the bolt member abutment portion 278a and potentially unlocking the bolt member 274 from the breech.

As previously mentioned, during this forward movement of the operating rod body structure 284 relative to the stationary bolt member 274, the bolt sensor switch 368 is closed. When the forwardly moving operating rod body structure 284 reaches its FIG. 27 position the probe 376 is brought into contact with the bolt primer shoe 378, thereby closing the switch 374, and establishing electrical contact between the operating rod body structure 284 and the bolt member 274. This closes the overall electrical firing circuit and fires the chambered cartridge 330a. It should be noted that only until after the lock member 310 is fully cammed to its uppermost breach locking position can the operating rod body structure 284 move far enough forwardly to make electrical contact with the primer shoe 378 and close the switch 274. This assures that the gun 34 must be fully locked before it can be fired.

The firing of the initial cartridge 330a, as just described, is effected by the closure of the lower switch structure 374. However, as later described herein, the firing of each subsequent cartridge in a given burst is effected by closure of the bolt sensor switch 368.

Figure 28:
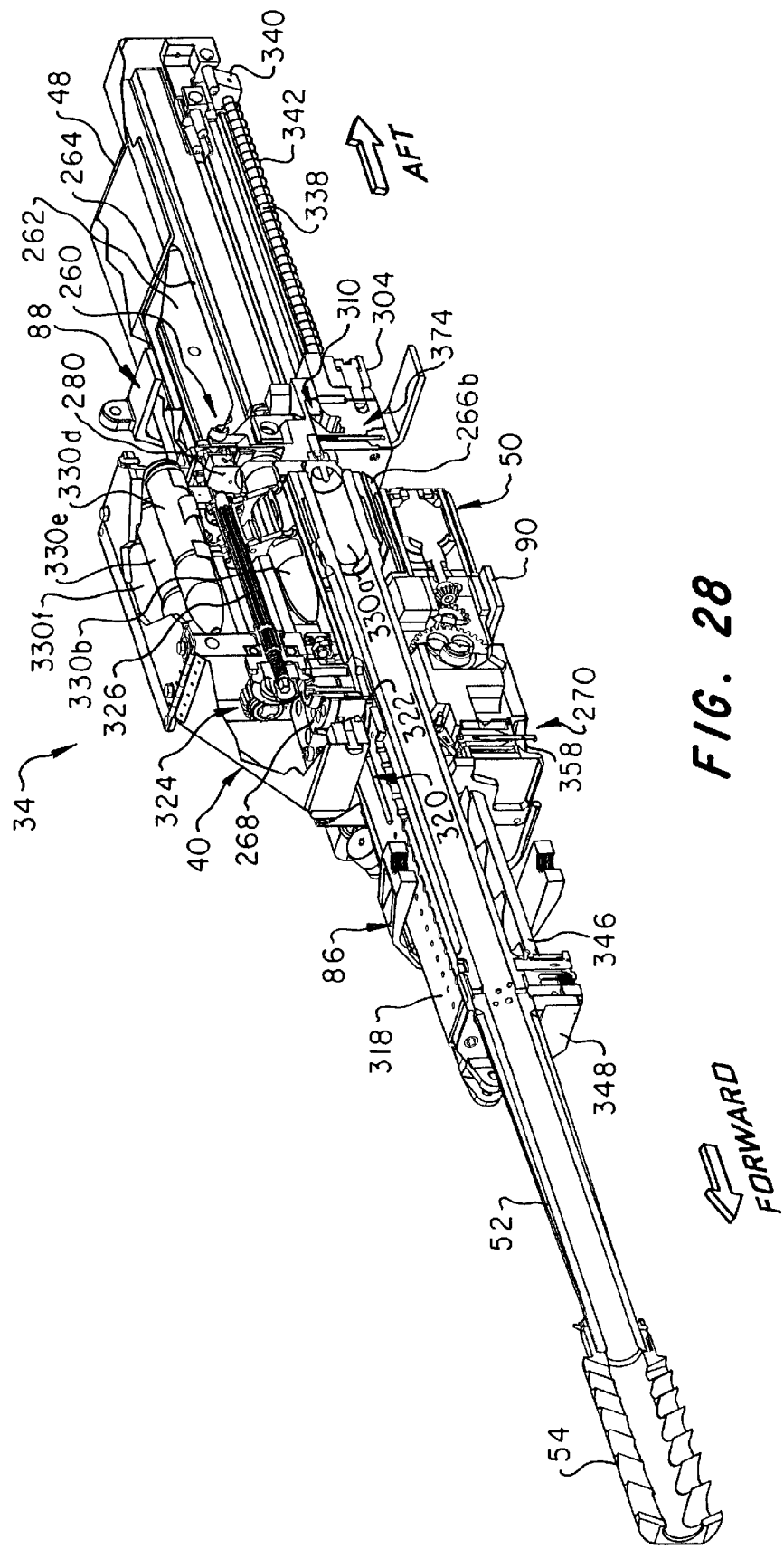
FIG. 28 is a laterally cut away left front perspective view of the gun illustrating its components in their orientations just after the gun is fired and is in its first, "free recoil" movement relative to its mount.
Figure 29:
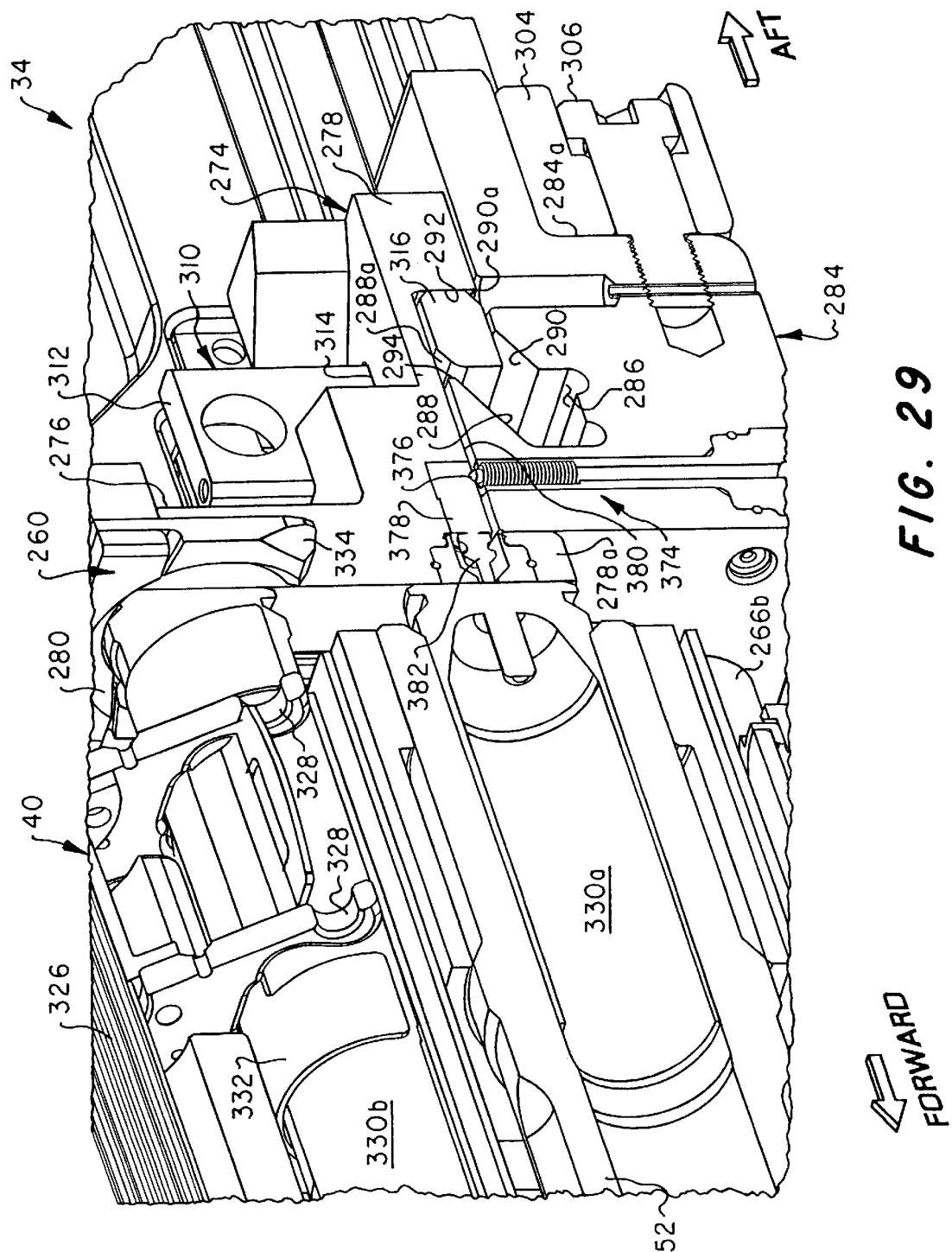
FIG. 29 is an enlarged scale perspective detail view of the bolt, lock and feed portions of the gun in their FIG. 28 orientations.

FIGS. 28–30 illustrate the gun 34 just after the initial cartridge 330a has been fired. By such firing of the cartridge 330a the gun 34 is put into "free" rearward recoil motion relative to the cradle structure 36 against the resilient resistance of the previously mentioned recoil structures within the recoil housing portions 58 of the gun 34 (see FIG. 5). During this initial free recoil movement of the gun, the bolt unit 260 is still locked up to the breech, the gas operating system has not yet begun to function, and neither the bolt unit 260 nor the operating rod structure 266,284 is moving within the receiver 48. Since the gun 34 is now moving rearwardly relative to the cradle structure 36 and the feeder 40, the captured ready cartridge 330b, as best illustrated in FIG. 29, is being rearwardly withdrawn by the bolt unit 260 from the feeder and from the cartridge's link 332.

The feed drum drive pin 322 is approaching the central angled cam slot portion 320b, but is still in the straight rear recoil portion 320c thereof. Accordingly, the feed drum 268 has still not been rotated away from its initial FIG. 15 position and the feed system is still static. Additionally, the downward unlocking movement of the lock 310 has not yet been initiated, and the fired cartridge 330a is still locked up in the chamber 52a.

Referring now to FIG. 30, the front end unit 348 has a pair of hollow cylinder portions 386 disposed on opposite sides thereof, the interiors of the cylinders 386 being communicated with the interior 348a of the front end unit 348 by means of a cross-hole 388 extending outwardly from the body of the front end unit 348 into the cylinder portions 386 thereof. At the firing of the cartridge 330a, the operating rod end caps 344 are slidingly received in their associated front end unit cylinder portions 386. After the projectile portion of the fired cartridge 330a forwardly passes the front end unit 348, pressurized gas 390 within the barrel 52 behind the projectile traversing the barrel 52 is sequentially forced outwardly from the barrel 52 into the annular plenum 352 through the barrel outlet ports 350, into the interior 348a of the front end unit 348, and into the cylinders 386 via the cross-hole 388.

Figure 31:
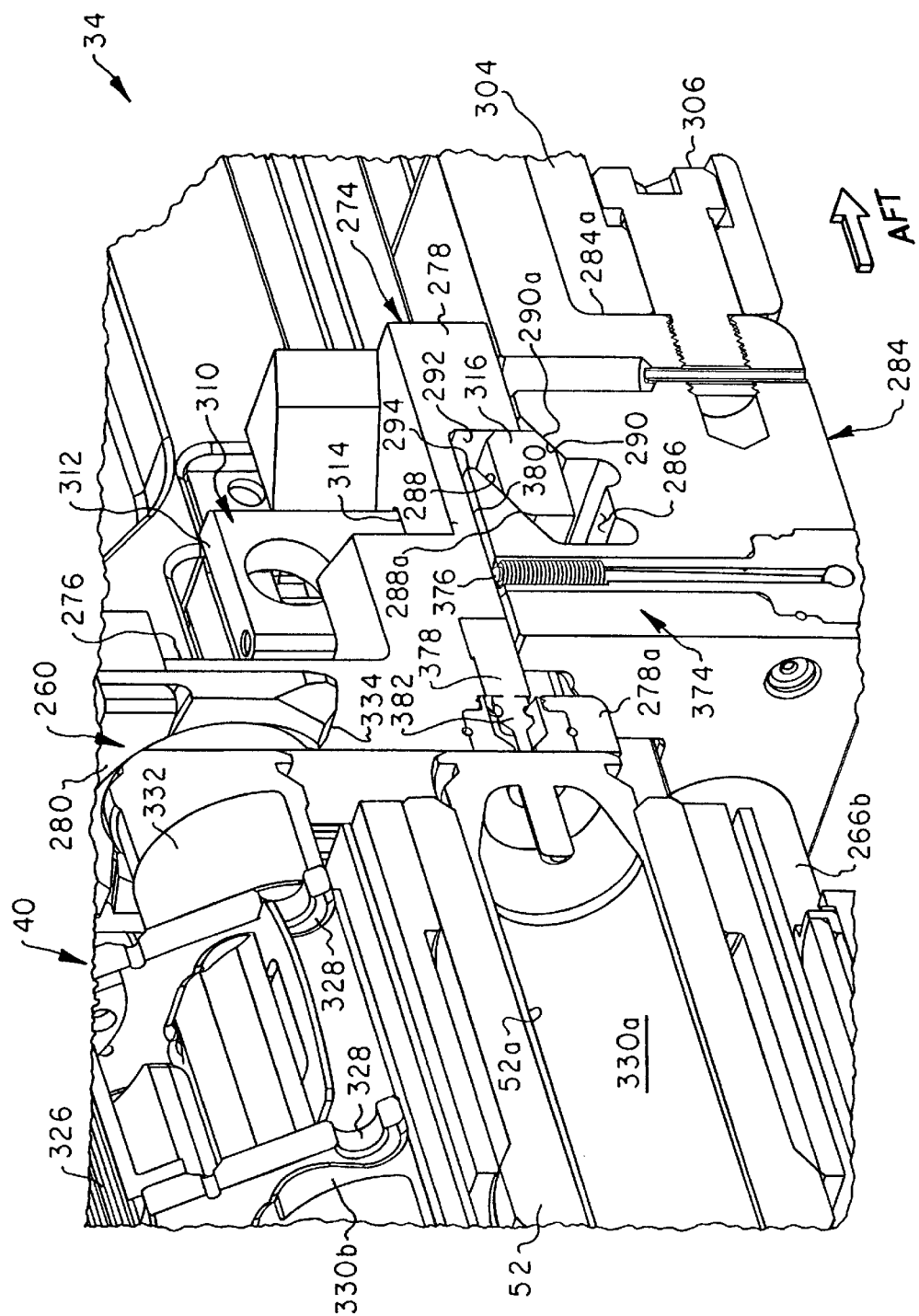
FIG. 31 is an enlarged scale left side perspective detail view of the gun's bolt, lock and feed portions during the start of the unlocking of the bolt from the breech subsequent to the firing of the first cartridge.
Figure 32:
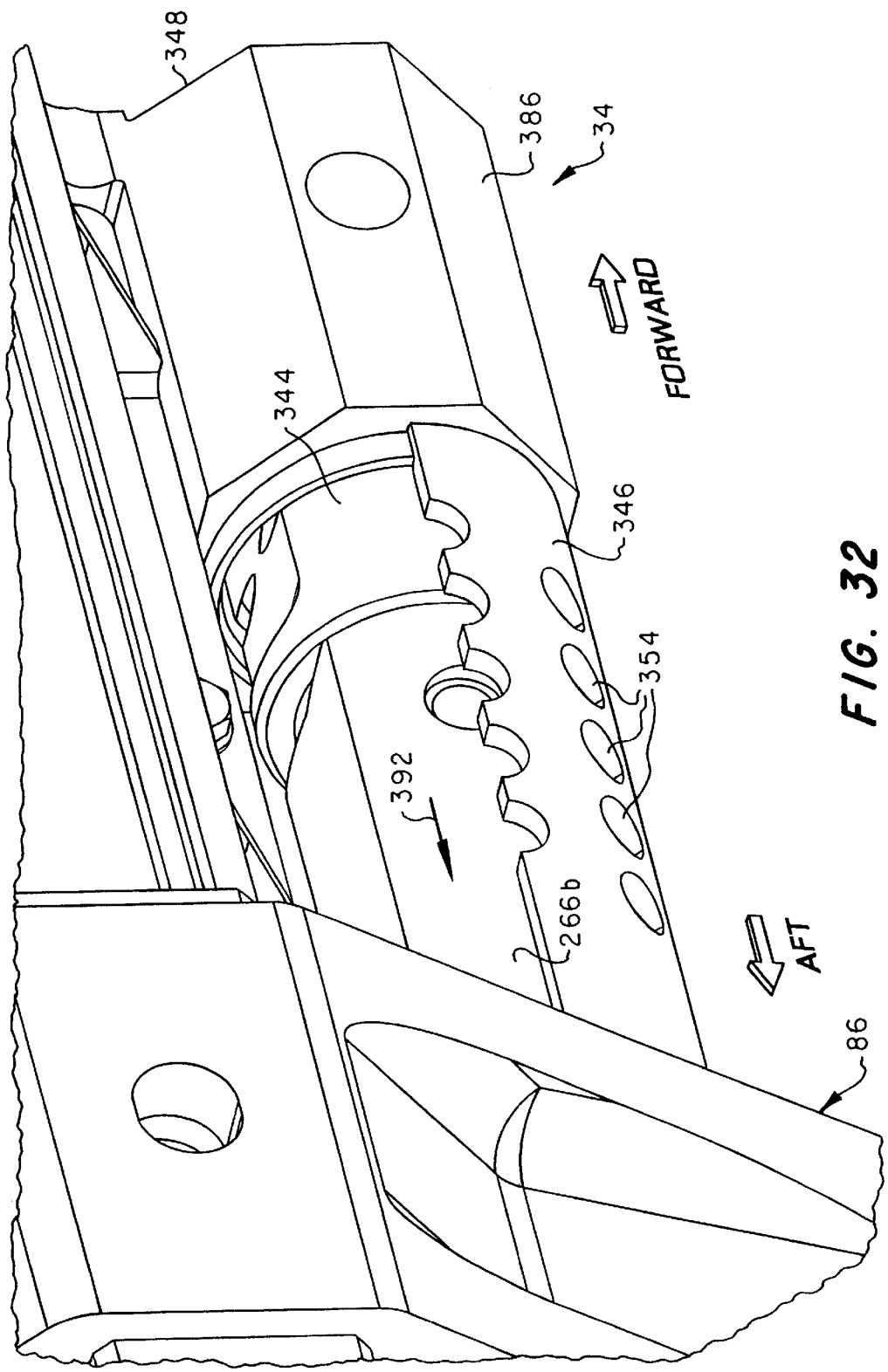
FIG. 32 is an enlarged scale right side perspective detail view of a gas pressure-driven operating rod portion of the gun initiating the unlocking of the bolt from the breech.

As depicted in FIGS. 31 and 32, pressurized propellant gas 390 entering the front end unit cylinders 386 rearwardly drives the operating rods 266 (as indicated by the arrow 392 in FIG. 32) through the extension tubes 346 to rearwardly withdraw the operating rod front end caps 344 from the cylinders. As indicated in FIG. 31, this rearwardly drives the operating rod body structure 284 relative to the still locked-up bolt unit 260 and away from the bolt member portion 278a that the body structure 284 previously abutted. As indicated, the spent cartridge 330a remains locked up in the chamber 52a.

The gas-driven initial rearward movement of the operating rod structure 266,284 is faster than the rearward recoil velocity of the balance of the gun 34, and serves to begin the unlocking of the bolt member 274 from the breech 272 by causing the operating rod body structure cam surfaces 288,290 to engage the corresponding surfaces 288a,290a on the lock portion 316 and cam the lock member 310 downwardly from its previous uppermost bolt-to-breech locking position. As can be seen in FIG. 31, this initial rearward movement of the operating rod body structure 284 relative to the still locked-up bolt member 274 also opens the lower firing switch structure 374. Additionally, the pressurized gas 390 entering the front end unit cylinders 386, which exerts a rearward force on the operating rods 266, exerts a forwardly directed reactive force on the front end unit 348, and thus on the gun 34 as well, to thereby offset and slow the rearward recoil movement of the gun 34.

Figure 33:
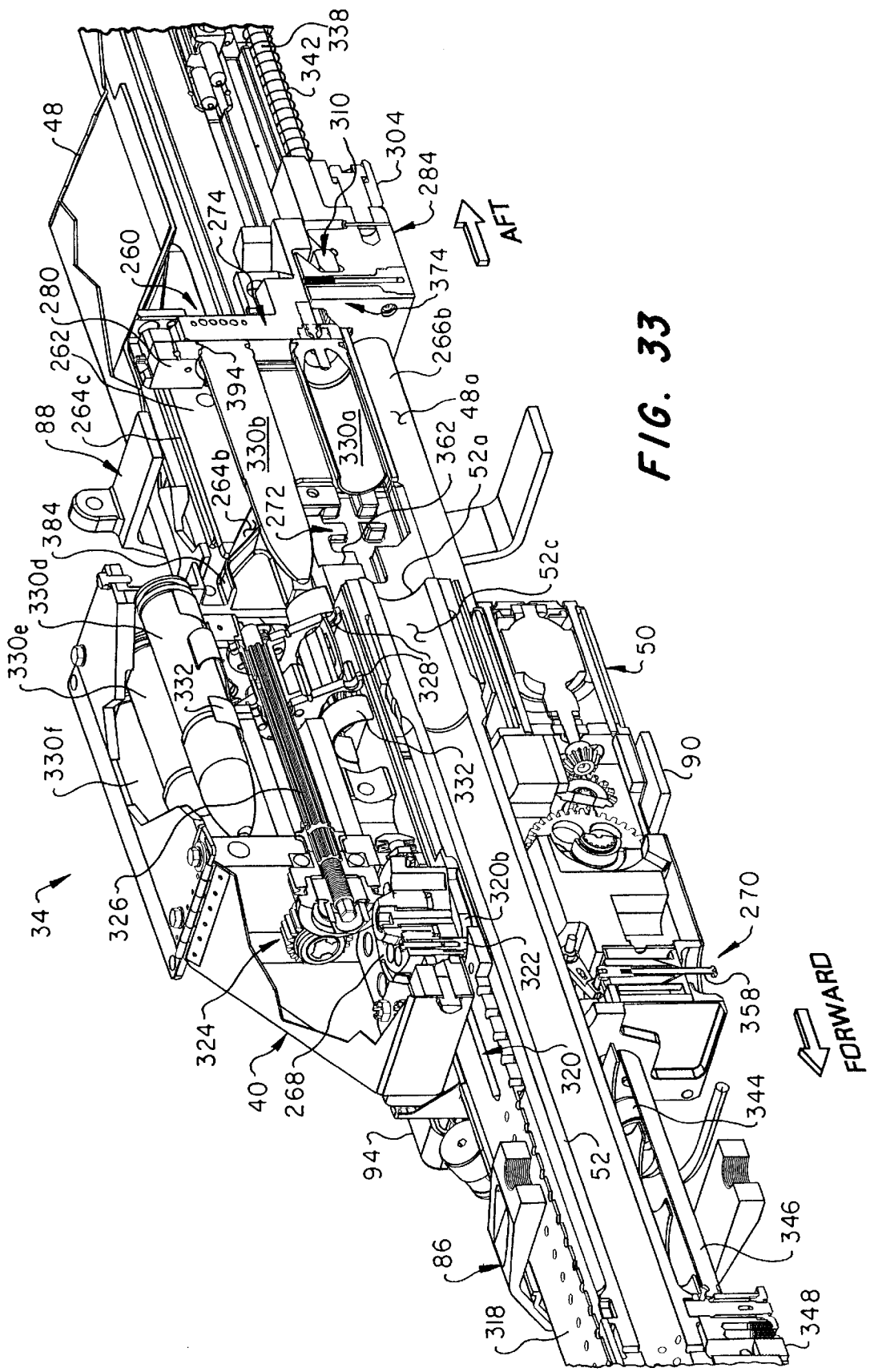
FIG. 33 is a laterally cut away left front perspective view of the gun, subsequent to the firing of the first cartridge, with its bolt unit fully unlocked from the breech and the gun and bolt in recoil travel.

Turning now to FIG. 33, further rearward movement of the operating rod body structure 284 downwardly moves the lock member 310 to its lowermost unlocked position, thereby unlocking the bolt member 274 from the breech and permitting the rearwardly moving operating rod body structure 284 to rearwardly move the bolt member 274 within the receiver in the rearwardly recoiling gun 34. The rearward movement of the operating rods 266 has moved their front end caps 344 rearwardly past the extension tube vent openings 354 (see FIG. 30) to thereby cause the gas 390 to be vented outwardly through the openings 354.

During this rearward movement of the operating rod body structure 284 and the bolt unit 260 relative to the rearwardly recoiling balance of the gun 34, several other things happen. Specifically, the bolt face rollers 282 move rearwardly down the ramp surfaces 384 and are then moved rearwardly along the horizontal top switch plate cam track portions 264c to their rear ends. For purposes later described herein, the movement of the right bolt face rollers 282 downwardly off their associated ramp surfaces 384 correspondingly moves the bolt face member 280 downwardly on the bolt member 274 a distance of approximately 0.125".

This small downward movement of the bolt face member 280 moves a small stabilizing tooth portion 394 thereon into the rear end casing groove 366 of the ready cartridge 330b prior to its rearward extraction from the feeder. Next, as the bolt face rollers 282 move rearwardly along the upper cam track portions 264c the rearwardly moving bolt unit 260 (by means of the integral bolt member extractor grooves 361) rearwardly extracts the spent casing portion of the fired cartridge 330a from the chamber 52a, positioning it over an open bottom side portion 48a of the receiver 48, and also (by means of the bolt face extractor members 336) rearwardly extracts the captured ready cartridge 330b from its associated link 332 within the feeder 40. As indicated in FIG. 33, after the ready cartridge 330b has been extracted from its associated link 332 the link is retained on the sprocket members 328 within the feeder 40.

During the continued rearward recoil of the gun 34 shown in FIG. 33 the feed drum drive pin 322 enters and begins to move through the angled central portion 320b of the feed cover plate cam slot 320, thereby rotating the feed drum 268 in a back indexing direction. Due to the ratcheted nature of the drive train 324, this back indexing rotation of the feed drum 268 does not rotate the splined drive shaft 326 and the sprockets 328 thereon, but merely indexes the feed drum 268 for a subsequent reverse rotation thereof, as later described herein, to operatively rotate the sprockets 328 for the next feed cycle.

Figure 34:
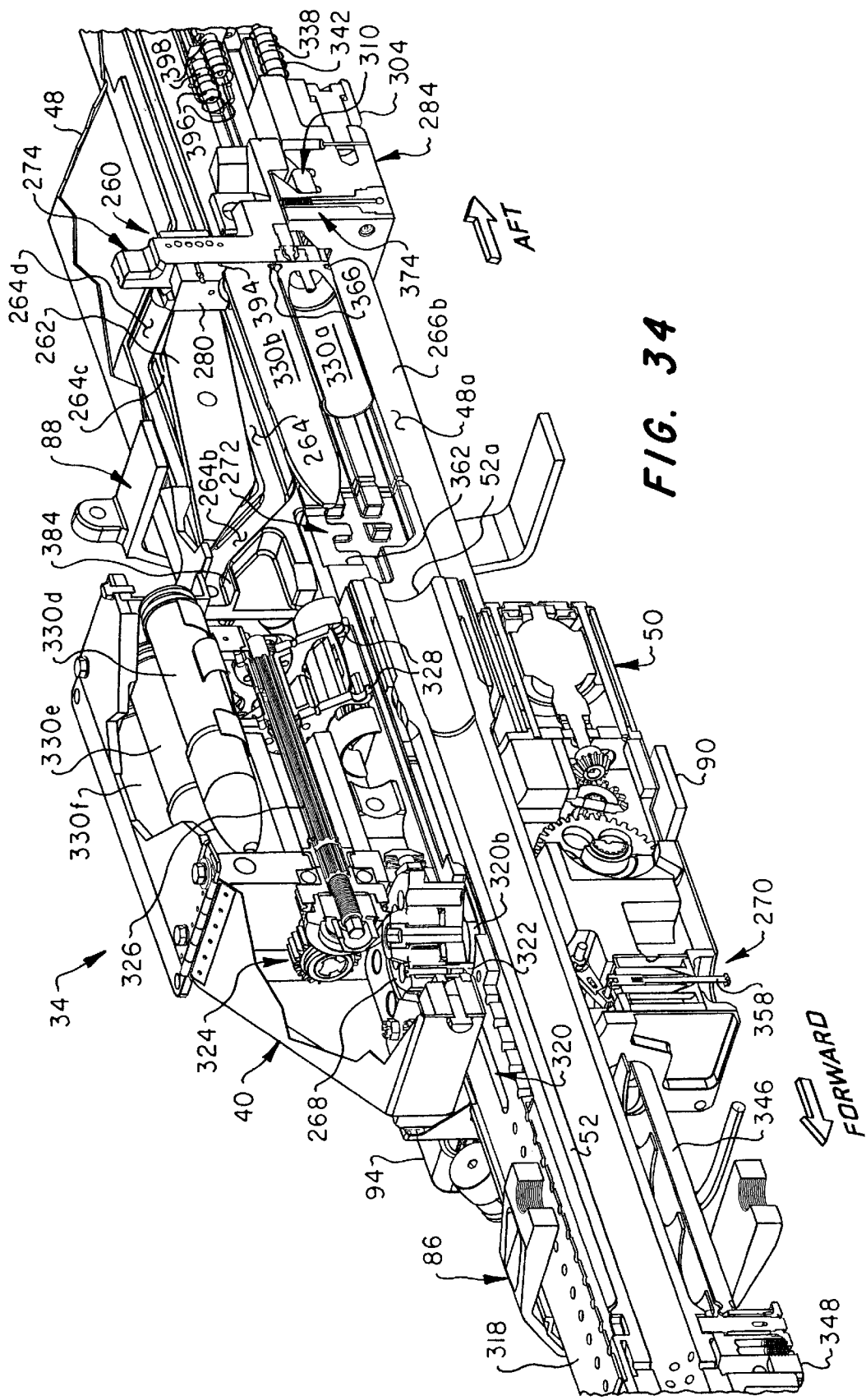
FIG. 34 is a laterally cut away left front perspective view of the gun with its bolt face being cainmed down and a feed drive gear being back-indexed for the next feed cycle.

Referring next to FIG. 34, while the gun 34 continues to rearwardly recoil relative to its associated cradle structure 34, and the bolt unit 260 continues to move rearwardly within the receiver 48, the feed drum 268 continues to be rotated in a back indexing direction while its pin 322 remains in the cam slot portion 320b, and the bolt face rollers 282 enters and are forced downwardly through the downwardly and rearwardly sloped rear end portions 264d of their associated switch plate cam tracks 264. This cams the bolt face member 280 downwardly along the bolt member 274 and correspondingly drives the captured and extracted ready cartridge 330b downwardly along the front side of the bolt member 274. Via the bolt face ejector members 334, this causes the casing rim 364 of the cartridge 330b to be driven downwardly from the extractor members 336 and into the bolt member integral extractor grooves 361 and forces the cartridge 330b into engagement with the spent casing of the fired cartridge 330a to begin to drive it downwardly off the bolt member 274 (i.e, to drive its casing rim 364 out of the extractor grooves 361) for ejection downwardly through the underlying open bottom side portion 48a of the receiver 48. The receipt of the bolt face tooth 394 in the rear end casing groove 366 of the ready cartridge 330b helps to keep the cartridge 330b from undesirably wobbling and "chattering" as it is forced down the front side of the bolt member 274 and used to eject the spent casing of the fired cartridge 330a.

Figure 35:
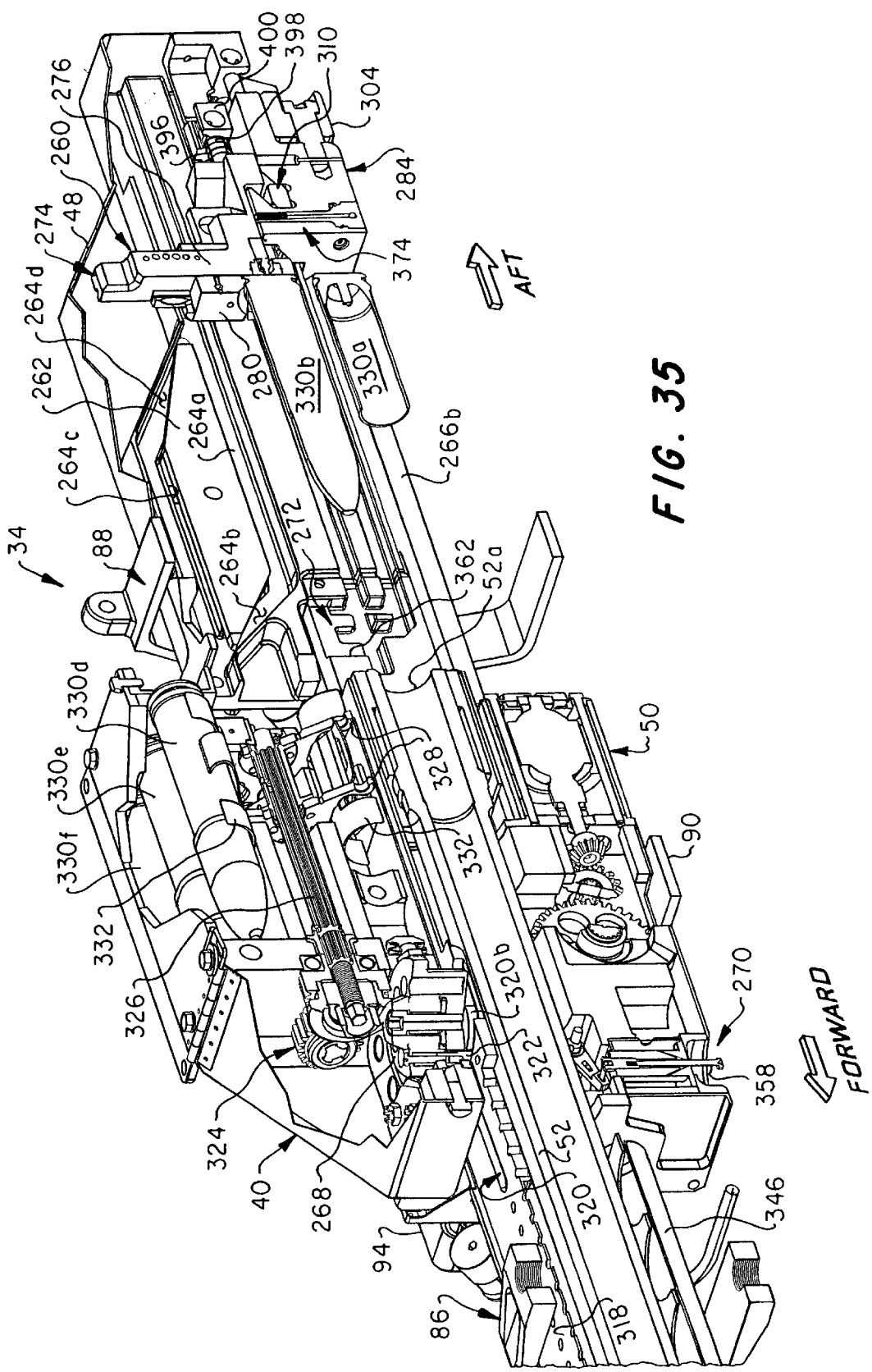
FIG. 35 is a laterally cut away left front perspective view of the gun with the bolt having reached the limit of its recoil travel.

Next, as illustrated in FIG. 35, with the gun 34 still in rearward recoil travel relative to its associated support cradle structure 36 and the feed drum 268 still being rotated in a counter indexing direction, the bolt unit 260 reaches its rear limit of travel within the receiver 48. At this point the rear side of the bolt member 274 engages and compresses coiled buffer springs 396 supported on and projecting forwardly from rod portions 398 of a plurality of bolt recoil block members 400 suitably supported rearwardly of the bolt member 274 (see also FIG. 34).

The bolt face rollers 282 have been moved into the rear ends of the lower switch plate cam path portions 264 after having tilted the switch plates 262 in a clockwise direction as the rollers 282 exited their associated cam path portions 264d. Upon entry of the rollers 282 into the cam path portions 264a, the spring-loaded switch plates 262 have snapped back into their original positions to block the re-entry of the rollers 282 into the cam path portions 264d from the cam path portions 264a.

The movement of the bolt face rollers 282 into the lower cam path portions 264a correspondingly moves the bolt face member 280 to its lower limit position on the bolt member 274. In turn, the bolt face member 280 moves the ready cartridge 330b downwardly into alignment with the chamber 52a and causes the ready cartridge 330b to downwardly push the spent cartridge 330a off the front side of the bolt member 274 so that the spent cartridge 330a is downwardly ejected through the open bottom side portion 48a of the receiver 48 as indicated in FIG. 35. Notice that with the operational cycle of the gun 34 in its FIG. 35 stage, the secondary mass member 304 is spring-biased rearwardly away from the opposing rear abutment surface portion 284a of the operating rod body structure 284.

After the rearwardly traveling bolt unit 260 strikes and compresses the bolt buffer springs 396 the bolt unit/buffer structure impact rearwardly kicks the gun 34 through the final increment of its recoil travel, as shown in FIG. 36, while at the same time utilizing the compressed guide rod and bolt buffer springs 342 and 396 to cause the bolt unit 260 (and thus the operating rod structure 266,284) to bounce forwardly, in a counter-recoil direction, relative to the still rearwardly recoiling gun 34 in a counter-recoil direction. At this time the feed drum pin 322 has entered the forward feed cover plate slot portion 320a, and the feed drum has been fully back-indexed and is ready to initiate the next ammunition feed cycle. Also, as indicated in FIG. 36, the forwardly moving bolt unit 260 is moving the captured cartridge 330b forwardly toward the chamber 52a with which the cartridge 330b is aligned.

Figure 37:
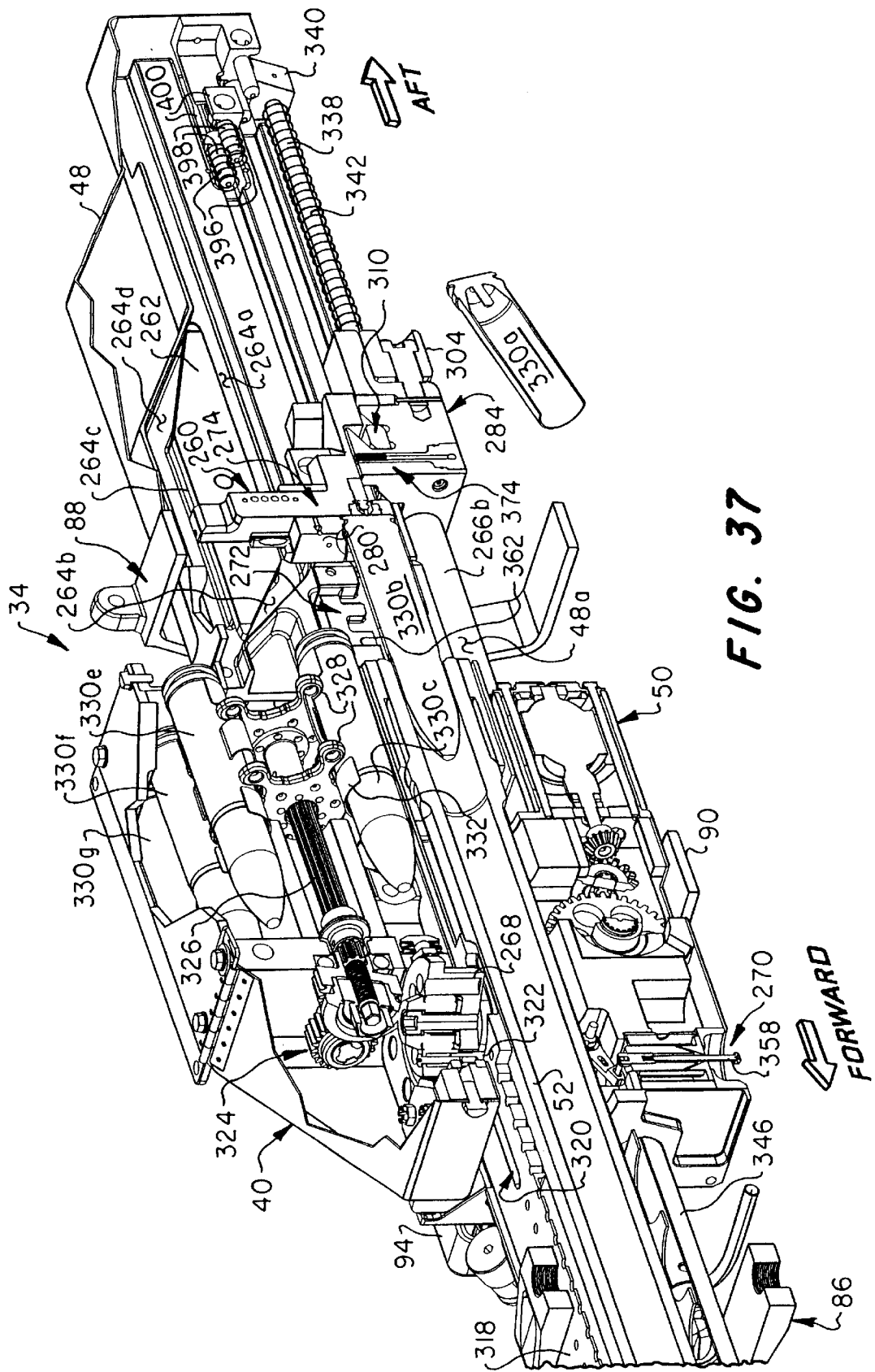
FIG. 37 is a laterally cut away left front perspective view of the gun in which the bolt and gun are now both in full counter-recoil travel with the next cartridge feed cycle having been initiated.

Next, as indicated in FIG. 37, the gun 34 begins its forward counter-recoil motion (such motion being created by the resilient recoil assemblies disposed in the gun's recoil housings 58 as, later described herein) so that now both the gun and the bolt/operating rod structures are moving forwardly in the counter-recoil direction. Previously ejected spent cartridge 330a has been hit by the front side of the forwardly moving operating rod body structure 284 and knocked forwardly and clear of the gun 34.

The forward counter-recoil movement of the gun 34 relative to its associated support cradle structure 36 initiates the ammunition feed cycle by causing the feed drum pin 322 to enter and rearwardly traverse the central angled feed cover plate cam slot portion 320b to thereby rotate the feed drum 268 in a feed direction opposite from its previously described back-indexing direction. Rotation of the feed drum 268 in this reversed direction correspondingly rotates the sprockets 328 in their feed direction—i.e., in a clockwise direction as viewed from the front in FIG. 38. The feed drum index is 120 degrees for 60 degrees of sprocket rotation. From their FIG. 36 position to their FIG. 37 position, the feed sprockets 328 have been rotated 10 degrees in response to a 20 degree driven rotation of the feed drum 268. This rotationally advances the cartridge 330c closer to its "ready cartridge" orientation.

In the meantime, the forwardly moving bolt unit 260 has begun to chamber the captured cartridge 330b. Additionally, the forwardly moving bolt unit 260 has brought the bolt face rollers 282 to the forward end of the lower switch plate cam path portions 264a while the bolt face member 280 has remained in its lower limit position on the bolt member 274. This readies the rollers 282 for entry into their associated front end cam path portions 264b to thereby upwardly cam the bolt face member 280 toward its upper limit position on the bolt member 274. It should be noted that at this FIG. 37 point in the operational cycle of the gun 34 the gun is still well aft of its at rest "in battery" position, while the bolt unit 260 is almost fully forward within the gun and is chambering the new cartridge 330b.

Figure 38:
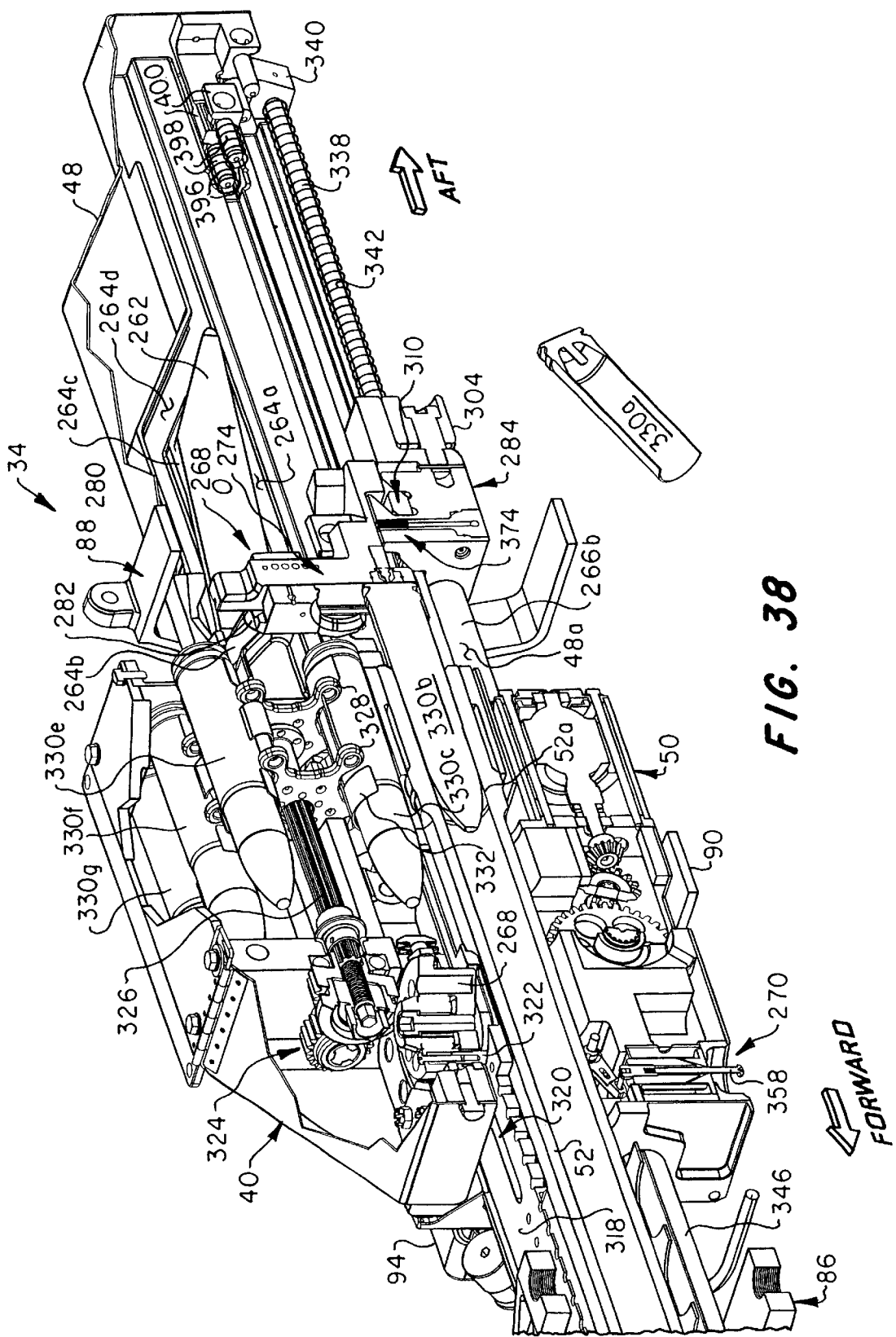
FIG. 38 is a laterally cut away left front perspective view of the gun as the feed cycle continues with the bolt face moving upwardly.

During the next stage of the gun's operational cycle, shown in FIG. 38, the feed cycle continues, with the feed drum 268 now having been rotated through approximately half of its total 120 degree feed rotation so that the sprockets 328 have correspondingly been rotated approximately 30 degrees. The right bolt face roller 282 is forwardly traversing the inclined front end portion 264b of the switch plate cam path 264, and the bolt face member 280 has been moved approximately half way up the bolt member 274 toward its upper limit position. The cartridge 330b is being further chambered, and is now far enough into the chamber 52a to permit the bolt face ejectors 334 (not visible in FIG. 38) to move out and over the cartridge 330c.

Figure 39:
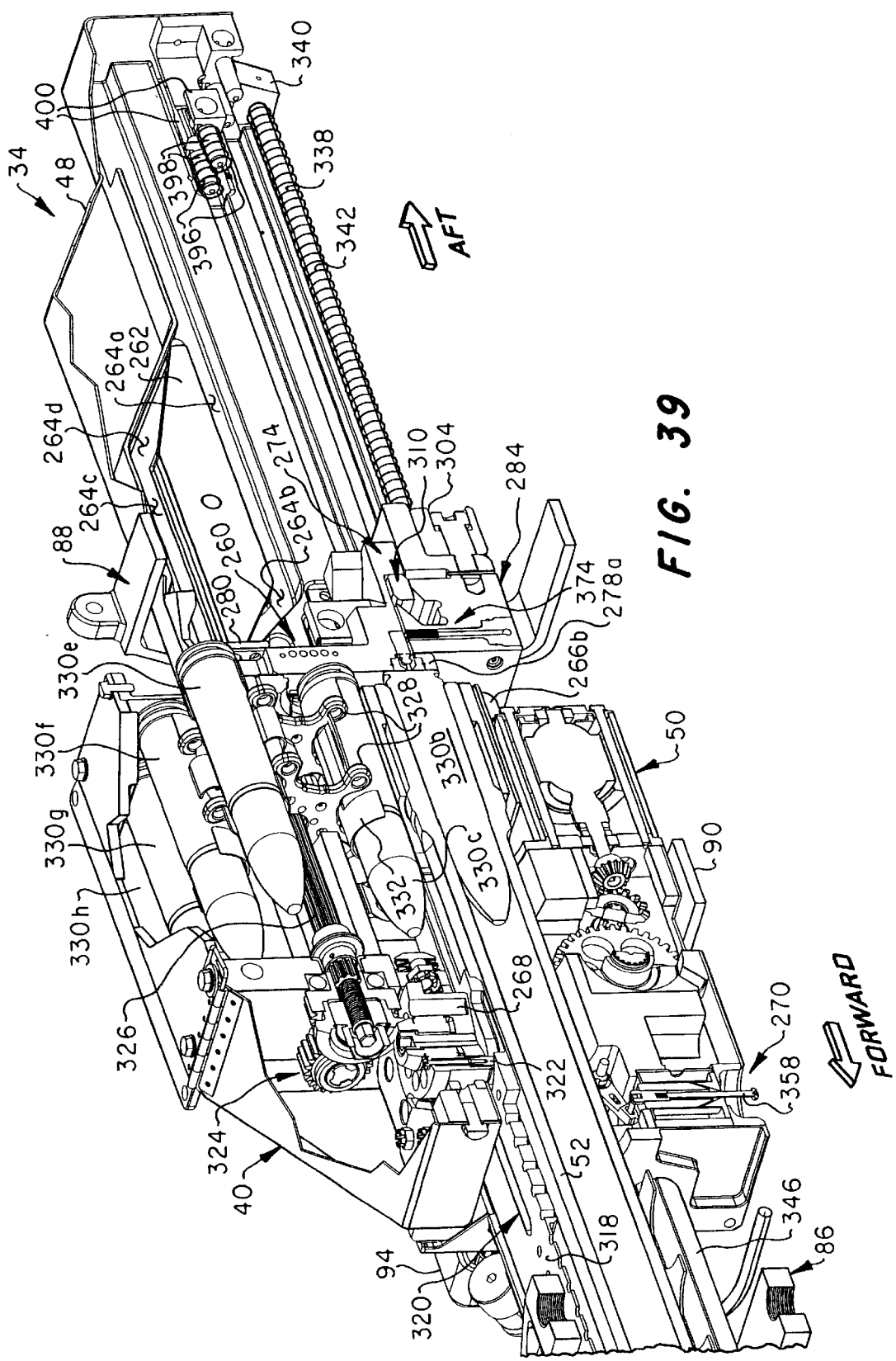
FIG. 39 is a laterally cut away left front perspective view of the gun with the bolt now locked, the feed cycle continuing during forward movement of the gun, and the second cartridge in the chamber ready to be fired.
Figure 40:
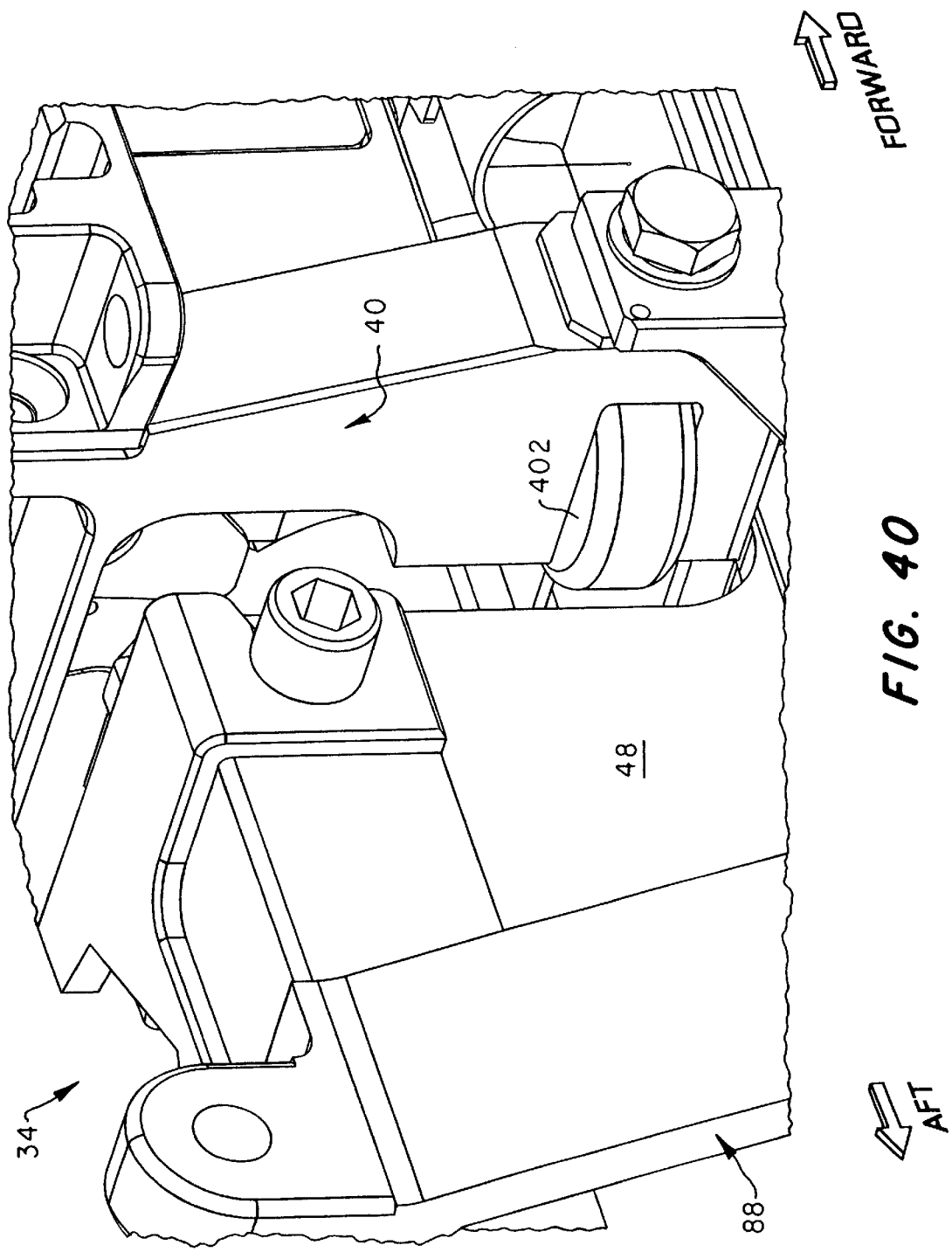
FIG. 40 is an enlarged scale right rear side perspective detail view of a portion of the gun entering and being aligned with the feeder during forward movement of the gun as shown in FIG. 39.
Figure 41:
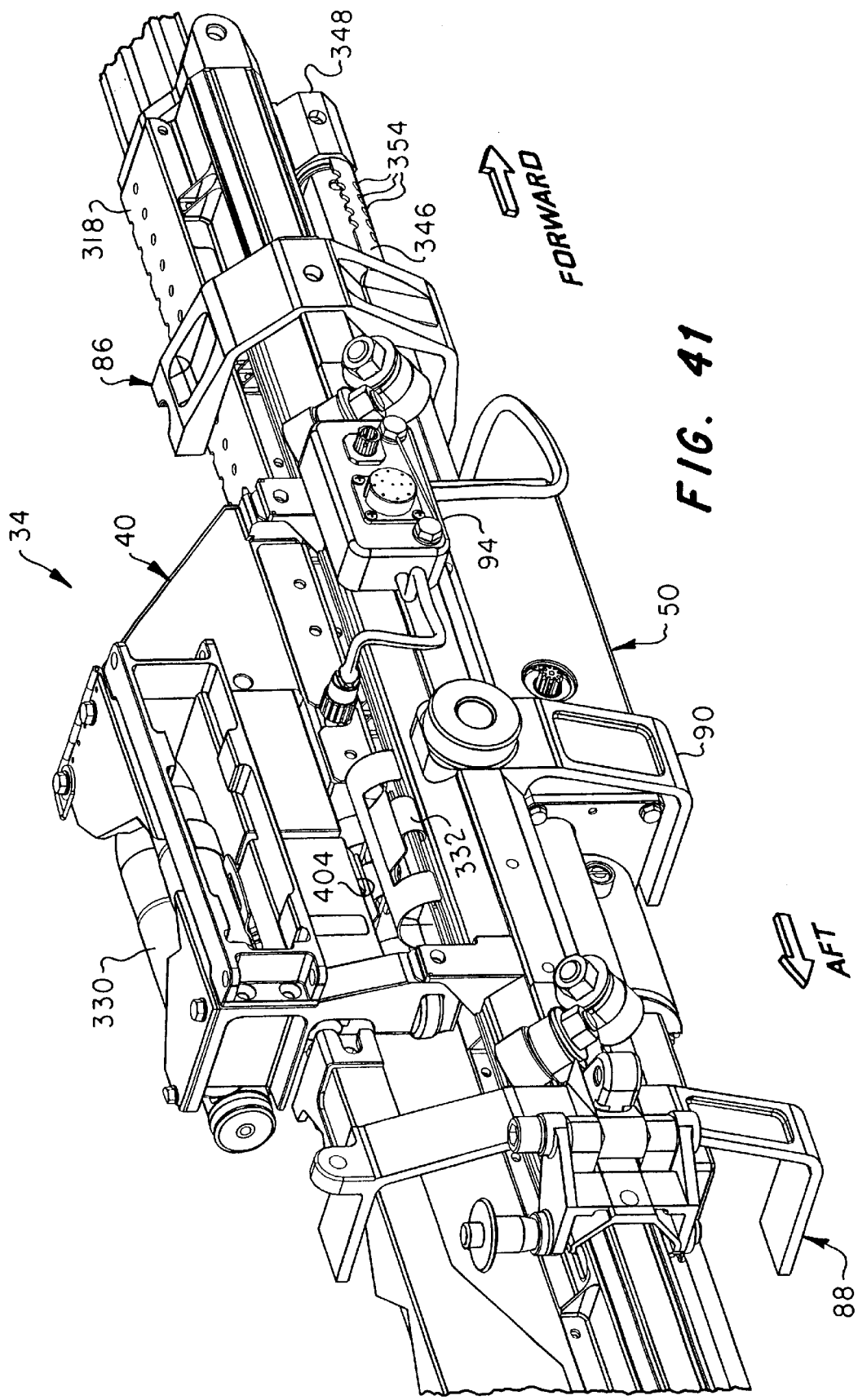
FIG. 41 is a partially cut away right rear perspective view of the gun feeder and cradle illustrating link ejection from the feeder.

Turning now to FIGS. 39–41, in the next stage of the gun's operational cycle the feed drum 268 has been rotated approximately 90 degrees through its 120 degree feed rotation, with the sprockets 328 having been rotated 45 degrees. The bolt unit 260 has reached the limit of its forward travel in the receiver, and the lock member 310 has been cammed upwardly to its uppermost position to thereby lock the bolt member 274 to the breech as previously described. The front side of the operating rod body structure 284 has forwardly struck the lower bolt member portion 278a.

As illustrated in FIG. 39, the lower firing switch structure 374 is now closed. However, the bolt face member 280 (which is now locked to the breech and being moved forwardly by the forwardly moving gun) is still forwardly approaching the bolt sensor switch 368 (not visible in FIG. 39) and has not yet contacted and closed it yet. Accordingly, the gun firing circuit is still open so that the chambered cartridge 330 cannot be fired yet. As illustrated, after the operating rod body structure 284 has forwardly struck the bolt portion 278a the secondary mass member 304 forwardly strikes the bottomed-out operating rod body structure 284 to stop undesirable rear kick-back thereof.

At about this point in the operational cycle of the gun 34 the receiver 48 forwardly enters the feed structure 40 (see FIG. 40) and is automatically centered therein by feed guide rollers 402 (see FIG. 10 also) which are mounted on the feeder 40 and rollingly engage opposite left and right side portions of the receiver 48 as it forwardly enters the interior of the feeder 40. As illustrated in FIG. 41, during the feed sprocket rotational increment between the sprocket positions shown in FIGS. 38 and 39 the rotating feed sprockets 328 eject the link 332, which previously held the now chambered cartridge 330b, outwardly through a right side opening 404 in the feeder 40.

Figure 42:
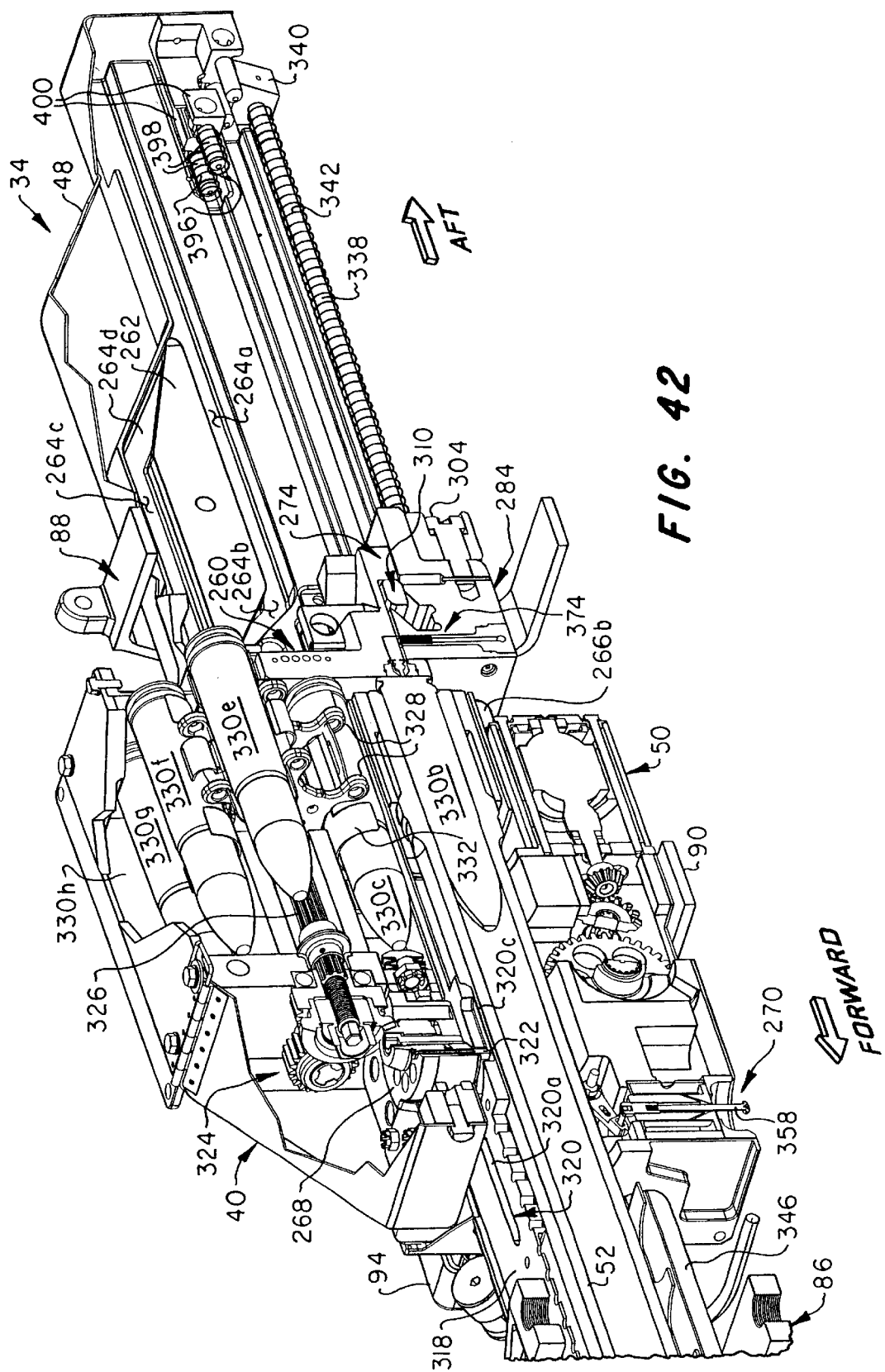
FIG. 42 is a laterally cut away left front perspective view of the gun with its feed cycle completed and its bolt unit ready to capture a new cartridge.
Figure 43:
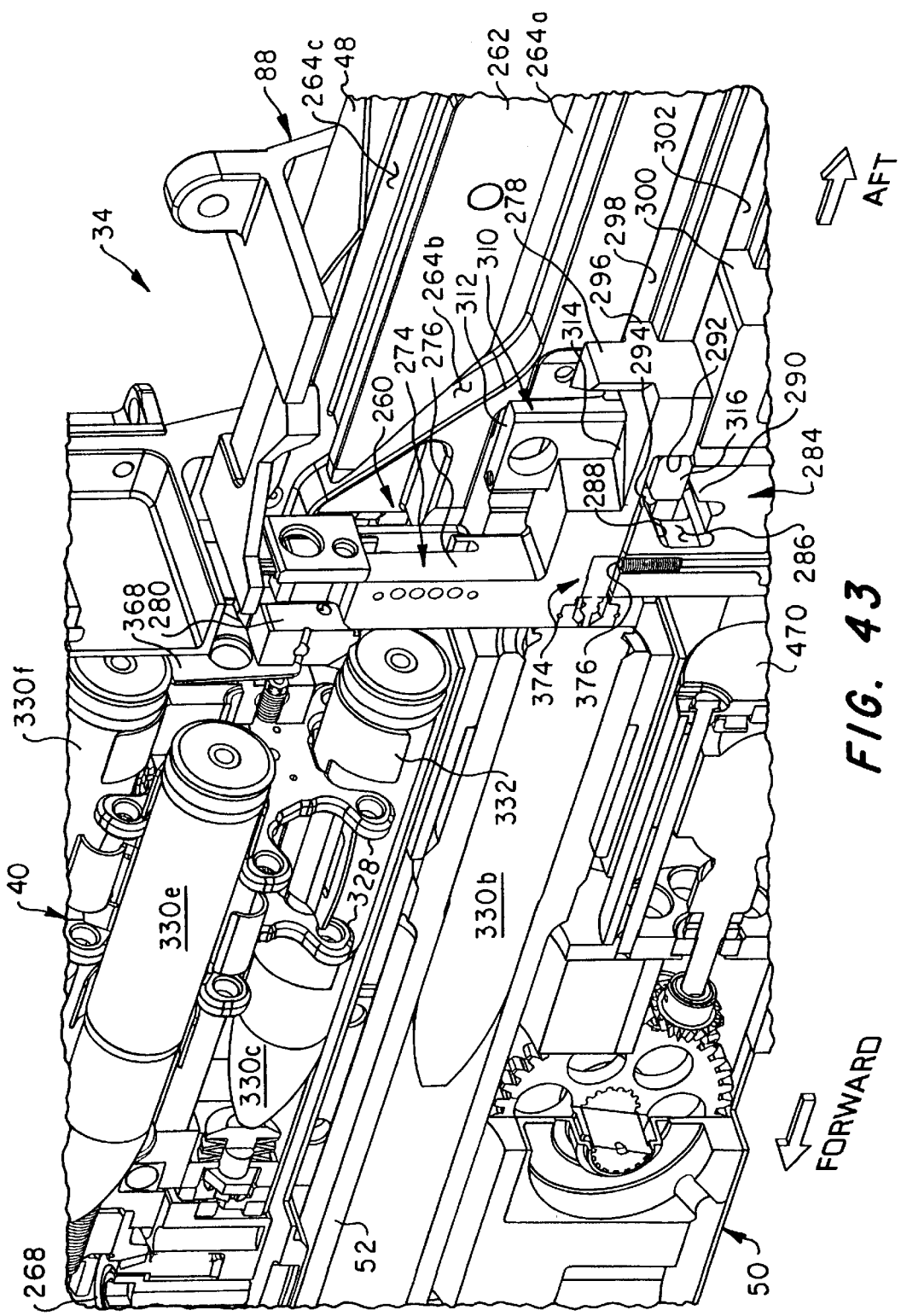
FIG. 43 is an enlarged scale perspective detail view of the bolt and feeder portions of the gun in their FIG. 42 orientations.

In the next portion of the gun's operational cycle, shown in FIGS. 42 and 43, the gun 34 has moved further forwardly through its counter-recoil movement, and the feed cycle is over. The 120 degree feed rotation of the feed drum 268 has been completed, thereby completing the corresponding 60 degree rotation of the sprockets 328, and the new ready cartridge 330c is in a position to be captured by the forwardly moving bolt unit 260 (as previously described) which is locked to the forwardly moving gun 34. The lower firing switch structure 374 is closed, but the bolt sensor switch 368 (see FIG. 43) has not yet been contacted, depressed and closed by the forwardly moving bolt face 280.

Figure 44:
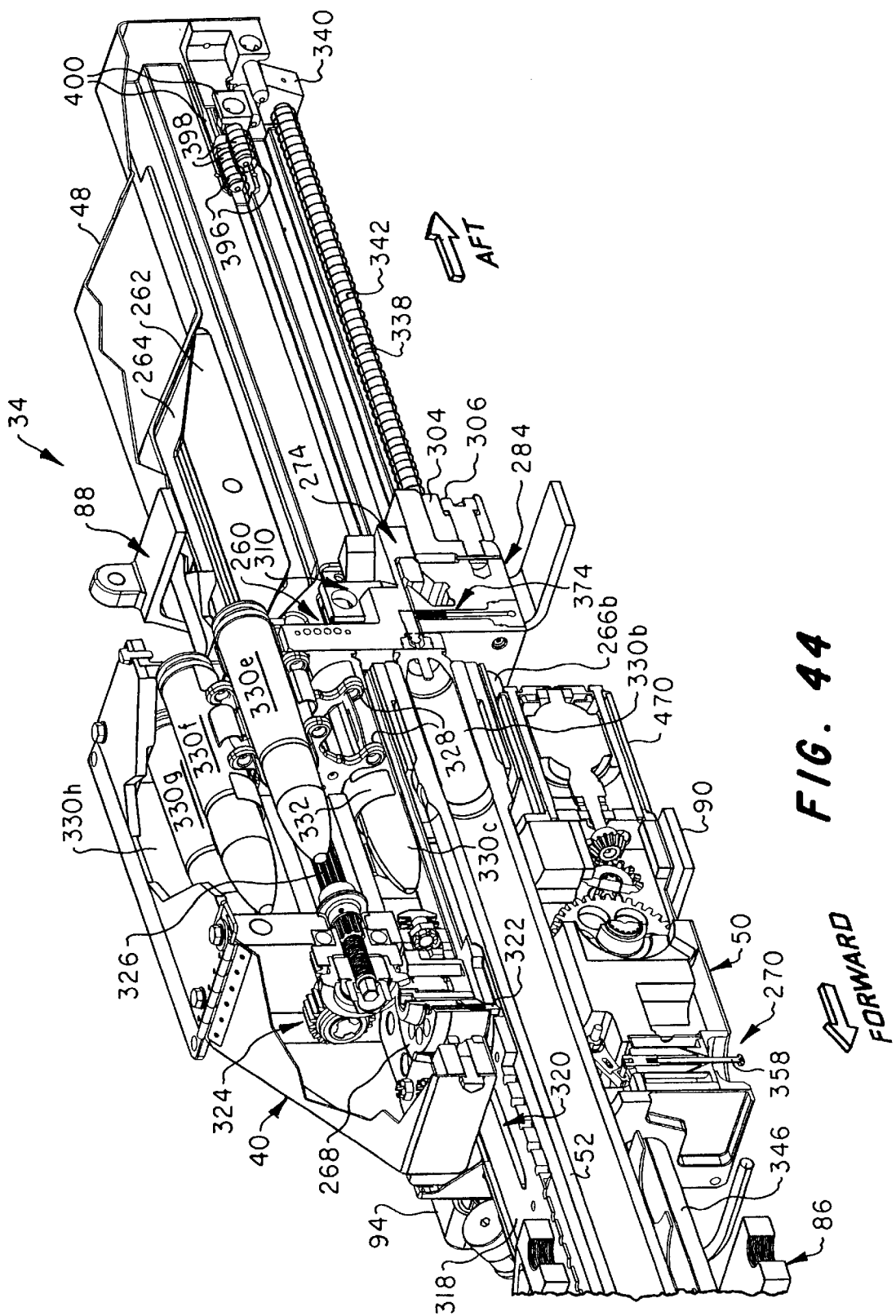
FIG. 44 is a laterally cut away left front perspective view of the gun at the firing, under the automatic mode of the gun, of the chambered second cartridge.

Finally, as indicated in FIG. 44, the forwardly moving bolt unit 260 captures the ready cartridge 330c (as previously described with respect to the previous ready cartridge 330b), and then reaches its forward limit position as it depresses the bolt sensor switch 368 (see FIG. 43) to thereby fire the first shot of the gun 34 in its automatic mode during this particular burst (the first shot having been fired, as previously mentioned, with the gun in its open bolt mode).

Because the gun in this automatic post-first shot mode is fired while it is still moving into the feeder, the initial firing impulse must first stop the gun's forward movement before gun recoil travel to the rear can start. This "out of battery" firing reduces the cartridge impulse the gun must account for by approximately twenty percent, thereby providing a substantial reduction in the gun recoil load.

During each given firing burst, the sear solenoid 356 is maintained in an energized state that keeps the sear plunger 358 in its down position to permit the operating rod structure 266,284 to be cycled back and forth as previously described. When the solenoid 356 is de-energized to end the firing burst the sear plunger 358 returns to its upper limit position and acts to stop the operating rod structure 266,284 in its FIG. 15 rear "open bolt" position.

Figure 46:
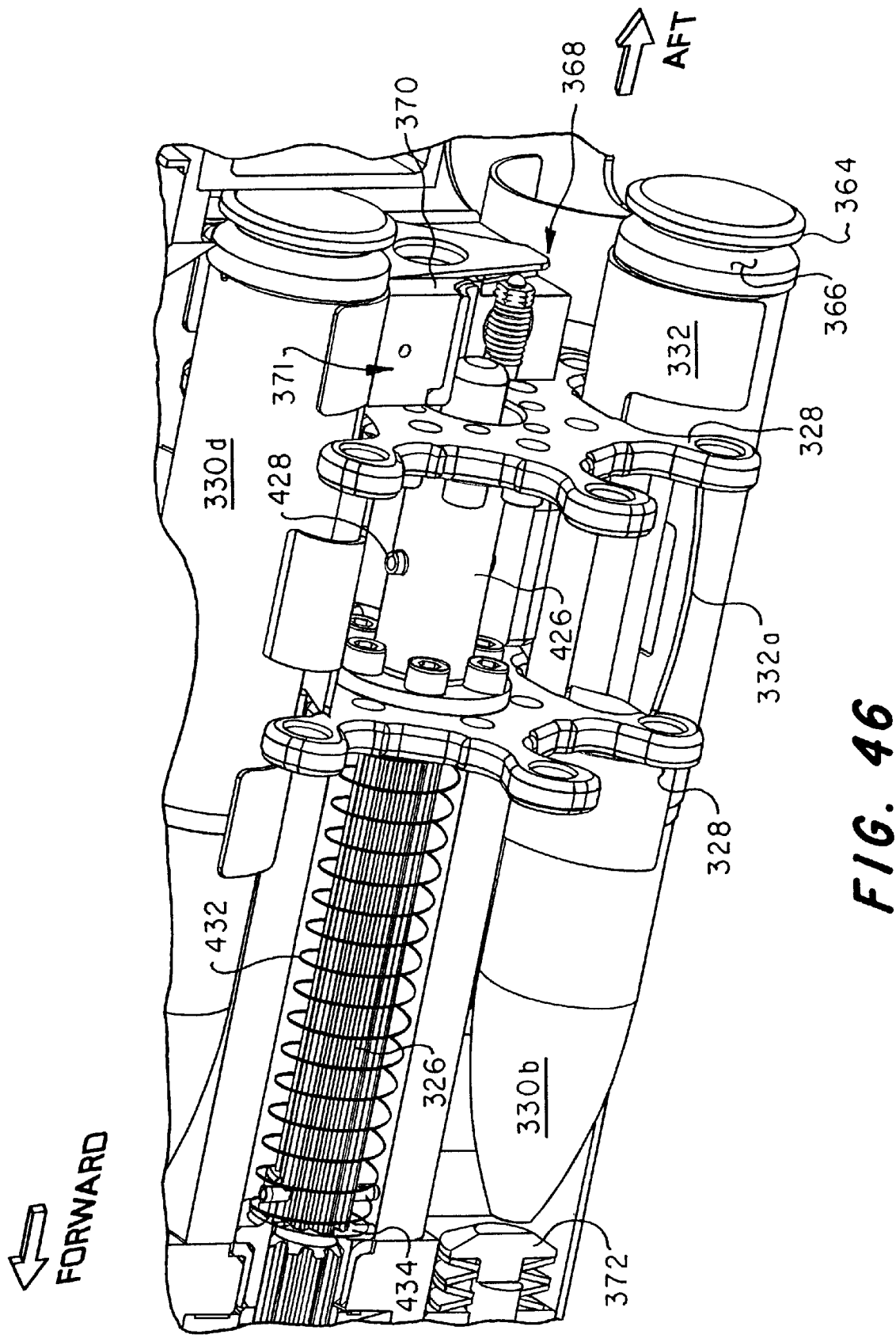
FIG. 46 is an enlarged scale perspective detail of a sprocket portion of the feed system illustrating its spring-loaded, splined connection to a drive shaft.

Turning now to FIG. 46, the previously mentioned front and rear ammunition feed sprockets 328 are mounted on a support structure 371 that includes a hollow tubular hub member 426 having opposite ends to which the sprockets 328 are secured. The interior surface of the hub 426 is grooved to slidingly receive a rear end of the splined drive shaft 326, thereby permitting the hub 426 (and thus the sprockets 328) to move forwardly and rearwardly along the drive shaft 326 while remaining locked to the shaft so as to be rotationally drivable thereby. The axial movement of he hub 426 along the rear end of the splined shaft 326 is limited by a transverse stop pin 428 extending through the hub 426 and being received in a longitudinal side surface groove 430 in a rear end portion of the splined drive shaft 326 (see FIG. 24).

The sprockets 328 and hub 426 are rearwardly biased along a rear end portion of the shaft 326, toward a stop position created by the pin 428, by a helical compression spring structure 432 that circumscribes the drive shaft 326 and bears at its opposite ends against the forward sprocket 328 and a rearwardly facing annular exterior shoulder surface 434 on the shaft. For illustrative clarity the spring structure 432 has been shown in FIG. 46 as being a single spring. However, the spring structure is preferably a nested, counterwound pair of helical compression spring members.

A central portion 332a of the link 332 on the ready cartridge 330b is closely received between the facing side surfaces of the sprockets 328. The sprockets 328 holds the link portion 332a and prevents it from moving forward. When the ready cartridge 330b is pushed forward by the bolt, the sprockets 328, and their associated support structure 371, are free to move forward a limited amount while still supporting the link 332 and ready cartridge 33b in the feeder. Thus, the forwardly moving cartridge 330b moves the link 332 forward which, in turn, forwardly moves the sprocket structure against the resilient resistance of the spring structure, the forward movement of the cartridge 330b being limited, as previously described, by the ogive bumper 372. Additionally, when the bolt forwardly contacts the sprocket support structure face 370 the sprocket structure is forwardly moved against the resistance of the spring structure 432.

The receiver 48 (see FIG. 5) has a top rear portion 48a, and a pair of opposite left and right side plate portions 48b to which the previously mentioned recoil housings 58 are removably attached. The right receiver side plate 48b is shown in FIG. 47 with its recoil housing 58 (see FIG. 5) having been removed to uncover a resilient recoil assembly 436 secured to the outer side of the right receiver side plate portion 48b. The left receiver side plate portion 48b (not shown in FIG. 47) has an identical resilient recoil assembly secured thereto and covered by its recoil housing 58. In a manner subsequently described herein, the recoil assemblies 436 mounted on opposite sides of the gun 34 serve to resiliently and yieldingly resist the rearward firing recoil of the gun, and to create the necessary forward counter recoil movement of the fired gun.

FIG. 47 shows the right side recoil assembly 436 in the position it assumes when the gun 34 is stationary relative to its associated cradle structure 36. With additional reference now to FIG. 48, the illustrated right resilient recoil assembly 346 includes, beginning from the rear end of the illustrated receiver side plate 48a and moving toward its front end, (1) a spring-loaded hydraulic recoil shock absorber 438 fixedly secured to a rear end portion of the side plate 48b; (2) a recoil block unit 440 which is not secured to the side plate 48b; (3) an elongated guide rod structure 442 circumscribed by a longitudinally spaced plurality of tubular recoil springs 444 (representatively four in number) and slidably extending through a plurality of tubular spring spacer members 445; (4) a recoil spring stop 446 fixedly secured to the side plate 48b; and (5) a hydraulic recoil damper 448 fixedly secured to the side plate 48b.

Shock absorber 438 has a front end plunger portion 450 that extends toward an elastomeric bumper member 452 secured to the rear side of the recoil block 440. The vertical pin 134 (see FIGS. 5 and 6), which is anchored to the cradle structure 36, extends downwardly through an opening 454 in the recoil block 440, thereby locking the block 440 to the cradle structure 36 relative to which the gun 34 is movable.

Springs 444 bear at their opposite ends against outwardly projecting flange portions 456 of the spacer members 445, with a front longitudinal portion of the guide rod structure 442 slidably extending through an opening 458 in the recoil spring stop 446 and having a threaded front end 460. Threaded front end 460 is secured to the outer end of a rearwardly extending plunger portion 462 of the recoil damper 448.

As shown in FIG. 7, with the gun 34 at rest in its associated cradle 36 the recoil shock absorber plunger 450 (see FIG. 48) is fully depressed and forwardly engaging the elastomeric bumper 452, the springs 444 are in partially compressed states, and the recoil damper plunger 462 is rearwardly extended. When the gun 34 is fired and placed in rearward recoil motion relative to its cradle 36, the right receiver side plate 48b (like the left receiver side plate) is driven rearwardly relative to the stationary recoil block 44 as indicated by the arrow 464 in FIG. 49, and as may be seen by comparing FIGS. 47 and 49.

This rearward recoil movement of the receiver side plate 48b also moves the recoil shock absorber 438, the recoil spring stop 446 and the recoil damper 448 rearwardly relative to the stationary recoil block 440. In turn, as indicated in FIG. 49, this further compresses the springs 444, which resiliently resist the gun's rearward recoil motion, moves the shock absorber plunger 450 away from the elastomeric bumper 452, and forces the damper plunger 462 further into the body of the recoil damper 448 to thereby damp the gun's rearward recoil force.

When the gun reaches the rearward limit of its recoil travel, as previously discussed herein, the compressed springs 444 drive the gun forwardly through its counter recoil motion until the illustrated receiver side plate 48b is returned to its FIG. 47 position relative to the stationary recoil block 440. As the gun reaches such FIG. 47 position, the shock. absorber plunger 450 contacts the elastomeric bumper 452 and is driven back into the body of the shock absorber 438, the damper plunger 462 is extended further outwardly from the recoil damper 448, and the shock absorber 438 is stopped against the stationary elastomeric bumper 452 which serves to cushion the shock of the shock absorber 438 being stopped by the stationary recoil block 440. The damper 448 at the forward end of the assembly 436 serves to compensate for the possible adverse effects of spring frictional forces on the recoil absorbing capabilities of the recoil assembly 436 during recoil and counter recoil movements of the gun 34 relative to its support cradle 36.

Turning now to FIGS. 50–55, the charger and sear assembly housing 50 mounted on the underside of the gun 34 is of a generally rectangular configuration (see FIGS. 53 and 55) and has a front end 466, a rear end 468 from which a charger motor 470 rearwardly projects, top and bottom side walls 472 and 474, and left and right side walls 476 and 478. The left and right operating rods 266a,266b respectively extend through left and right portions of the housing 50, passing through circular openings 480 in the front and rear ends 466,468 of the housing 50.

The sear assembly 270 is carried in a front end portion of the housing 50 and, as previously mentioned, is used to prevent chambering of ammunition rounds prior to firing the gun 34. As will now be described, the sear assembly prevents this round chambering by releasably holding the operating rods 266a,266b in their rearwardly shifted positions against the forward shifting forces exerted thereon by the drive springs 342 (see FIG. 17). To facilitate this releasable sear assembly holding of the operating rods 266a,266b in their rearwardly shifted positions, the top side of each of the operating rod front end caps 344 (see FIG. 52) has formed thereon a forwardly facing arcuate ledge 482. Each ledge 482 has, as viewed from the front, a generally concave curvature.

Still referring to FIGS. 50–55, the sear assembly 270 includes (1) a vertically movable solenoid core 484 that carries the solenoid plunger 358 and is upwardly biased within the sear solenoid 356 by the coil spring 360; (2) left and right sear members 486 having rearwardly facing operating rod-engaging rollers 488 thereon; (3) a rotatable drive rod 490; (4) a sear link arm 492 positioned adjacent the right sear member 486; (5) a mechanically advantaged sear bar linkage having pivotally interconnected first and second bar portions 494,496 positioned adjacent the sear link arm 494; and (6) a drive ring 498.

The sear members 486 are rotatably carried in well areas 500 on the top side 472 of the housing 50, and are locked to the shaft 490 for conjoint rotation therewith. A rear end portion of the sear link arm 492 (see FIG. 50) is also locked to the shaft 490, with a front end of the sear link arm 492 underlying a rearwardly projecting front end portion 496a of the sear bar 496. The rear end of the sear bar 494 is pivotally connected to the rod 490, the rear end of the sear bar 496 is pivotally connected to a longitudinally intermediate portion of the sear bar 494, the front end of the sear bar 494 is pivotally connected to a drive pin 502 carried on the top end of the solenoid core 484, and the front end of the sear bar 496 is pivotally connected to an adjacent portion of the housing 50.

The drive ring 498 (see FIG. 54) circumscribes the drive rod 490, is rotatably carried on an inner side portion 500a of the left sear well 500, and is rotationally locked to the drive rod 490. A generally tangential notch 504 is formed in the bottom side of the drive ring 498 and receives the front end of a biasing plunger 506 (see FIGS. 54 and 55) which is forwardly driven by a coil spring 508 (see FIGS. 53 and 55). Via the action of the spring-driven plunger 506 on the drive ring 498 the drive ring 498 (and thus the drive rod 490) is rotationally biased in the direction of arrow 510 in FIG. 54.

This, in turn, rotationally biases the left and right sear members 486 rearwardly and downwardly to their "on sear" positions (with the solenoid 356 de-energized) in which their rollers 488 (see FIG. 50) engage the operating rod front end cap arcuate ledges 482 in a manner releasably holding the operating rods 266a,266b in their rearwardly retracted "on sear" positions. With the operating rods 266a,266b in these positions the components of the sear assembly 270 are in their FIG. 50 orientations, with the solenoid core 484 being in its "up" position.

Figure 51:
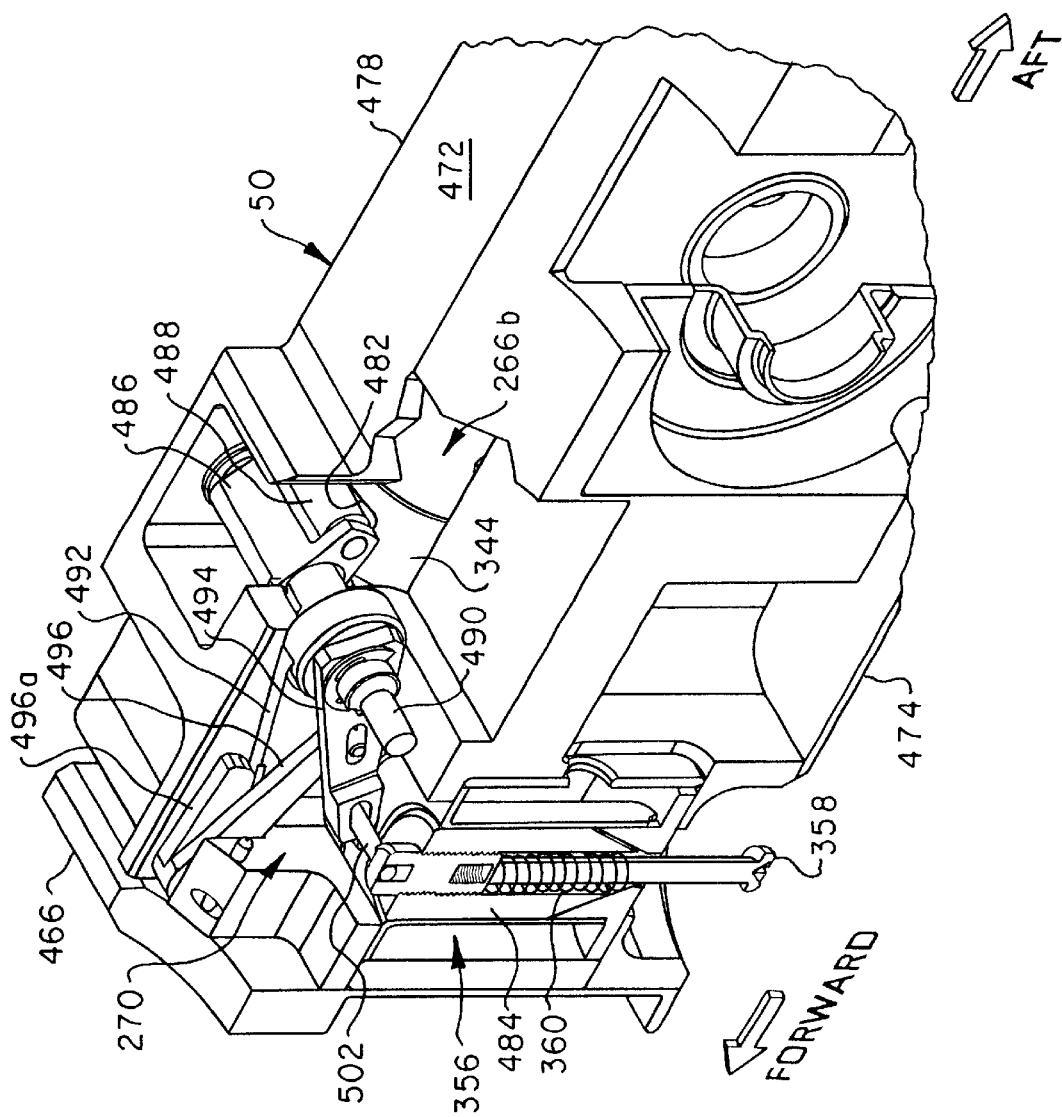
Figure 52:
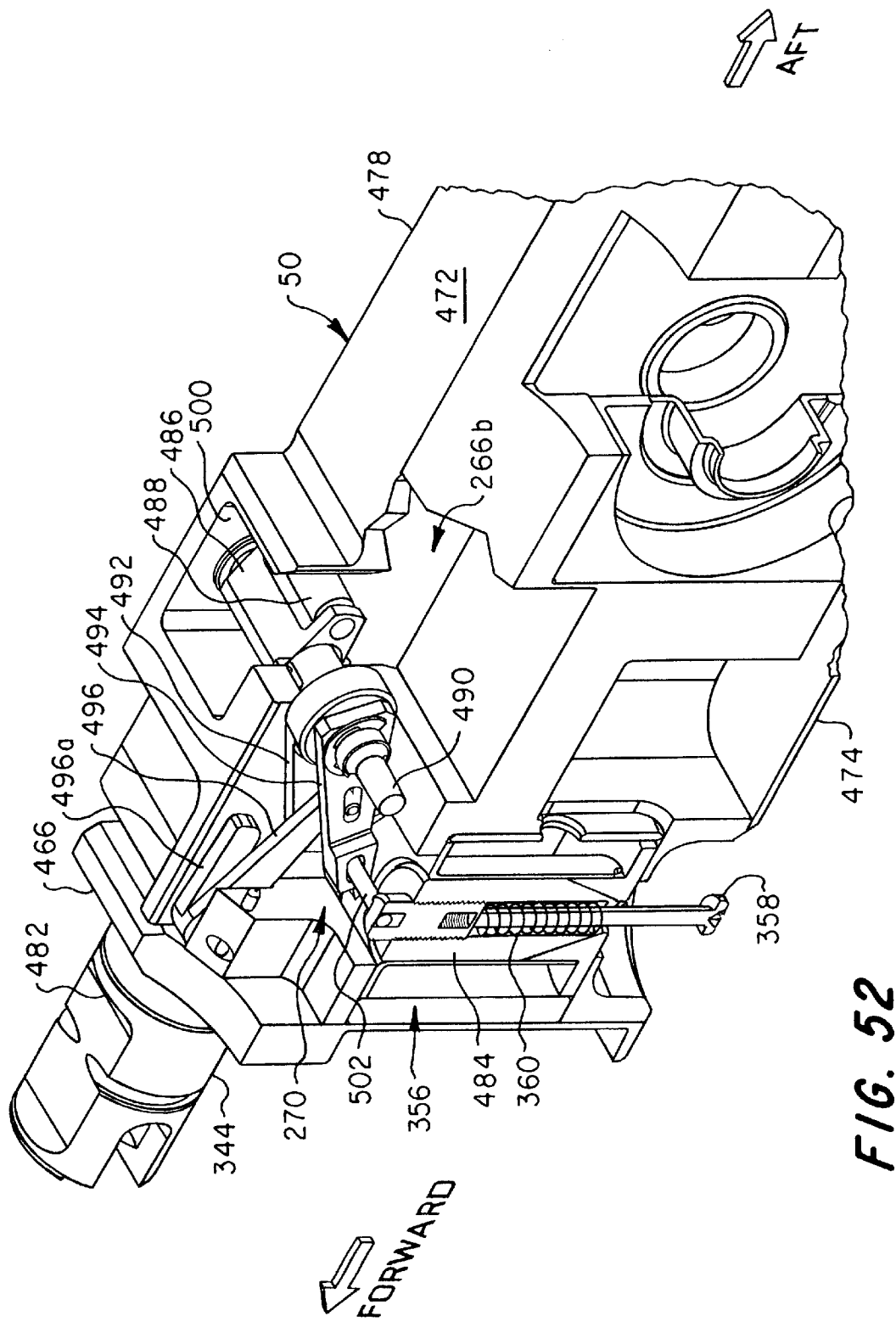
Figure 53:
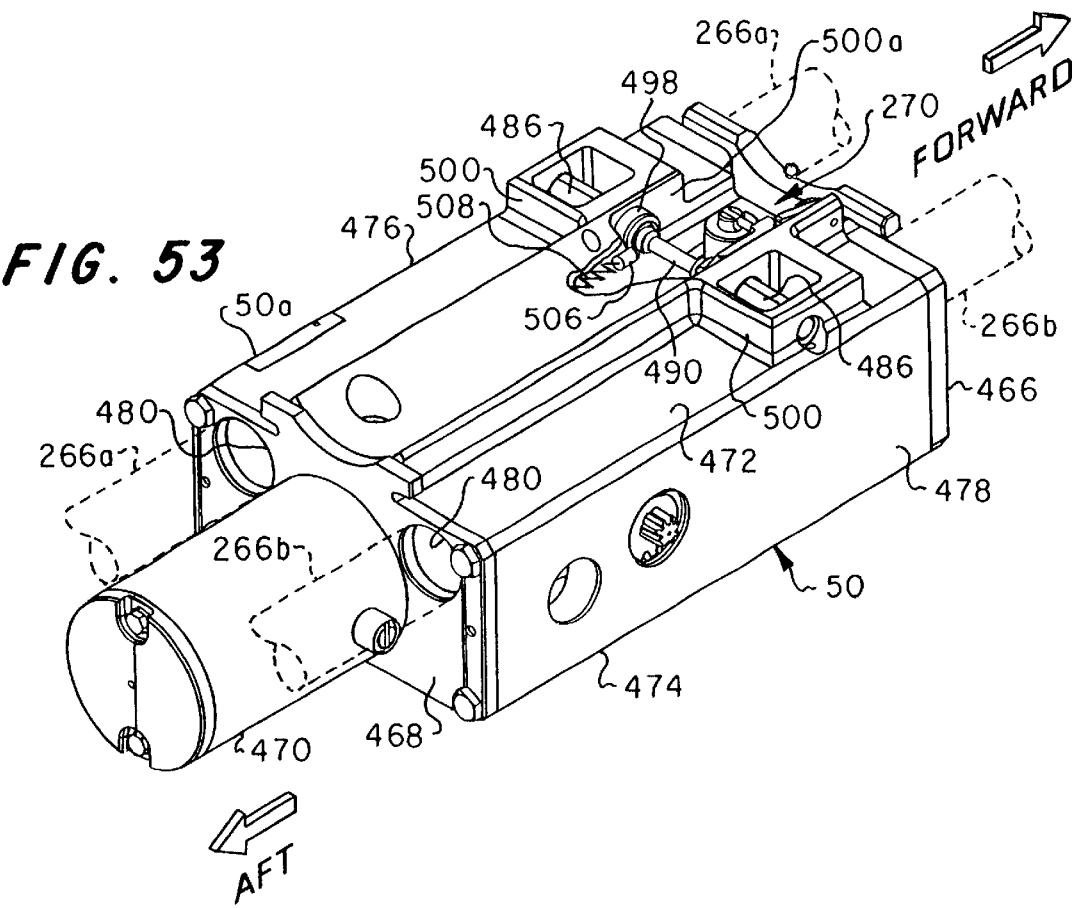
FIG. 53 is a partially cut away bottom rear side perspective view of the gun's charger/sear assembly illustrating portions of assembled sear system.
Figure 54:
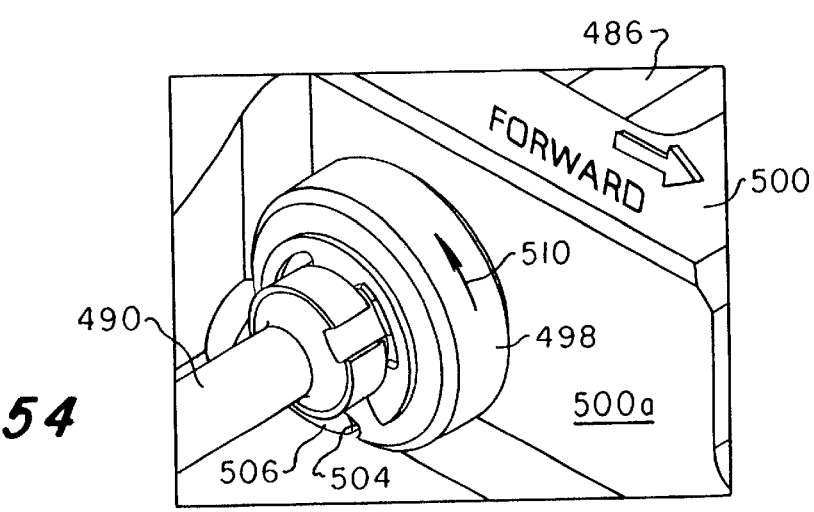
FIG. 54 is an enlarged scale perspective detail view of a drive ring portion of the sear assembly.
Figure 55:
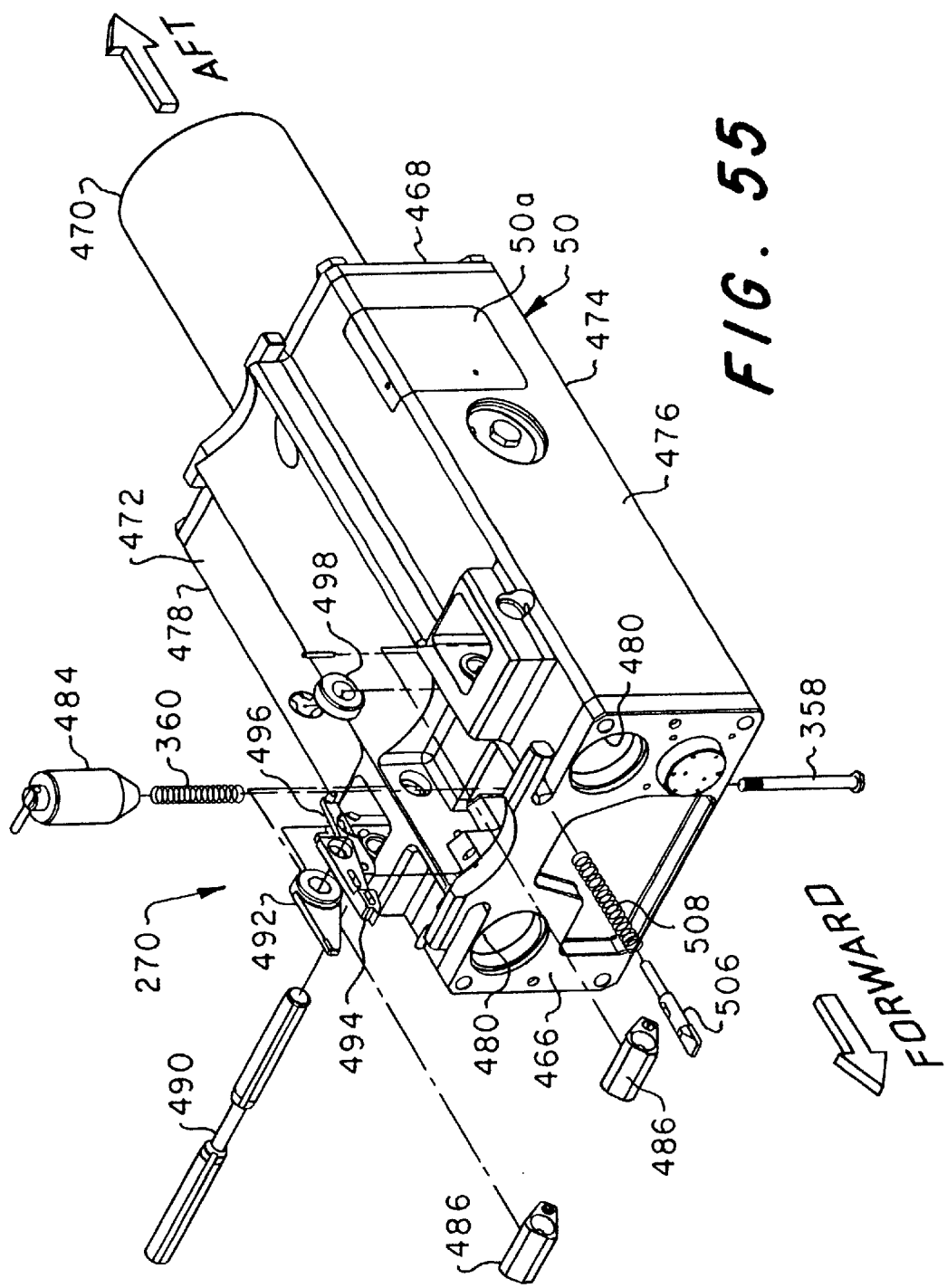
FIG. 55 is a partially exploded bottom front side perspective view of the charger/sear assembly.
Figure 56:
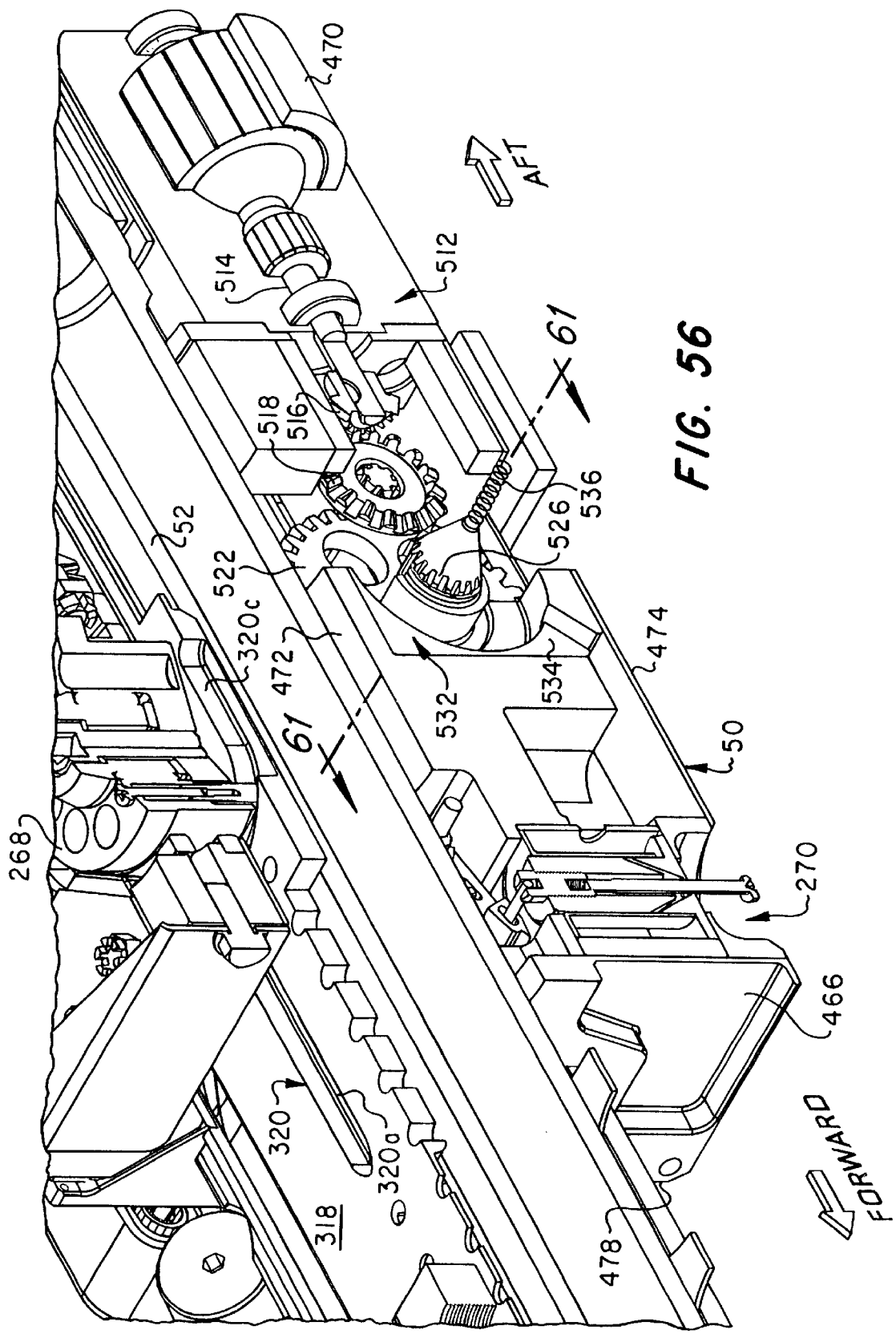
FIG. 56 is an enlarged scale laterally cut away perspective view of the sear and charger assemblies.

When the gun 34 is fired, electrical current is sent to the sear solenoid 356 and causes the core 484 to be driven downwardly, against the resistance of the spring 360, to its FIG. 51 position. This, in turn, forcibly pivots the sear bar linkage 494,496 in a manner causing it to exert a mechanically advantaged pivotal force on the sear link arm 492 to cause it to upwardly pivot the sear rollers 488 part way up the arcuate end cap ledges 482. At this point the rollers 488 are moved upwardly past a "pinch" angle on the ledges 482 to permit the forwardly spring-biased ledges 482 (via the operating rod drive springs 342) to drive the rollers further upwardly, thereby permitting the ledges 482 to be forwardly driven past the sear members 488 (see FIG. 52) and freeing the operating rods 266a,266b from the sear assembly 270.

During firing of the gun 34 after this release of the sears 486 from the operating rods 266a and 266b, the downwardly displaced core 484 of the still energized solenoid 356 rotationally displaces the sear members 486 upwardly (against the opposite downward sear biasing force of the drive ring plunger spring 508) a sufficient distance such their rollers 488 are above the pinch angle of the end cap ledges 482. Accordingly, every time during a firing burst that the ledges 482 pass the sear rollers 488 they simply upwardly displace them without being stopped thereby.

When the solenoid 356 is subsequently de-energized, the resulting upward movement of its core 484 causes the sear rollers 488 to be rotationally lowered to their FIG. 50 locking positions, as the operating rod end cap ledges 482 rearwardly pass them, to again lock the operating rods in their rearwardly retracted "on sear" positions.

It should be noted that, in sharp contrast to conventional sear design, the sears 486 need not be pulled completely out of the path of their associated operating rod stop surfaces to effect the locking of the operating rods 266a,266b in their rearwardly retracted positions. Additionally, because of the mechanically advantaged sear release linkage, and the use of the arcuate shape of the end cap ledges 482 to partially raise the sear rollers 488, the required size of the solenoid 356 is substantially reduced.

Turning now to FIGS. 56–61, during certain pre-firing conditions of the gun 34 (such as when has just been reloaded), the operating rods 266a,266b are in their forwardmost positions within the gun and must be retracted to their "on sear" positions (see FIG. 50) before the gun can be fired. This initial retraction of the operating rods 266a,266b is performed in the gun 34 using a specially designed charger assembly 512 which is carried in a rear portion of the housing 50 rearwardly of the previously described sear assembly 270.

The previously mentioned drive motor portion 470 of the charger assembly 512 is positioned on the rear end of the housing 50 and has a forwardly extending drive shaft 514 connected to a bevel gear 516 which is meshed with an intermediate gear 518 having a stem pinion secondary gear portion 520 thereon. Stem pinion gear portion 520, in turn, meshes with a pinion drive gear 522 having an internally grooved hub 524 (see FIG. 61 that slidably receives a splined end portion 526 of a pinion gear 528. Pinion gear 528 (see FIG. 57) is slidably received in a central opening in a ball bearing 530 supported on the right side wall 478 of the housing 50. As can be seen by comparing FIGS. 57 and 58, the pinion gear structure 526,528 is rotationally locked to the pinion drive gear 522, but can slide in left and right directions relative thereto.

The splined end portion 526 of the pinion gear 528 forms the core of a charger solenoid 532 and is biased rightwardly within the solenoid housing 534 by a coil spring 536 which circumscribes a leftwardly extending plunger 538 secured to the splined end portion 526. Plunger 538 is slidably extended through a suitable support portion 540 within the housing 50, and the spring 536 bears at its opposite ends against the left end of the splined end portion 526 and the support portion 540.

Figure 57:
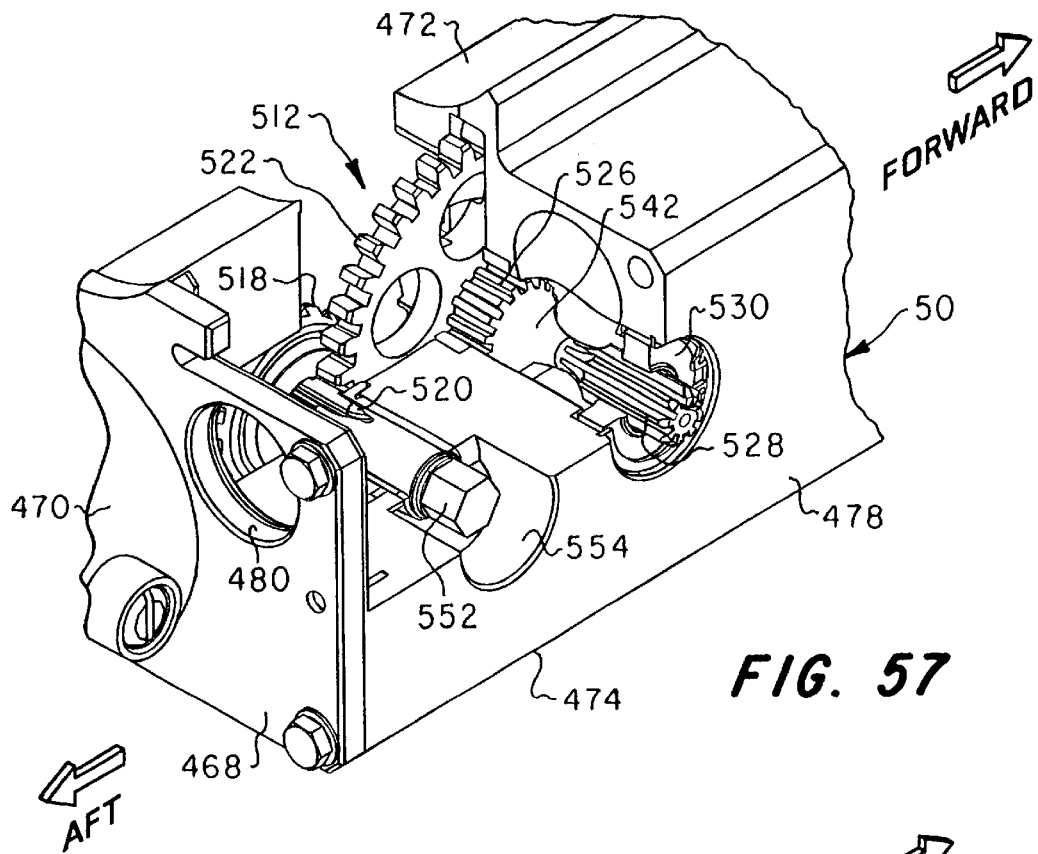

With the charger solenoid 532 de-energized, the pinion gear structure 526,528 is spring-driven rightwardly to its position shown in FIGS. 57 and 61. In this position of the pinion gear structure 526,528 a nontoothed central portion 542 thereof (see FIG. 57) underlies the right operating rod 266b (not shown in FIG. 57) and does not drivingly engage it. Thus, with the charger solenoid 532 de-energized the charger assembly 512 does not interfere with the forward and rearward movement of the right operating rod 266b.

Figure 58:
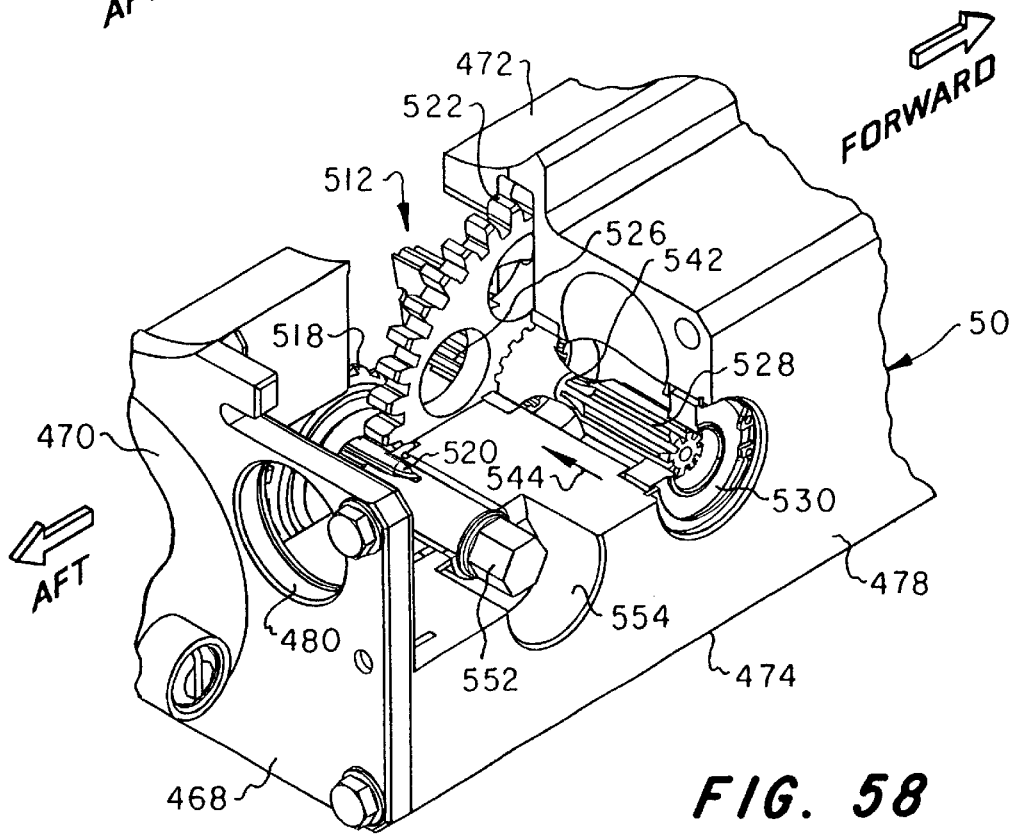

When it is necessary to charge the gun 34, (with the operating rods in their forwardmost positions within the gun) the charger solenoid 532 is energized to thereby leftwardly shift the splined end portion 526 of the pinion gear to its FIG. 58 position (as indicated by the arrow 544 in FIG. 58) against the force of the spring 536, thus also moving the plunger 538 to its FIG. 61 dotted line position. This leftward shift of the pinion gear 528 brings its teeth into meshed engagement with a gear rack 546 formed on a flattened underside portion 548 of the right operating rod 266b (see FIGS. 59 and 60).

Figure 50:
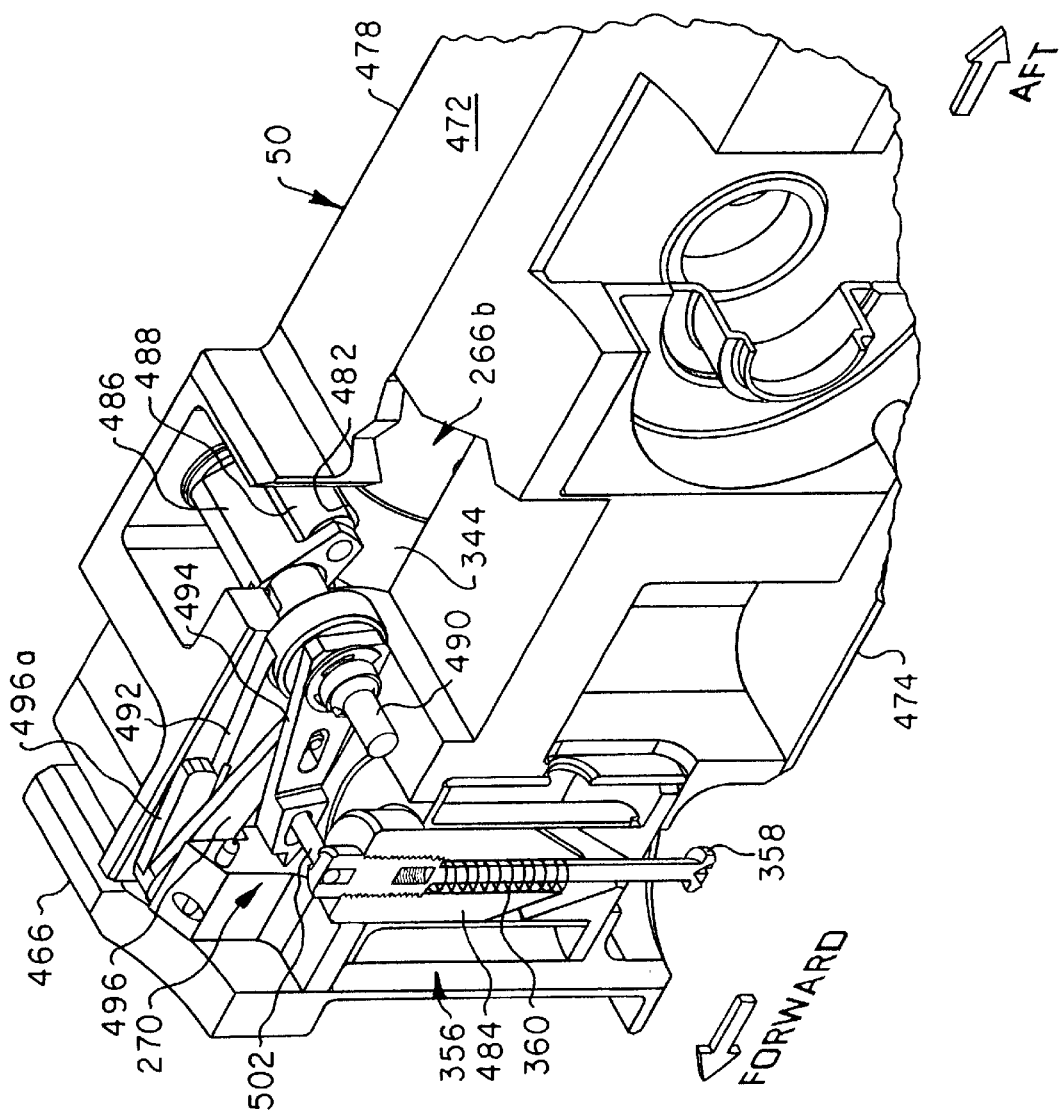
FIGS. 50–52 are enlarged scale cut away perspective views of the gun's sear assembly and sequentially illustrate its operation.

Operation of the charger motor 470 then rotationally drives the pinion gear 528 to rearwardly drive the right operating rod 266b (and thus the left operating rod 266a), as indicated by the arrow 550 in FIG. 60, to its FIG. 50 "on sear" position at which point the charger motor 470 and solenoid 532 are de-energized. The de-energization of the solenoid 532 rightwardly shifts the pinion gear structure 526,528 back to its FIG. 57 position to disengage it from the right operating rod 266b and ready the gun 34 for firing.

Conventional gun charging structures typically utilize a charging drive member which must move rearwardly along the gun to force the operating structure to its on sear position, and then be moved forwardly away from the now locked operating structure to be out of its way when the gun is subsequently fired. As is well known, this tends to introduce a substantial amount of addition al complexity into an already complex mechanical apparatus. In the present invention, however, all parts of the charger assembly 512 remain stationary in a front-to-rear direction relative to the gun during the charging operation, and are transversely shifted only a short distance to effect rapid and simple disconnection of the charger assembly from the operating rods.

As can be seen in FIGS. 57–59, the outer stem end 552 of the intermediate gear 518 has a hex head configuration and is recessed within an access opening 554 in the right side wall 478 of the housing 50. This permits the intermediate gear 518 (and thus the pinion gear 528) to be manually rotated to the charge the gun 34 if, for example, the charger motor 470 is inoperative.

Figure 62:
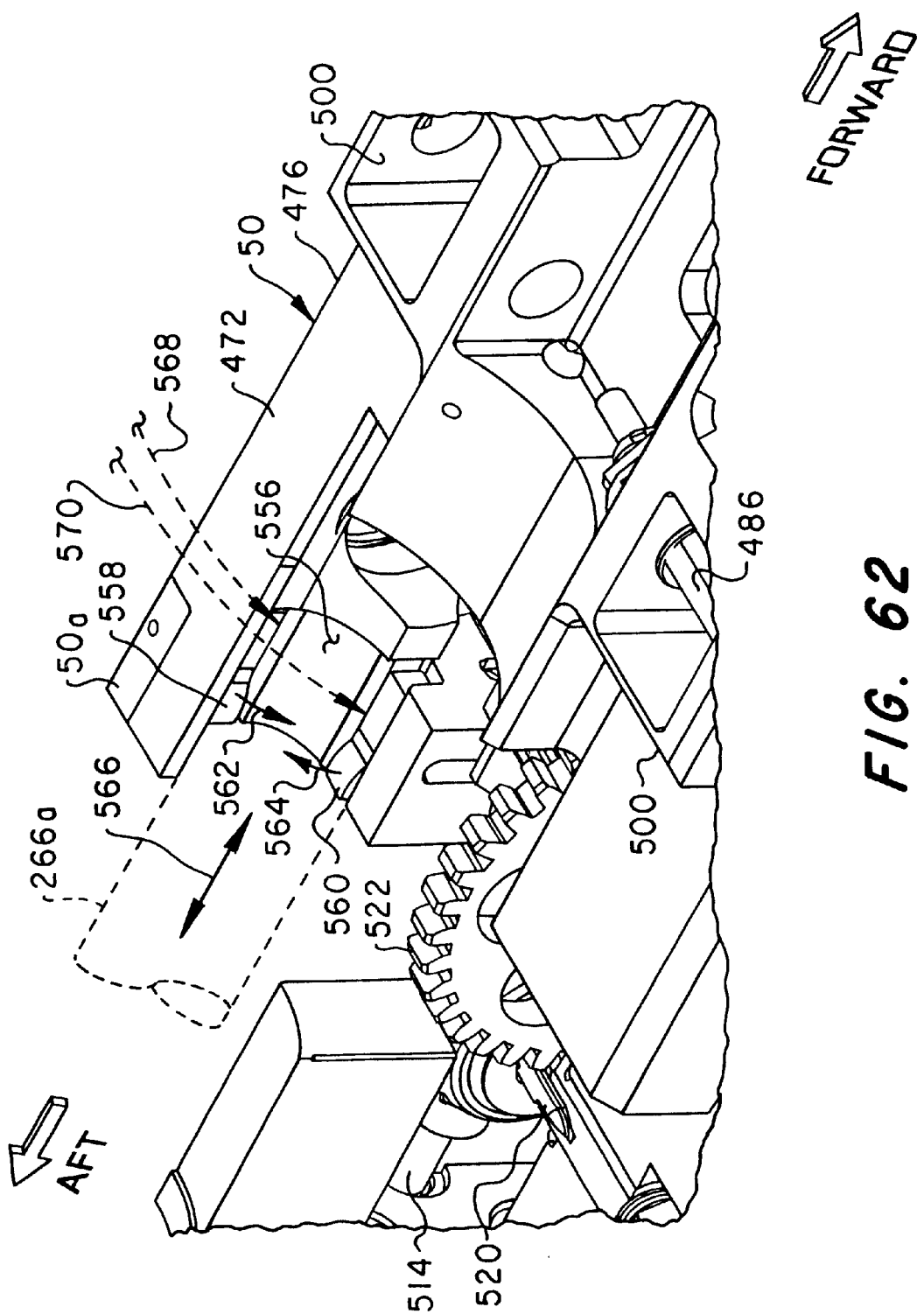
FIG. 62 is an enlarged scale partially cut away rear top side perspective view of a brush housing portion of the charger/sear assembly.

With reference now to FIG. 62, a small brush housing 50a is mounted on the charger/sear housing 50 on a left rear portion thereof (see FIGS. 53 and 55) and has an interior portion 556 through which the left operating rod 266a longitudinally extends. Pivotally mounted within the interior of the brush housing 50a are two electrical contact brushes—a primer power brush 558, and a bolt unit aft brush 560. Brushes 558,560 are spring-loaded in a manner such that they are pivotally biased, as indicated by the arrows 562,564 in FIG. 62, into sliding engagement with later described outer side surface portions of the left operating rod 266a as it is longitudinally cycled back and forth through the brush housing 50a as indicated by the double-ended arrow 566 in FIG. 62. Electrical leads, schematically shown by the dotted lines 568,570 in FIG. 62, are respectively connected to the brushes 558 and 560.

Figure 70:
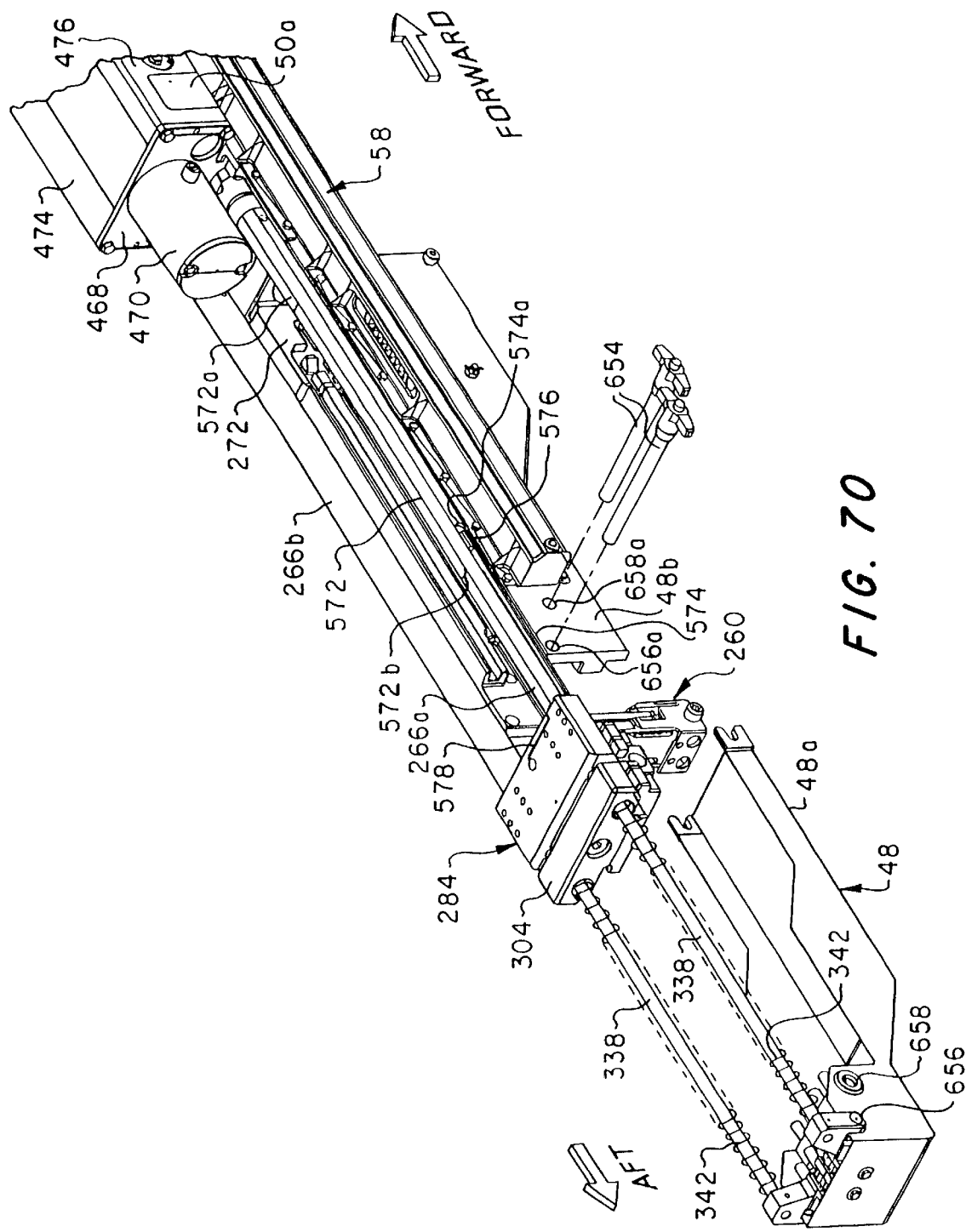
FIG. 70 is an exploded bottom side perspective view of a longitudinal portion of the gun illustrating its rapid and easy disassembly.

As shown in FIG. 70, a first elongated strip 572 of electrically insulative material longitudinally extends along the outer side surface of the left operating rod 266a, on a longitudinally intermediate portion thereof, and has front and rear ends 572a and 572b. A second elongated layer 574 of electrically insulative material is circumferentially spaced apart from strip 572 and longitudinally extends along a rear portion of the outer side surface of the left operating rod 266a, the layer 574 having a front end 574a. Exposed on the forward end of the insulative layer 574 is an electrically conductive hot shoe 576 (see FIG. 63). An electrical wire 578 (see FIGS. 63 and 70) is imbedded in the insulative layer 574 and electrically connects the hot shoe 578 and the operating rod body structure 284.

Low voltage DC electrical power from the gun's electrical system is continuously routed via lead 570 (see FIG. 62) to the bolt unit aft brush 560 which longitudinally slides along the insulative layer 572 during operation of the gun. As the left operating rod 266a reaches its rearwardmost position within the gun, the brush 560 moves off the front end 57a of the insulative layer 572 and is grounded to the adjacent bare metal portion of the left operating rod 266a. This grounding creates a signal which may be used by the gun's electrical system to monitor the front-to-rear position of the operating rod structure 266,284 relative to the balance of the gun. Additionally, during charging of the gun 34 this sensed grounding of the brush 560, which indicates that the operating rods have been moved rearwardly to their "on sear" positions, is used to cause the electrical system to turn off the charger motor 470.

Figure 63:
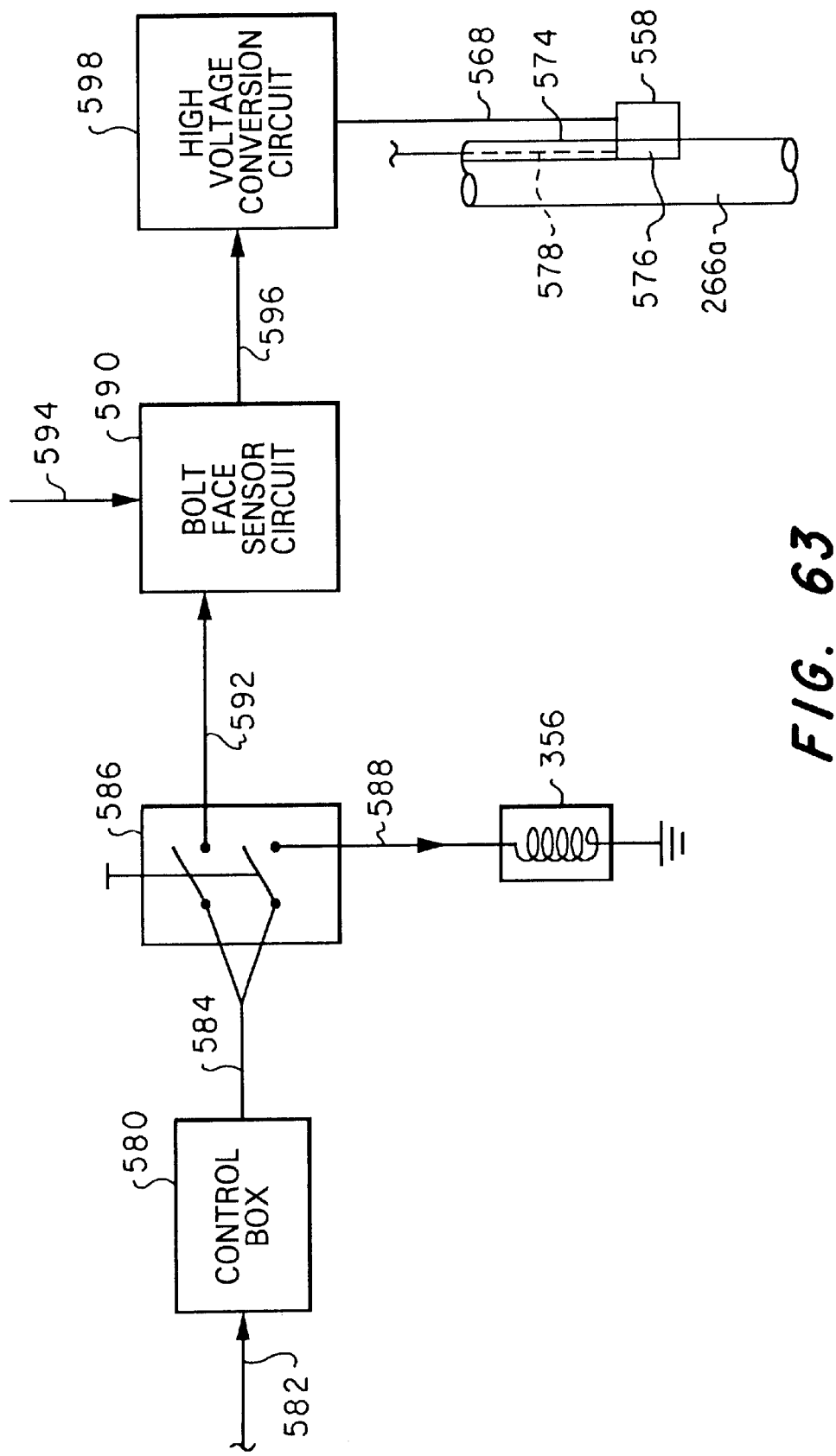
FIG. 63 is a highly schematic partial control wiring diagram for the gun.

Turning now to the electrical firing circuit diagram in FIG. 63, a suitable control box 580 receives 28V DC electrical power through lead 582 and outputs the power via lead 584 to a normally open double pole trigger switch 586 which, when closed, routes 28V DC electrical power to the sear solenoid 356 through lead 588, and to a bolt face sensor circuit 590 through lead 592. When the bolt sensor switch 368 (see FIGS. 43 and 46) is closed as previously described, it transmits an electrical signal 594 to the bolt face sensor circuit 590 which responsively transmits 28V DC current via lead 596 to a high voltage conversion circuit 598.

In response to the receipt of 28V DC electrical power through lead 596, the circuit 598 outputs 300V high frequency pulsed DC electrical power to the brush 558. The brush 558, in turn, conducts this high voltage electrical power to the hot shoe 576 on the left operating rod 266a, the hot shoe 576 being aligned with the brush 558 only when the bolt unit 260 is in its forward position and closing the bolt sensor switch 368. High voltage firing current received by the hot shoe 576 is passed through its associated electrical lead 578 to the operating rod body structure 284 (see FIG. 70). In turn, as illustrated in FIG. 27, this firing current is sequentially passed through the electrical probe 376, the operating rod body hot shoe 378, and to the electrical firing contact structure 382 of the gun.

Thus, the primer power brush 558 is electrically energized only when the gun's bolt structure is forward and closed, and the gun's electrical firing power supply is intermittent. This provides a significant advantage over the conventional firing power supply technique of continuously maintaining electrical firing power and utilizing such power when the firing components of the gun reach a predetermined alignment. In the present invention, such electrical firing power is generated only if such components are in their firing orientations.

One of the many advantageous design features of the gun 34 is its ease of field serviceability. This field serviceability improvement includes a unique barrel lock system which permits a twist lock and unlock installation and removal of the barrel 52 as will now be described in conjunction with FIGS. 64–69.

As illustrated in cut away perspective form in FIG. 67, a rear end portion of the barrel 52 has an axially spaced series of radially outwardly projecting arcuate lugs 600 on an outer side surface thereof. To install the barrel 52 within the gun, the barrel is rearwardly inserted, rear end first, into the front end of the gun (through a circular passage 602 in the front end unit 348 as can be best seen in FIG. 68) with the lugs 600 facing down as shown in FIG. 67. When a rear end portion of the inserted barrel enters a tubular passage 604 within a barrel receiving block member 606 (see FIG. 69) within the gun, the barrel 52 is twisted 90 degrees in either direction to interlock its lugs 600 with corresponding sets of spaced lugs 608 disposed on opposite left and right interior side surface portions in within the block member 606 (only the left set of lugs 608 being visible in FIG. 69). This lug interlock prevents the inserted longitudinal portion of the barrel 52 from moving forwardly out of the gun body until the barrel is twisted 90 degrees in either direction relative to the gun body.

The interlockable lugs 600,608 form a portion of a specially designed barrel lock system 610 of the present invention, the balance of the lock system 610 being carried on the front end unit 348 as shown in FIGS. 64–68. In addition to the lugs 600,608 the lock system 610 also includes a diametrically opposite pair of lateral exterior recesses 612 formed in the gun 52; a vertically oriented barrel lock pin 614 with diametrically opposite flat sides 616 on its upper end and a vertical slot 618 passing through its lower end; a horizontal retaining pin 620; and a generally disc-shaped bottom handle 622 which is axially locked to the bottom end of the barrel lock pin 614 but is rotatable relative thereto.

Figure 64:
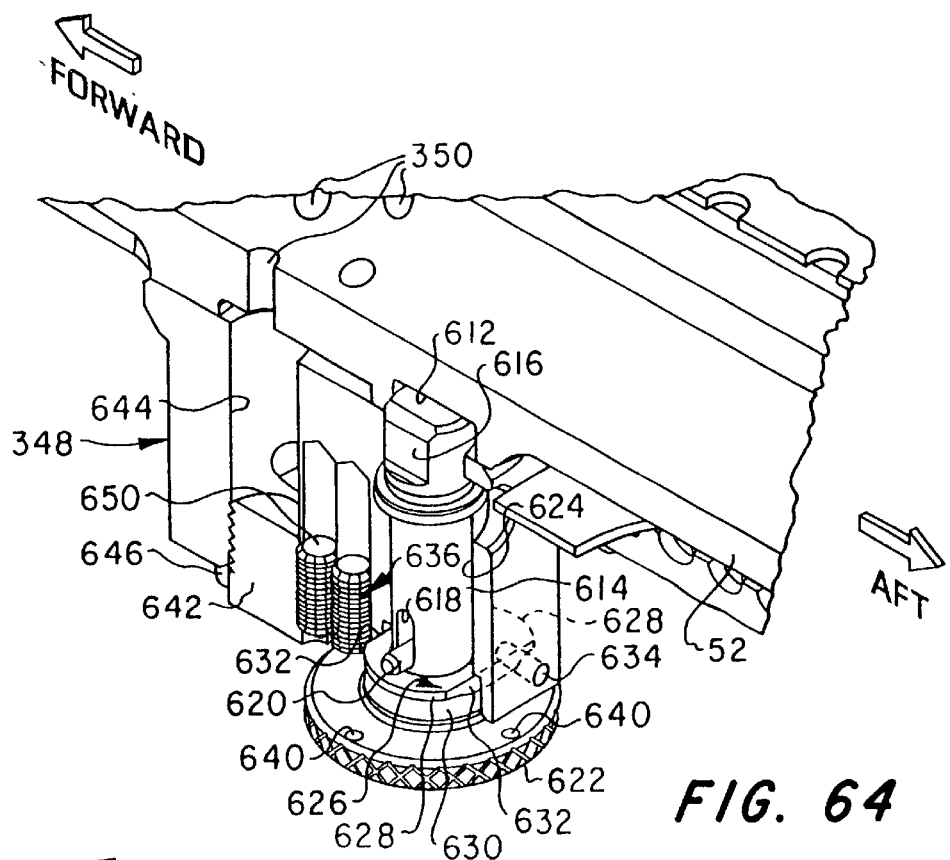
Figure 68:
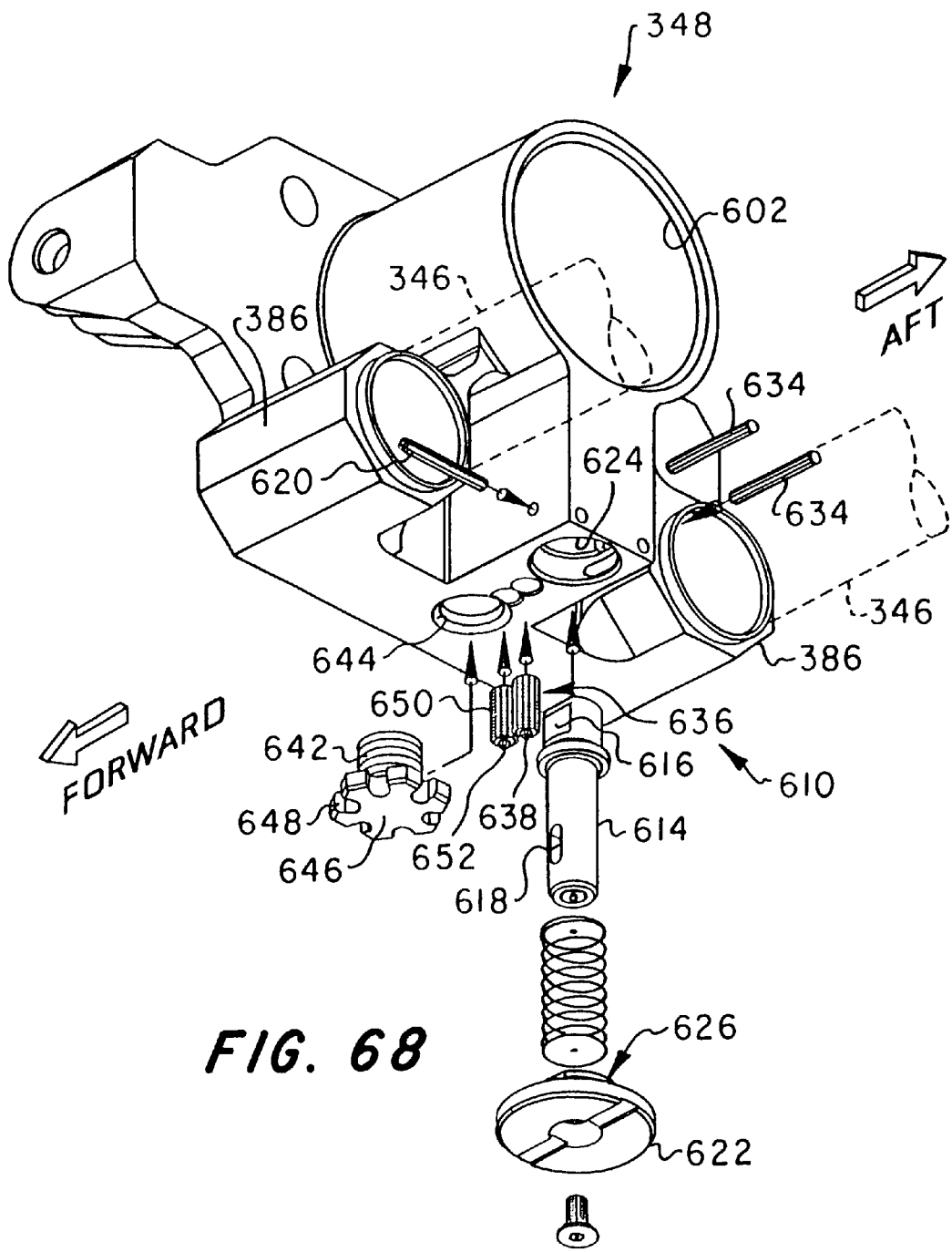
FIG. 68 is an exploded perspective view of the components of the barrel lock system.

Referring now to FIGS. 64 and 68, the function of the barrel lock pin 614 is to releasably prevent the inserted barrel 52 from being twisted from being rotated in a manner disengaging its lugs 600 from the associated gun lugs 608. This prevention of barrel unlocking rotation is achieved by the receipt of the upper end of the barrel lock pin in one of the barrel recesses 612 (see FIG. 64), the flat sides 616 of the upper end of pin 614 engaging corresponding flat sides of the barrel recess 612 that receives the upper lock pin end.

The lock pin 614 is received in a vertical passage 624 formed in the body of the front end unit 348 and having an open bottom end. The retaining pin 620 extends through the body of the front end unit, and through the lock pin slot 618, and retains the lock pin 614 in the vertical passage 614 for limited vertical movement therein between an upper limit position (see FIG. 64) in which the upper end of the lock pin 614 may be received in one of the barrel recesses 612 to prevent the barrel 52 from rotating relative to the balance or the gun, and a lower limit position (see FIG. 65) in which the upper end of the lock pin 614 is withdrawn from the barrel recess 612 to permit the barrel 52 to be twisted to decouple the lugs 600,608 and permit the barrel 52 to be pulled out of the gun.

The handle 622 has, on its upper side, a central upstanding cylindrical boss 626 having an outwardly projecting annular flange 628 on its top end which forms a circular groove 630 between the flange and the top side of the handle 622. The flange 628 has a diametrically opposite pair of flat areas 632 formed thereon. When the lock pin 614 is in its FIG. 64 barrel locking position, the retaining pin 620 is at the lower end of the locking pin slot 618, and the bottom handle is turned to its FIG. 64 position in which holding pins 634 (see also FIG. 68) tangentially extend through diametrically opposite portions of the groove 630 beneath the nonflattened portions of the boss flange 628 to thereby prevent the handle from being moved downwardly away from the body of the front end unit 348 and thereby permitting the upper end of the lock pin 614 to be downwardly moved out of the barrel recess 612 that receives it. A detent structure 636 carried by the front end unit 348 has a spring-loaded detent ball portion 638 on its lower end which is received in one of a circumferentially spaced plurality of detent recesses 640 formed on the top side of the handle 622 to resiliently prevent it from being rotated relative to the front end unit body and permit lowering of the lock pin 614.

A gas system plug 642 is threaded upwardly into the open lower end of a cylindrical passage 644 in the front end unit body and has a circular lower end handle 646 with a circumferentially spaced series of notches 648 therein. A vertical detent structure 650 is carried by the front end unit 348 and has on its lower end a spring-loaded detent member 652 that is received in one of the handle notches 648 to resiliently prevent loosening rotation of the handle 646.

Figure 65:
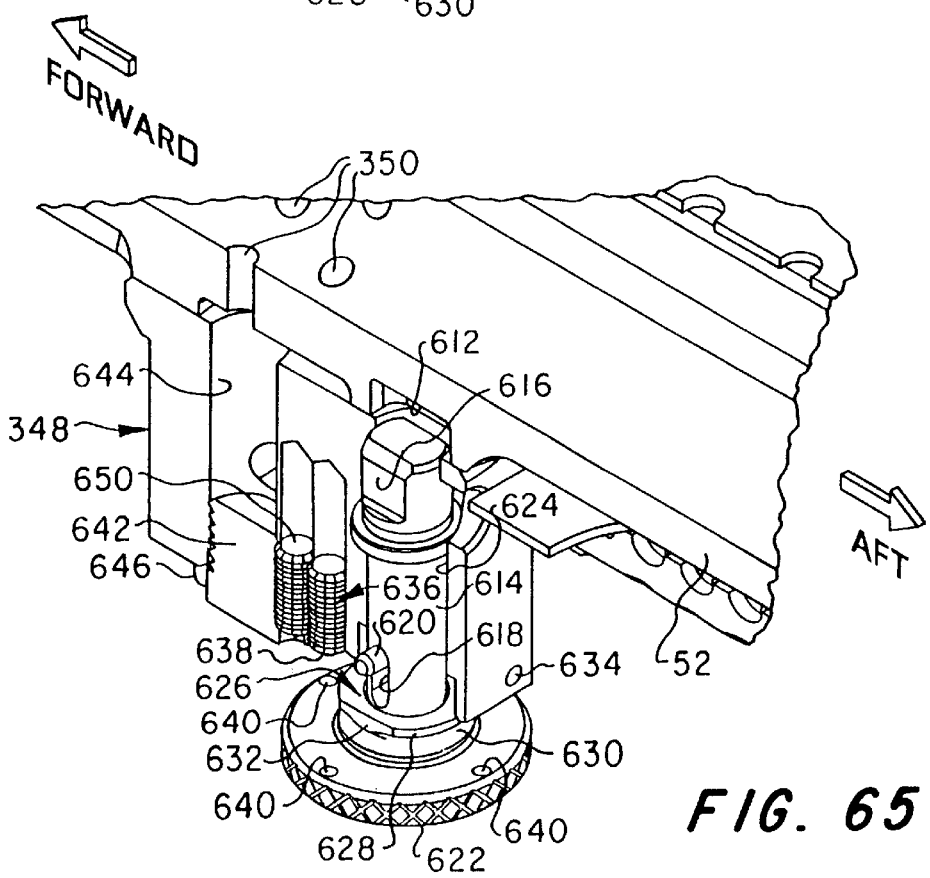

To remove the barrel 52 from the gun 34, the lock pin handle 622 is rotated from its FIG. 64 position to its FIG. 65 position to rotate the nonflattened portions of the flange 628 away from their overlying relationships with the holding pins 634, and then pulling the handle 622 down to its FIG. 65 position in which the pin 620 hits the upper end of the lock pin slot 618 and the upper end of the lock pin 614 is withdrawn from its associated barrel recess 612, thereby rotationally unlocking the barrel 52 and permitting it to be rotated relative to the balance of the gun. Next, as sequentially illustrated in FIGS. 66 and 67, the barrel 52 is rotated 90 degrees (see FIG. 66) to unlock its lugs 60 from the associated gun lugs 68, and then pulled forwardly out of the gun as shown in FIG. 67.

To reinstall the barrel 52 in the gun 34 the process is simply reversed. Specifically, the barrel 52 is inserted into the gun, rotated 90 degrees to interlock the lugs 60 and 68, the lock pin 614 is pushed upwardly to its FIG. 64 position in which the top end of the lock pin 614 enters one of the barrel recesses 612, and the lock pin handle 622 is rotated to its FIG. 64 position in which it is releasably locked to the body of the front end unit 348.

Figure 69:
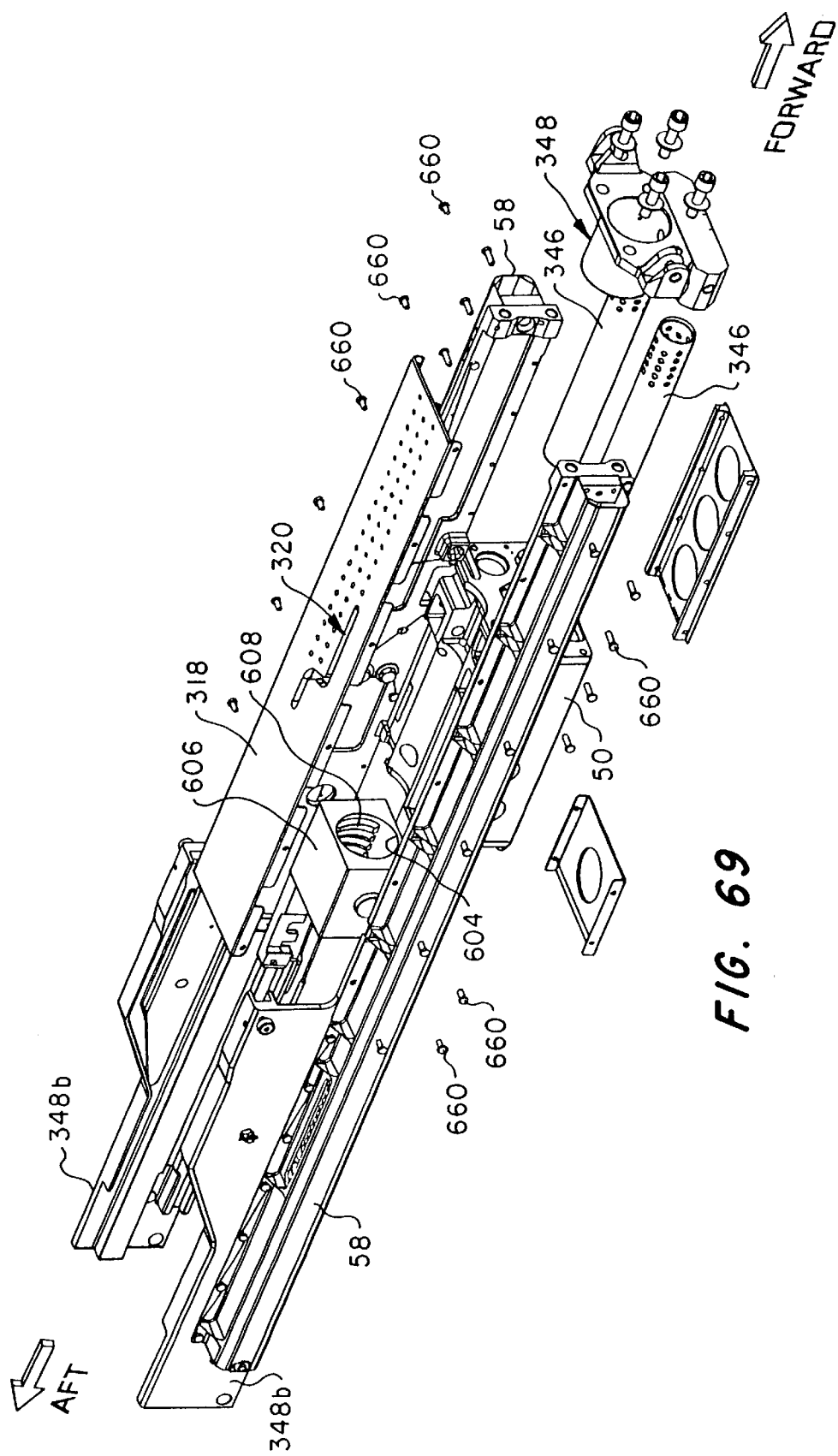
FIG. 69 is an exploded perspective view of a receiver component portion of the gun.

In addition to this field serviceability feature of the gun 34, the entire operating rod structure, and associated bolt buffer structure and rod guiding structure may be quickly removed from the gun for cleaning, inspection and maintenance purposes simply by removing two retaining ball pins 654 from the gun 34 (see FIGS. 5 and 70) from the rear end of the gun 70. These retaining pins 654 extend through circular side portion holes 656,658 in the rear end of the receiver portion 48a (see FIG. 70) and underlying holes 656a,658a in rear end portions of the opposite receiver side plates 48b. The simple and rapid removal of the pins 654, as shown in FIG. 70, permits the receiver portion 48a, the guide rods 338 and bolt buffer rods 398 secured thereto, the operating rod structure 284,366 and the bolt assembly 260 to simply be pulled rearwardly away from the balance of the gun 34 without requiring the use of any disassembly tools. Compared to machine guns of conventional construction, this greatly simplifies the access to the internal components of the gun. This serviceability is further enhanced by the formation, as shown in FIG. 69, of the front receiver portion of the gun in two separable halves 348b which are held together by easily removable screws 660.

Another desirable feature of the gun 34 is its substantially reduced firing recoil force compared to 30 mm machine guns of conventional construction. As previously mentioned, this sharp reduction in firing recoil force stems partly from the ability of the gun to be fired in an "out of battery" condition—i.e., while the gun is still moving forwardly in its associated cradle structure during counter recoil movement of the gun subsequent to a previous shot.

Additionally, the entire charger assembly is formed as an integral part of the gun for movement with the gun during firing thereof. This is in sharp contrast to the conventional practice of constructing and positioning the charger in a manner such that it does not move with the gun during firing thereof. Because of this construction the charger does not form a portion of the gun's recoil mass, and is thus merely "parasitic" weight. The present invention's mounting of the charger directly on the gun, so that the charger becomes a part of the gun's recoil mass, advantageously reduces the resulting recoil force of the gun.

Another unique feature in the gun 34 that desirably reduces its recoil force is a special construction incorporated by the present invention into the previously mentioned muzzle brake 54 shown in FIGS. 5 and 15–17. Specifically, the muzzle brake 54 has an elongated hollow body, with open front and rear ends 662,664. The rear muzzle brake end 664 is threadable onto the outer end of the barrel 52 so that the longitudinal axis of the internal passage 666 of the muzzle brake 54 is coaxial with the firing axis of the barrel 52.

Extending outwardly from opposite top and bottom sides of the muzzle brake internal passage 666 through corresponding top and bottom exterior side surfaces of the muzzle brake body are an axially spaced series of gas discharge openings 668 which are angled rearwardly and laterally outwardly, preferably at angles of approximately thirty degrees, relative to a plane transverse to the longitudinal axis of the muzzle brake. As can be best seen in FIG. 5, the cross-sectional areas gas discharge openings 668 progressively increase in a rear-to-front direction along the length of the muzzle brake 54. The rearward slope of the gas discharge openings 668 causes pressurized gas outwardly discharged therefrom impart a forward force on the gun, offsetting part of the gun's rearward recoil force subsequent to firing thereof, while the unique progressively increasing cross-sectional areas of the opening 668 tends to even out this forward force during its existence by providing more gas outlet area as the internal gas pressure in the muzzle brake decreases with each successive uncovering of a more forward opening 668 by a cartridge projectile being gas-propelled through the interior of the muzzle brake.

Another unique aspect of the present invention which desirably reduces the firing recoil force of the gun 34 arises from the substantial over-pressurization of the previously mentioned cylinder areas 386 in the front end unit 348 (see FIGS. 30 and 68) beyond the minimum pressure level required therein to rearwardly drive the operating rod structure.

As can be seen from the foregoing, the present invention provides a 30 mm machine gun that, compared to its conventional counterparts, provides a less complex construction, substantially improves the ability to field service the gun, and markedly reduces the gun's firing recoil forces to thereby correspondingly improve the gun's controllability and firing accuracy. While the 30 mm machine gun of the present invention has been representatively illustrated and described as being cradle-mounted on an end of an aircraft support plank, it will be readily appreciated by those of skill in this particular art that it could be operatively supported on a variety of other aircraft and ground support structures if desired. Additionally, while the principles of the present invention have been illustratively incorporated in a 30 mm machine gun, it will also be appreciated that such principles could also be incorporated in a variety of other types and sizes of machine guns if desired.

The foregoing detailed description is to be clearly understood as being given by way of illustration and example only, the spirit and scope of the present invention being limited solely by the appended claims.

What is claimed is:

1. Feed apparatus operative to feed belted ammunition to a machine gun, comprising:
    a housing through which belted ammunition may be fed;
    a rotatably supported shaft;
    a sprocket structure, rotatable by said shaft, for engaging an ammunition belt and driving it through said housing;
    a firing sensor switch carried on said sprocket structure;
    a feed member rotationally drivable in first and second opposite directions; and
    connecting structure interconnected between said feed member and said shaft and being operative to rotate said shaft, and thus said sprocket structure, only in response to driven rotation of said feed member in said first direction.

2. The feed apparatus of claim 1 wherein said connecting structure is a ratcheted gear structure.

3. The feed apparatus of claim 1 wherein said feed member is a feed drum rotatable in said first and second directions about an axis and having a side from which a drivingly engageable pin outwardly projects parallel to and offset from said axis.

4. Feed apparatus operative to feed belted ammunition to a machine gun, comprising:
    a housing through which belted ammunition may be fed;
    a rotatably supported shaft;
    a sprocket structure, rotatable by said shaft, for engaging an ammunition belt and driving it through said housing, said sprocket structure being coaxially locked to said shaft for conjoint rotation therewith, said sprocket structure being slidable along the length of said shaft between first and second limit positions;
    a spring structure resiliently biasing said sprocket structure axially toward said first limit position; and
    a feed member connected to said shaft and being movable to rotate said shaft,
    said sprocket structure including a spaced pair of sprocket members secured to opposite ends of a tubular hub having an internal groove therein, and
    said shaft extending through said hub and having an external spline slidably received in said internal groove.

5. Feed apparatus operative to feed belted ammunition to a machine gun, comprising:
    a housing through which belted ammunition may be fed;
    a rotatably supported shaft;
    a sprocket structure, rotatable by said shaft, for engaging an ammunition belt and driving it through said housing, said sprocket structure having an end surface generally transverse to said shaft;
    a movable feed member;
    connecting structure interconnected between said feed member and said shaft and being operable to rotate said shaft, and thus said sprocket structure, in response to driven movement of said feed member; and
    a depressible firing sensor switch carried on said end surface of said sprocket structure.

* * * * *